United States Patent
Takahashi et al.

[11] Patent Number: 6,011,921
[45] Date of Patent: Jan. 4, 2000

[54] INTERMEDIATE COMMUNICATION CONTROLLER THAT SENDS TRANSMISSION DATA IN A PREDETERMINED ORDER TO A CORRESPONDING SLAVE UNIT UPON REQUEST FROM A MASTER CONTROLLER

[75] Inventors: Akihiro Takahashi; Takumi Iwai; Kenji Fukunaga, all of Osaka; Shinichi Hara; Shuichi Nakagawa, both of Kawasaki, all of Japan

[73] Assignee: Fujitsu Limited, Kanagawa, Japan

[21] Appl. No.: 08/782,310

[22] Filed: Jan. 15, 1997

[30] Foreign Application Priority Data

Mar. 19, 1996 [JP] Japan ................................ 8-063532

[51] Int. Cl.[7] ........................................... G06F 13/20
[52] U.S. Cl. .............. 395/868; 395/200.32; 395/200.33; 395/200.39; 395/293; 395/841
[58] Field of Search .................. 395/200.39, 200.33, 395/200.32, 293, 841, 868

[56] References Cited

U.S. PATENT DOCUMENTS

| | | | |
|---|---|---|---|
| 3,614,745 | 10/1971 | Podvin et al. | 340/172.5 |
| 5,247,654 | 9/1993 | Hamid et al. | 395/550 |
| 5,247,675 | 9/1993 | Farrell et al. | 395/650 |
| 5,313,588 | 5/1994 | Nagashige et al. | 395/275 |
| 5,455,959 | 10/1995 | Simmering | 395/800 |
| 5,634,127 | 5/1997 | Cloud et al. | 395/680 |
| 5,708,817 | 1/1998 | Ng et al. | 395/739 |

Primary Examiner—Thomas C. Lee
Assistant Examiner—Albert Wang
Attorney, Agent, or Firm—Helfgott & Karas, P C.

[57] ABSTRACT

A communication control apparatus includes a master communication control unit for performing communication control for a plurality of slave units, and an intermediate communication control unit which performs the communication control for each slave unit instead of the master communication control unit. The intermediate communication control unit includes a memory section for holding transmission data necessary for slave unit communication processing and response data, which is a response to the transmission data, a transmission/reception section for sending the transmission data and for receiving the response data, and a communication processing control section. The communication processing control sections sends the transmission data in a predetermined order to the slave unit, which writes the response data received in a predetermined order into the memory section, and notifies the master communication control unit of the completion of the communication processing by using an interruption signal when the communication processing is completed.

61 Claims, 52 Drawing Sheets

FIG. 9(a) CHAD 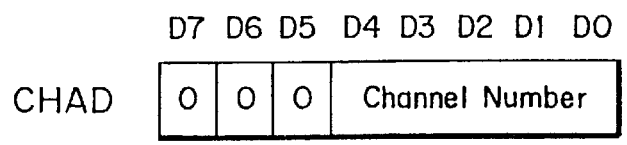
FIG. 9(b) ACK 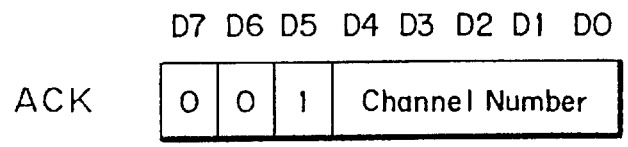
FIG. 9(c) ID 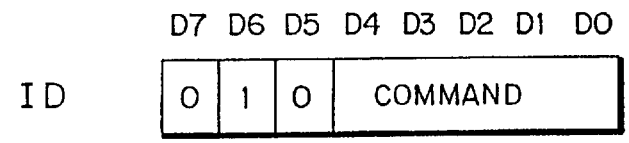
FIG. 9(d) EBL 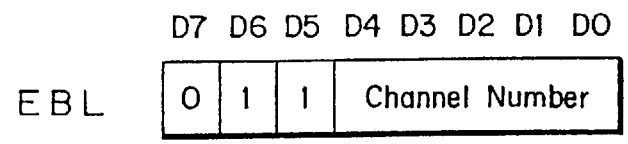
FIG. 9(e) DATA 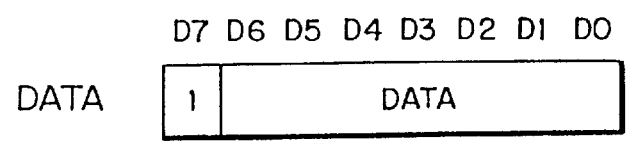

FIG. 25(a) FRAME PULSE
FIG. 25(b) CLOCK
FIG. 25(c) SERIAL BUS DATA
FIG. 25(d) NUMBER OF RECEIVED BYTES
FIG. 25(e) INTERRUPTION

F I G. 26
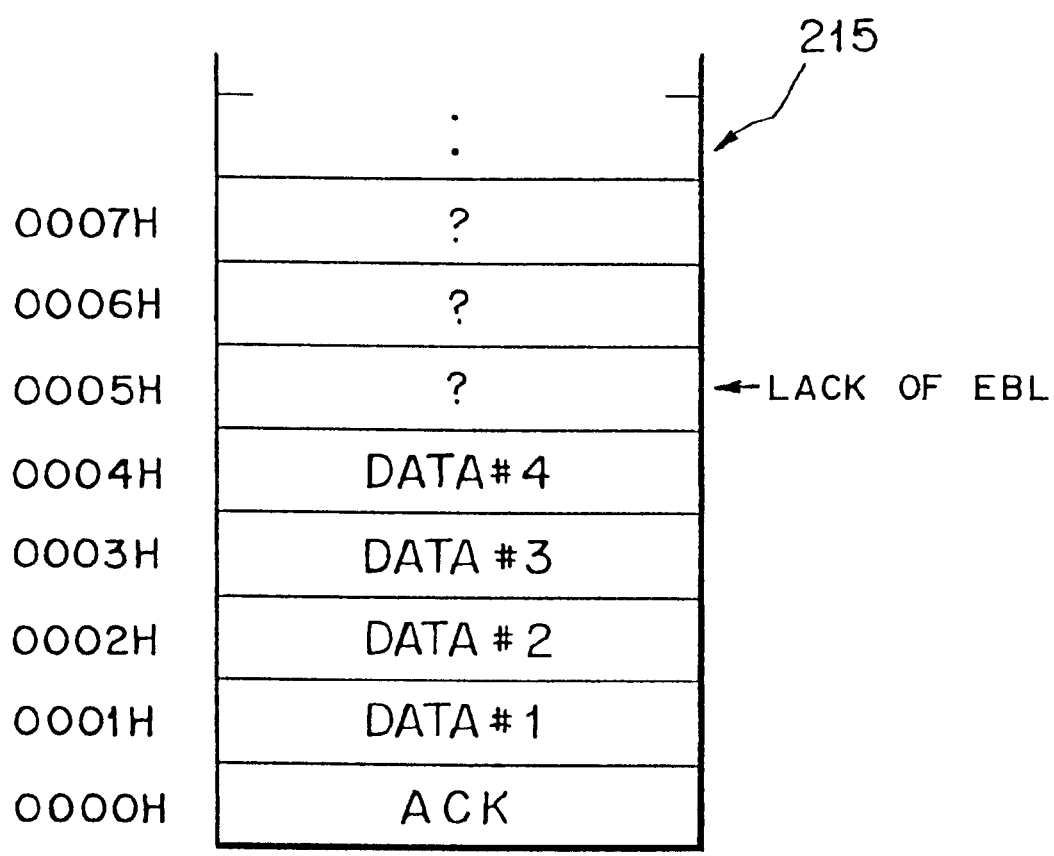

FIG.28(a) FRAME PULSE
FIG.28(b) CLOCK
FIG.28(c) SERIAL BUS DATA
FIG.28(d) PREDETERMINED PERIOD OF TIME
FIG.28(e) INTERRUPTION

INTERMEDIATE COMMUNICATION CONTROLLER THAT SENDS TRANSMISSION DATA IN A PREDETERMINED ORDER TO A CORRESPONDING SLAVE UNIT UPON REQUEST FROM A MASTER CONTROLLER

BACKGROUND OF THE INVENTION

The present invention relates to a communication control apparatus, a communication control method, and an intermediate communication control unit. More particularly, the invention relates to a communication control apparatus, a communication control method, and an intermediate communication control unit preferably for use with an optical transmission apparatus which constitutes an optical communication network such as SONET (Synchronous Optical Network).

FIG. 48 is a block diagram showing an example of a common optical communication system. In FIG. 48, numeral 101 denotes an optical transmission apparatus, numeral 102 denotes an optical multiplexer for combining a number of signals equivalent to DS1 (Digital Signal Level 1) into a signal equivalent to OC (Optical Carrier)-3 (about 155.52 Mbps) by multiplexing, numeral 103A denotes a digital exchange, numeral 103B denotes an analog exchange, and numeral 104 denotes a carrier serving area (CSA) within which subscribers' terminals receive a variety of services.

The optical transmission apparatus 101 is a subscriber-side unit, and it combines signals (data) ranging from an audio frequency range (about 64 kbps) to OC-3 into a signal by multiplexing and transmit the thus multiplexed data to a receiving side through a SONET interface, such as an OC-3 interface or an OC-12 interface having a transmission rate four times that of the OC-3 interface (i.e., a transmission rate of about 622 Mbps). The optical transmission apparatus 101 makes it possible to increase the capacity of the analog exchange 103A and the digital exchange 103B, to add an electronic cross connecting function to the optical communication system, to use an optical fiber as a subscriber line (FITL: Fiber in The Loop), and to cope with the digital exchange 103A.

Specifically, as shown in FIG. 48, the optical transmission apparatus 101 is constituted by integration of a DLC (Digital Loop Carrier) 101B for controlling an access point through which services are offered to subscribers and an optical multiplexing section 101A for transmitting data through the access point. The DLC 101B classifies signals according to the types of subscribers' apparatuses and sends the thus classified signals by means of the previously described electronic cross connecting function. As a result, a variety of services [e.g., narrow band services (local SW services, and special services), wide band services (DS1, STS1, DS3, etc), and FITL] can be offered to the carrier service area 104 as a complex set of services.

If the analog exchange 103B is connected to the optical transmission apparatus 101, the previously described optical communication system is usually constituted by use of an interface unit 105A or 105B, whichever is desired, according to the type of service to be offered to the carrier service area 104, as shown in, e.g., FIG. 49(a). If the digital exchange 103A is connected to the optical transmission apparatus 101, the optical transmission apparatus 101 and the digital exchange 103A are connected to each other without the previously described interface units 105A and 105B being interposed between them, as shown in, e.g., FIG. 49(b).

The optical transmission apparatus 101 can be connected to various tributary shelves (service shelves) 101C to 101E depending on the type and form of service to be offered, as shown in, e.g., FIGS. 50 and 51, so that it can handle with various forms of service to be offered to subscribers. In the case of depicted in FIG. 51, as a result of a common shelf (CMS: Common Shelf) 101C being connected to a narrow band shelf (NBS: Narrow Band Shelf) 101D and a narrow band optical fiber shelf (NFS: Narrow Band Fiber Service Shelf) 101E, low-speed (narrow-band) services (e.g. a variety of telephone services to each subscriber's telephone 106) are offered to subscribers. It is possible to directly offer high-speed (wide-band) services from the common shelf 101C by use of only the common shelf 101C. In this case, an OC-3, STS1, and D3 interface (which have different transmission rates) are selectively used.

In FIG. 51, reference numeral 107 denotes subscriber-side interface shelves of FITL (OAS1: Optical Access Shelf-1), which are used when narrow-band optical fiber shelves 101E are utilized. Reference numeral 101F denotes a power feed shelf (PFS: Power Feed Shelf) in the optical transmission apparatus 101 for feeding electrical power to each of the interface shelves 107. With the above circuit configuration, it is possible to optically transmit signals to the vicinity of the subscriber's telephones 106 located in remote areas (that is, from NFS 101E to the interfaces 107).

FIG. 52 is a block diagram showing an example of the detailed configuration of the above-described narrow-band shelf (NBS) 101D. As shown in FIG. 52, the narrow-band shelf 101D comprises a plurality of slave units (CH: channel units) 111, a communication control section (AT1N) 112, a multiplexing/dividing section (MD1N) 113, and a power feeding section (PW1N) 114.

Each of the channel units 111 accommodates a plurality of subscriber lines [or the analog exchanges 101A shown in FIG. 49(a)], and the communication control section 112 executes alarm processing and overall control operations in the narrow-band shelf 101D. The communication control section 112 usually comprises a CPU (a central processing unit). The multiplexing/dividing section 113 combines signals DS0 from the channel units 111 into a signal DS1 through multiplexing, or separates the signal DS1 into the signals DS0. As shown in FIG. 52, the multiplexing/dividing section 113 is provided with two units, namely, one unit for use as a primary system (P) and the other unit for use as a spare system (W). The power feeding section 114 feeds electrical power to each unit within the narrow-band shelf 101D.

With such a circuit configuration, the communication control section 112 executes automatic scanning processing, control processing, and monitoring processing for each of the channel units 111 in the above described narrow-band shelf 101D. As a result of the collection of data regarding whether each channel unit 111 is mounted (connected) and data regarding the operating state of each channel unit 111, required processing such as alarm processing is carried out.

With regard to the previously described automatic scanning processing, control processing, and monitoring processing, the following principal operations are carried out for each of the channel units 111:
(1) Automatic Scanning Processing
    Collection of data regarding the mounted state of each channel unit 111
(2) Control Processing
    Writing of preset information, such as a gain adjustment value, to channel unit 111

Test access control for line test

Control for turning on an alarm LED (3) Monitoring Processing

Monitoring preset information such as a gain adjustment value

Monitoring the state of test access for line test

Monitoring the state of a line (Idle/Busy)

Monitoring the on/off state of an LED

Collection of unit management information (a physical inventory) such as the date of manufacture and the name of a unit The above-described narrow-band shelves (NBS) 101D are generally categorized into two types, namely, a serial communication type in which processing such as an automatic scanning processing is performed using serial transmission, and a bus communication type in which the above-described processing is performed using bus transmission.

As shown in FIG. 53, in the case of the serial communication type (which utilizes serial transmission), a communication control unit 112 is provided with a CPU 112' and a sub-communication control unit (SCON) 115A for performing serial transmission. Further, each channel unit 111 is provided with a similar sub-communication control unit (SCON) 115B and a register 116. The communication control unit 112 is connected to the channel units 111 through a corresponding number of serial buses.

In the serial communication type narrow-band shelf (NBS) 101D, the CPU 112' sends data, which are necessary for the automatic scanning processing, the control processing, and the monitoring processing, to the sub-communication control apparatus 115B through the sub-communication control apparatus 115A. As a result, the respective sub-communication control apparatus 115A and 115B execute the above-described various kinds of processing, and necessary data are collected every time each kind of processing is completed (i.e., every time an interruption signal (IRQ) is received from the sub-communication control apparatus 115A).

In contrast, in the case of the bus communication type (which utilizes bus transmission), the communication control unit 112 is provided with the CPU 112' and a buffer 115C, as shown in FIG. 54. Each channel unit 111 is provided with a buffer 115D and the register 116. The communication control unit 112 is connected to each of the channel units 111 through a set of signal lines (e.g., address signal lines, a data bus, and an enable signal line). The number of the sets of signal lines corresponds to the number of the channel units 111.

In the bus communication type narrow-band shelf (NBS) 101D, results of the automatic scanning processing, the control processing, and the monitoring processing are sequentially latched into the buffer 115C through the register 116 and the buffer 115D. Therefore, it becomes possible for the CPU 112' to arbitrarily collect necessary data without using the previously described interruption signal.

In the case of the serial communication narrow-band shelf (NBS) 101D, the number of signal lines (serial buses) between the communication control unit 112 and the channel units 111 can be reduced. The communication control unit 112 and each channel unit 111 usually communicate with each other through transmission and reception of data, for example, in units of one byte. Hence, the CPU 112' receives an interruption signal every one byte, which makes a program for controlling the CPU 112' complicated. As a result, the load on the CPU 112' becomes considerably large.

In the case of the bus communication type narrow-band shelf, it is possible to reduce the load on the CPU 112'.

However, the number of lines (signal lines) increases as the number of channel units 111 is increased. In light of the recent tendency toward high-density packaging of the narrow-band shelves 101D associated with the miniaturization of the channel units 111, the bus communication type narrow-band shelf is very disadvantageous.

The present invention has been conceived in view of the above-described drawbacks, and an object of the present invention is to provide a communication control apparatus, a communication control method, and an intermediate communication control unit which can reduce a load on a master communication control unit while minimizing the number of signal lines between the master communication control unit and a plurality of slave units.

SUMMARY OF THE INVENTION

It is an object of the invention to greatly reduce the load to a minimum on a master communication control apparatus while the number of signal lines between the master communication control apparatus and a plurality of slave units.

A communication control apparatus includes a master communication control unit for performing communication control for a plurality of slave units, and an intermediate communication control unit which performs the communication control for each slave unit instead of the master communication control unit. The intermediate communication control unit includes a memory section for holding transmission data necessary for slave unit communication processing and response data, which is a response to the transmission data, a transmission/reception section for sending the transmission data and for receiving the response data, and a communication processing control section. The communication processing control sections sends the transmission data in a predetermined order to the slave unit, which writes the response data received in a predetermined order into the memory section 21, and notifies the master communication control unit 1 of the completion of the communication processing by using an interruption signal when the communication processing is completed.

The invention comprises the several steps and the relation of one or more of such steps with respect to each of the others, the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 9(a) to 9(e) are diagrams showing an example of the formats of communication data used in the communication control apparatus according to the embodiment;

FIG. 26 is a diagram showing an example of the storage of data in the memory section when the monitor sequence is executed (in abnormal conditions) according to the embodiment;

DESCRIPTION OF PREFERRED EMBODIMENTS

Figure 1:
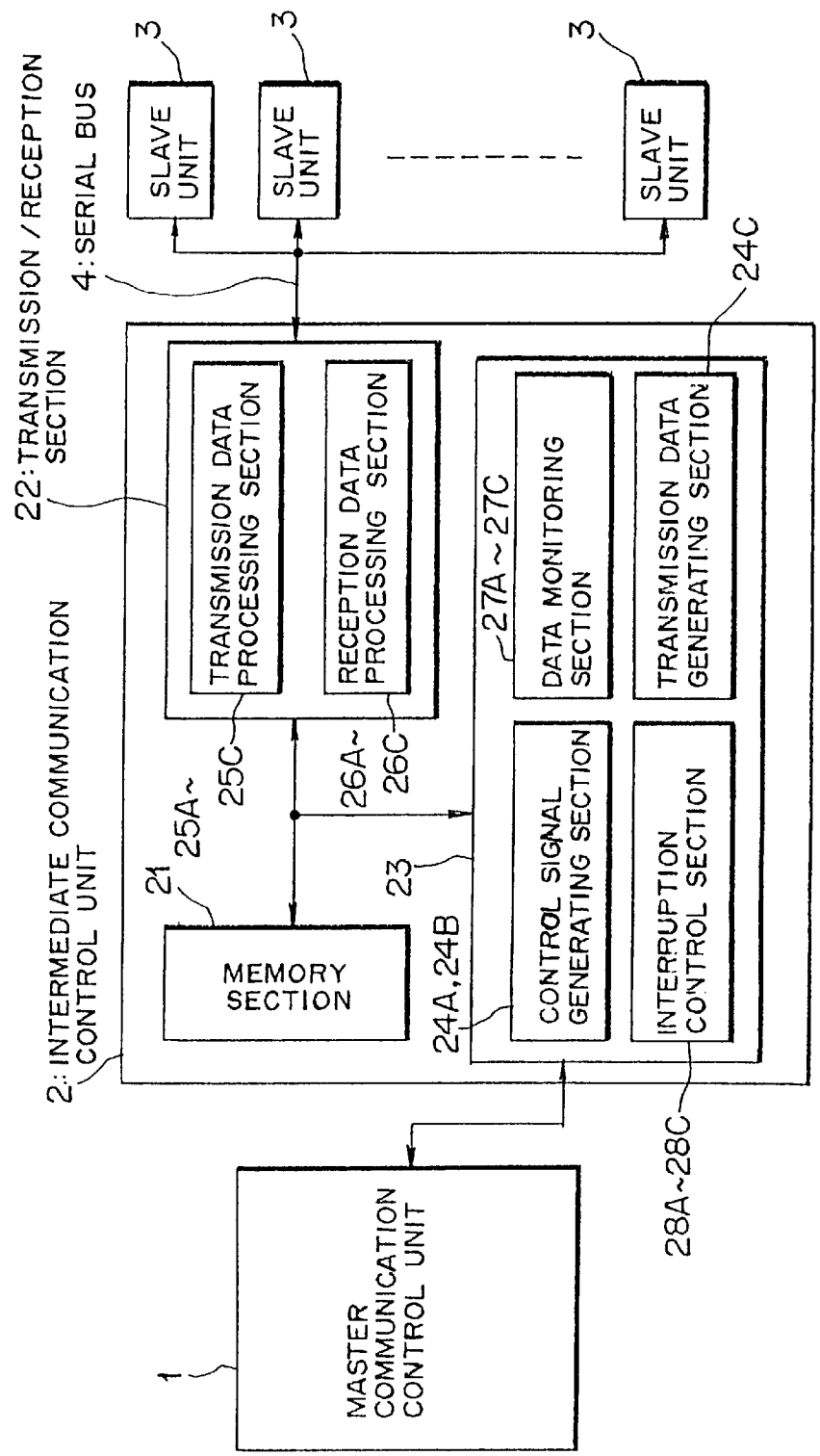
FIG. 1 is a block diagram showing the principle underlying the present invention.

FIG. 1 is a block diagram showing the principle of the present invention. A communication control apparatus shown in FIG. 1 comprises a master communication control unit 1, an intermediate communication control unit 2, a plurality of slave units 3, and serial buses 4. The master communication control unit 1 performs communication control for each slave unit 3, and the intermediate communication control unit 2 performs communication control for each slave unit 3 instead of the master communication control unit 1 in response to a communication processing request from the master communication control unit 1.

To this end, the intermediate communication control unit 2 comprises memory section 21, a transmission/reception section, and a communication processing control section 23, as shown in FIG. 1.

The memory section 21 holds communication data (specifically, transmission data and response data which are sent back as a response to the transmission data) which are necessary to perform the slave unit communication processing for each type of communication. The transmission/reception section 22 transmits the communication data (the transmission data and the response data) to, or receives them from, a certain slave unit 3.

Upon reception of a communication processing request from the master communication control unit 1, the communication processing control section 23 performs the slave unit communication processing. That is, the communication processing control section 23 sends transmission data, which correspond to the type of the communication processing request, to a corresponding slave unit 3 in a predetermined order through the transmission/reception section 22. Subsequently, the communication processing control unit 23 writes the response data, which are received as a response to the transmission data in a predetermined order from the slave unit 3 through the transmission/reception section 22, into the memory section 21. Upon completion of the slave unit communication processing, the communication processing control section 23 notifies the master communication control unit 1 of the completion of the slave unit communication processing through an interruption signal.

In the communication control apparatus having the above-described structure, the transmission data necessary to perform the slave unit communication processing are held in the memory section 21 within the intermediate communication control unit 2 for each type of communication. As a result of issuing the communication processing request from the master communication control unit 1 to the intermediate communication control unit 2, the communication processing control section 23 of the intermediate communication control unit 2 sends transmission data, which correspond to the type of communication processing request, to the corresponding slave unit 3 in a predetermined order.

Upon reception of the transmission data, the slave unit 3 sends response data, which are responses to the transmission data, to the intermediate communication control unit 2 in a predetermined order. When the slave unit communication processing has been completed as a result of the reception of the response data by the intermediate communication control unit 2, the intermediate communication control unit 2 notifies the master communication control unit 1 of the completion of the communication processing through an interruption signal.

In other words, the previously described intermediate communication control unit 2 notifies the master communication control unit 1 of the completion of the communication processing through an interruption signal when a sequence of slave unit communication processing has been completed rather than outputting an interruption signal to the master communication control unit 1 every time data are exchanged between the intermediate communication control unit 2 and the slave units 3. As a result, it becomes unnecessary for the master communication control unit 1 to directly communicate with the slave unit 3 and to constantly communicate with the intermediate communication control unit 2. Therefore, it becomes possible for the master communication control unit 1 to execute other processing until the sequence of slave unit communication processing are completed (the above description relates to claim 1, 31, 32, 55, and 85).

Specifically, the memory section 21 is configured so as to store notification data for notifying execution of connection/operation status examination processing, command data for executing the connection/operation status examination processing, and transmission end data which represent the end of the transmission data, as the transmission data necessary to execute the connection/operation status examination processing among the previously described plurality of kinds of slave unit communication processing.

As shown in FIG. 1, the transmission/reception section 22 comprises a transmission data processing section 25A and a reception data processing section 26A. The communication processing control section 23 comprises a control signal generating section 24A, a data monitoring section 27A, and an interruption control section 28A.

The transmission data control section 25A of the transmission/reception section 22 reads the transmission data from the memory section 21 in order of the notification data, the command data, and the transmission end data in response to a control signal from the communication processing control section 23. The thus read transmission data are sent to the corresponding slave unit 3 through the transmission/reception section 22. Upon reception of reception acknowledge data, connection/operation status examination result data, and reception end data which are sent from the slave unit 3 in that order as a response to the transmission data, the reception data processing section 26A sequentially writes the thus received response data into the memory section 21 in response to a control signal from the communication processing control section 23.

Upon reception of a connection/operation status examination processing request which is output from the master communication control unit 1 and which requests execution of the connection/operation status examination processing for the slave unit 3, the control signal generating section 24A of the communication processing control section 23 generates a control signal for the transmission/reception section 22. The data monitoring section 27A monitors the state of the transmission and reception of the transmission data and response data. After the transmission end data have been transmitted, the data monitoring section 27A detects whether or not the reception end data have been written into the memory section 21. After the data monitoring section 27A has detected that the reception end data have been written into the memory section 21, the interruption control section 28A outputs an interruption signal to the master communication control unit 1.

In the above described communication control apparatus, the master communication control unit 1 issues a connection/operation status examination processing request which requests the intermediate communication control unit 2 to examine the connection/operation status of a certain slave unit 3. The intermediate communication control unit 2 sends the notification data, the command data, and the transmission end data to the corresponding slave unit 3 in that order. The slave unit 3 then sends the reception acknowledge data, the connection/operation status examination result data, and the reception end data, in that order, as a response to the data from the intermediate communication control unit 2. When it is confirmed that the intermediate communication control unit 2 has received the reception end data, an interruption signal is output to the master communication control unit 1.

In the above described communication control apparatus, the intermediate communication control unit 2 sequentially sends the notification data, the command data, and the transmission end data to the corresponding slave unit 3. The intermediate communication control unit 2 sequentially receives the reception acknowledge data, the connection/operation status examination result data, and the reception end data as responses from the slave unit 3. As a result, the connection/operation status of the slave unit 3 is examined, whereby the completion of the sequence of communication processing is recognized (the above description relates to claims 2, 33, and 56).

On the assumption that the slave units 3 are divided into a plurality of slave unit groups, each group consisting of a plurality of slave units 3, that the intermediate communication control unit 2 and each of the slave unit groups are connected together through the plurality of serial buses 4, and that the communication processing control section 23 is provided with a serial bus selecting section for selecting one of the serial buses 4 to be used when sending the transmission data or receiving the response data, it becomes possible to send or receive data (i.e., transmission data and response data) through any selected one of the serial buses 4 connected to the groups of slave units.

Consequently, when the intermediate communication control unit 2 examines the connection/operation status of a specific slave unit 3 in a certain slave unit group, it is only necessary for the intermediate communication control unit 2 to select a serial bus 4 connected to the group of slave units that include the corresponding slave unit 3 and to send data to, or receive data, from that slave unit 3 through the thus selected serial bus 4. The number of serial buses 4 in the communication control apparatus is not set so as to be equal to the number of slave units 3 but is reduced to a number equal to the number of slave unit groups (the above description relates to claims 3, 34, and 57).

The previously described memory section 21 is configured in such a way that the reception acknowledge data and the connection/operation status examination result data among the above described reception acknowledge data, the connection/operation status examination result data, and the reception end data are sequentially read out on the basis of a data read request signal from the master communication control unit 1 (after an interruption signal has been output from the interruption control section 28A).

So long as the master communication control unit 1 receives an interruption signal from the intermediate communication control unit 2 after the intermediate communication control unit 2 has finished the slave unit communication processing (i.e., the connection/operation status examination processing), it can check whether or not the slave units 3 are connected in a normal manner to the intermediate communication control unit 2 and whether or not the slave units operate normally by reading (acquiring) the reception acknowledge data and the connection/operation status examination result data from the memory section 21 at any time.

If the memory section 21 is configured such that the reception end data are read after the connection/operation status examination result data have been read, it will become possible for the master communication control unit 1, which reads (obtains) the reception end data, to constantly identify the end of the connection/operation status examination result data.

The above-described notification data comprises a notification identification code and slave unit number data. For this reason, it is possible to reliably send the data to the corresponding slave unit 3 (claims 6 and 60). The transmission end data comprises an end-of-block identification code and slave unit number data. Similarly, it is possible to reliably send the data to the corresponding slave unit 3. It becomes possible for the slave unit 3 that received the transmission end data to constantly recognize the end of the transmission of the data from the intermediate communication control unit 2.

Similarly, the reception end data comprises an end-of-block identification code and slave unit number data. Therefore, it is possible for the intermediate communication control unit 2 to know which of the slave units 3 has finished sending data (the response data) and to retain that information in the memory section 21.

Further, in the case of the communication control apparatus shown in FIG. 1, the communication processing control section 23 of the intermediate communication control unit 2 is provided with a reception data register in which a reception data amount is set. The interruption control section 28A may be arranged so as to output an interruption signal when the amount of the connection/operation status examination result data of the response data has reached the reception data amount set in the reception data register.

Even if the communication processing control section 23 of the intermediate communication control unit 2 does not receive any reception end data from the slave unit 3, the reception of the response data will be interrupted and an interruption signal will be automatically sent to the master communication control unit 1 when the communication processing control section 23 detects that the amount of the connection/operation status examination result data has reached a certain level.

The memory section 21 may be configured so as to store the notification data for notifying execution of connection/operation status examination processing, the command data for executing control/setting processing, control/setting data for control and setting purposes, and the transmission end data which represent the end of the transmission data, as the transmission data necessary to execute the control/setting processing of the previously described slave unit communication processing.

In that case, the transmission/reception section 22 of the intermediate communication control unit 2 is provided with a transmission data processing section 25B and a reception data processing section 26B, whereas the communication processing control section 23 is composed of a control signal generating section 24B, a data monitoring section 27B, and an interruption control section 28B, as shown in FIG. 1.

The transmission data processing section 25B of the transmission/reception section 22 sequentially reads the transmission data from the memory section 21 in order of the notification data, the command data, the control/setting data, and the transmission end data, in response to a control signal from the communication processing control section 23. The thus read transmission data are sent to the slave unit 3 via the transmission/reception section 22. The reception data processing section 26B writes the reception acknowledge data, which are received as the response data from the slave unit 3 through the transmission/reception section 22, to the memory section 21 in response to a control signal from the communication processing control section 23.

Upon reception of a control/setting processing request for requesting the slave unit 3 to execute control/setting processing from the master communication control unit 1, the control signal generating section 24B of the communication processing control section 23 generates a control signal for the transmission/reception section 22. The data monitoring section 27B monitors the state of the transmission and reception of the transmission data and response data. After the transmission end data have been transmitted, the data monitoring section 27B detects whether or not the reception end data have been written into the memory section 21. After the data monitoring section 27B has detected that the reception end data have been written into the memory section 21, the interruption control section 28B outputs an interruption signal to the master communication control unit 1.

In the previously described communication control apparatus, the master communication control unit 1 issues a control/setting processing request which requests the intermediate communication control unit 2 to execute control/setting processing. In response to this request, the intermediate communication control unit 2 sends the notification data, the command data, the control/setting data, and the transmission end data to the corresponding slave unit 3 in that order. The slave unit 3 then sends the reception acknowledge data as a response to the intermediate communication control unit 2.

When it has been confirmed that the intermediate communication control unit 2 has received the reception acknowledgement data, the intermediate communication control unit 2 outputs an interruption signal to the master communication control unit.

In the above described communication control apparatus, the intermediate communication control unit 2 sequentially sends the notification data, the command data, the control/setting data, and the transmission end data to the corresponding slave unit 3. The intermediate communication control unit 2 receives the reception acknowledge data as a response from the slave unit 3. As a result, the completion of the control/setting processing for the slave unit 3 is recognized.

On the assumption that the slave units 3 are divided into a plurality of slave unit groups, each group consisting of a plurality of slave units 3, that the intermediate communication control unit 2 and each of the slave unit groups are connected together through the plurality of serial buses 4, and that the communication processing control section 23 is provided with a serial bus selecting section for selecting one of the serial buses 4 which is used when sending the transmission data or receiving the response data, it becomes possible to send or receive data (i.e., transmission data and response data) through any selected one of the serial buses 4 connected to the groups of slave units.

Consequently, when the intermediate communication control unit 2 executes the previously described control/setting processing with regard to a specific slave unit 3 in a certain slave unit group, it is only necessary for the intermediate communication control unit 2 to select the serial bus 4 connected to the group of slave units that include the corresponding slave unit 3 and to send or receive data through the selected serial bus 4. The number of serial buses 4 in the communication control apparatus is not equal to the number of slave units 3 but is reduced to a number equal to the number of slave unit groups.

The previously described memory section 21 is configured in such a way that the above-described reception acknowledge data are read on the basis of a data read request signal from the master communication control unit 1 (after an interruption signal has been output from the interruption control section 28B).

The master communication control unit 1 can confirm whether or not the control/setting processing for the slave unit 3 has been normally carried out at any time by reading (obtaining) the reception acknowledge data from the memory section 21 so long as it receives an interruption signal from the intermediate communication control unit 2 after the intermediate communication control unit 2 has completed the slave unit communication processing (i.e., control/setting processing).

In this case as well, the above notification data comprises a notification identification code and slave unit number data. For this reason, it is possible to reliably send the data to the corresponding slave unit 3 (claims 13 and 67). The transmission end data comprises an end-of-block identification code and the slave unit number data. Similarly, it is possible to reliably send the data to the corresponding slave unit 3. It becomes possible for the slave unit 3 that received the transmission end data to constantly recognize the end of the transmission of the data from the intermediate communication control unit 2.

In the communication control apparatus, the communication processing control section 23 of the intermediate communication control unit 2 is provided with a transmission data register in which a transmission data amount is set. The interruption control section 28B may have a structure so as to output an interruption signal to the master communication control unit 1 when the amount of the control/setting data of the transmission data has reached the transmission data amount set in the transmission data register.

Even if the intermediate communication control unit 2 does not transmit the transmission end data from the slave unit 3, which represent the end of the transmission data, as a result of any trouble in the master communication control unit 1, the transmission of the transmission data will be interrupted and an interruption signal will be automatically sent to the master communication control unit 1 when the communication processing control section 23 detects that the amount of the transmitted control/setting data has reached a certain level.

As shown in FIG. 1, the above-described communication control apparatus may have the following structure. The transmission/reception section 22 is provided with a transmission data processing section 25C and a reception data processing section 26C, whereas the communication processing control section 23 is provided with a transmission data generating section 24C, a data monitoring section 27C, and an interruption control section 28C.

Upon reception of a simultaneous connection status examination processing request which is output from the master communication control unit 1 and which requests the execution of simultaneous connection status examination processing, among a plurality of kinds of slave unit communication processing, for all of the slave units 3, the transmission data processing section 24C of the communication processing control section 23 automatically generates, for all of the slave units 3, notification data for use in executing the simultaneous connection status examination processing, command data for use in executing the simultaneous connection status examination processing, and transmission end data which represent the end of the transmission data, as the transmission data necessary to carry out the simultaneous connection status examination processing.

The transmission data processing section 25C of the transmission/reception section 22 continuously and repetitively sends the transmission data to all of the slave units 3 through the transmission/reception section 22 in order of the notification data, the command data, and the transmission end data. The reception data processing section 26C sequentially writes the response data, which are received from the respective slave units 3 through the transmission/reception section 22 as a response to the transmission data, into the memory section 21 in order of the reception acknowledge data, the connection status examination result data, and the reception end data.

The data monitoring section 27C of the communication processing control section 23 monitors the state of the transmission and reception of the transmission data and response data. After the transmission end data have been transmitted, the data monitoring section 27C detects whether or not the reception end data have been written into the memory section 21. After the data monitoring section 27C has detected that the reception end data have been written into the memory section 21, the interruption control section 28C outputs an interruption signal to the master communication control unit 1.

In the communication control apparatus having the above-described structure, when the master communication control unit 1 issues a simultaneous connection status examination processing request which requests the intermediate communication control unit 2 to execute the simultaneous connection status examination processing, the intermediate communication control unit 2 continuously and sequentially sends the notification data, the command data, and the transmission end data to all of the corresponding slave units 3. Each of the slave units 3 sequentially sends the reception acknowledge data, the connection status examination result data, and the reception end data, as a response to the intermediate communication control unit 2.

When it has been confirmed that the intermediate communication control unit 2 had received the reception end data, the intermediate communication control unit 2 outputs an interruption signal from the interruption control section 28C to the master communication control unit 1.

In the above described communication control apparatus, the intermediate communication control unit 2 continuously and repetitively sends the notification data, the command data, and the transmission end data, in that order, to all of the corresponding slave units 3. The intermediate communication control unit 2 receives the reception acknowledge data, the connection status examination result data, and the reception end data, as responses from each slave unit 3. As a result, the completion of the simultaneous connection status examination processing for each slave unit 3 is recognized.

It is also possible to arrange the communication control apparatus as follows: Namely, the slave units 3 are divided into a plurality of slave unit groups, each group consisting of a plurality of slave units 3. The intermediate communication control unit 2 and each of the slave unit groups are connected together through the plurality of serial buses 4. The communication processing control section 23 is provided with a serial bus simultaneous designating section for designating all of the serial buses 4 as serial buses to be used when simultaneously sending the transmission data and receiving the response data through the respective serial buses 4. The reception data processing section 26C of the transmission/reception section 22 is provided with a multiplexing section for combining the response data which are simultaneously received through the serial buses 4 into multiplexed data by time-division multiplexing. The thus multiplexed data are sequentially written into the memory section 21.

In consequence, the intermediate communication control unit 2 can send the identical data (i.e., the transmission data and the response data), or receive them from, all of the slave units 3 at the same time by simultaneously using the serial buses 4 connected to the respective slave unit groups. As a result, it is possible to reduce the time required to complete the simultaneous connection status examination processing. In this case as well, the number of serial buses 4 in the communication control apparatus is not equal to the number of slave units 3 but is reduced to a number equal to the number of slave unit groups.

The previously described communication processing section 23 may be provided with a slave unit number register for holding the number of slave units in each slave unit group in order to cope with an increase or a decrease in the number of slave units in each slave unit group. As a result, if the number of slave units 3 in each slave unit group is increased or decreased, it will be possible to execute the simultaneous connection status examination processing without any trouble so long as the number of slave units in each slave unit group is stored in the slave unit number register.

The previously described memory section 21 is configured in such a way that the reception acknowledge data, the connection status examination result data, and the reception end data are sequentially read on the basis of a data read request signal from the master communication control unit 1 (after an interruption signal has been output from the interruption control section 28A).

The master communication control unit 1 can confirm whether or not each of the slave units 3 is normally carried out at any time by reading (obtaining) the necessary data (reception acknowledge data, connection status examination result data, and reception end data) from the memory section 21 so long as it receives an interruption signal from the intermediate communication control unit 2 after the intermediate communication control unit 2 has completed the slave unit communication processing (i.e., the simultaneous connection status examination processing).

In this case as well, the above notification data comprises a notification identification code and slave unit number data. For this reason, it is possible to reliably send the data to the corresponding slave unit 3 (claims 20 and 74). The transmission end data comprises an end-of-block identification code and the slave unit number data. Similarly, it is possible to reliably send the data to the corresponding slave unit 3. It becomes possible for the slave unit 3 that received the transmission end data to constantly recognize the end of the transmission of the data from the intermediate communication control unit 2.

Similarly, the reception end data comprises an end-of-block identification code and slave unit number data. Therefore, it is possible for the intermediate communication control unit 2 to know which of the slave units 3 has finished sending data (the response data) and to retain that information in the memory section 21.

Further, in the case where the communication processing control section 23 is provided with a priority determination section for determining the level of priority of the communication processing request received from the master communication control unit 1, communication processing can be preferentially executed for the communication processing request that has been judged as having the highest priority by the priority determination section. Therefore, it is possible to execute the communication processing for the higher-priority communication processing request which requires to be immediately executed without delay.

In the communication processing control section 23 which is provided with the priority determination section which determines the level of priority of the communication processing request received from the master communication control unit 1, if another communication processing request is received during the course of the execution of slave unit communication processing for a certain communication processing request, and if that communication processing request is determined as having a higher priority than the communication processing request which is currently being executed, slave unit communication processing for that higher-priority communication processing request is executed, without interrupting the slave unit communication processing currently being executed, after the sequence of communication processing operations have been completed. Accordingly, it is possible to definitely distinguish the communication data obtained as a result of execution of the higher-priority communication processing from the communication data obtained as a result of the communication processing which was initially executed.

In the case of the above arrangement, when the slave unit communication processing for another higher-priority communication processing request has been completed, the communication processing control section 23 outputs an interruption signal to the master communication control unit 1. Hence, it is possible to prevent a plurality of interruption signals from being output to the master communication control unit simultaneously. Consequently, it is possible to prevent the master communication control unit 1 to read the communication data from the memory section 21 while the intermediate communication control unit 2 is executing higher-priority communication processing.

Upon reception of a highest-priority communication processing request (e.g., a remote test access request from a remote terminal device capable of remote-controlling the master communication control unit 1) from the master communication control unit 1 during the course of the execution of slave unit communication processing for a certain communication processing request, the above described communication processing control section 23 immediately terminates the slave unit communication processing currently being executed by stopping the clock used by that communication processing.

If the communication processing control section 23 is further provided with a plurality of interruption registers for retaining the type of interruption according to the type of communication, and a logical OR element which performs logical OR operation on outputs from the interruption registers, it will be possible to output the result of the logical OR operation to the master communication control unit 1 as an interruption signal.

At this time, each of the interruption registers has a structure so as to response to an interruption type read request from the master communication control unit 1, thereby outputting a corresponding interruption type to the master communication control unit 1. It is possible for the master communication control unit 1 to know the slave unit for which the communication processing (i.e., connection/operation status examination processing, control/setting processing, and simultaneous connection status examination processing) has been completed.

If the previously described communication processing control section 23 is provided with a timer register in which a predetermined period of time is set, it is possible to execute the slave unit communication processing for a communication processing request received from the master communication control unit 1 after the lapse of the predetermined period of time set in the timer register. Therefore, it is possible to compensate for the difference between the speed of operation of the master communication control unit 1 and the speed of the communication processing of the slave unit.

Figure 2:
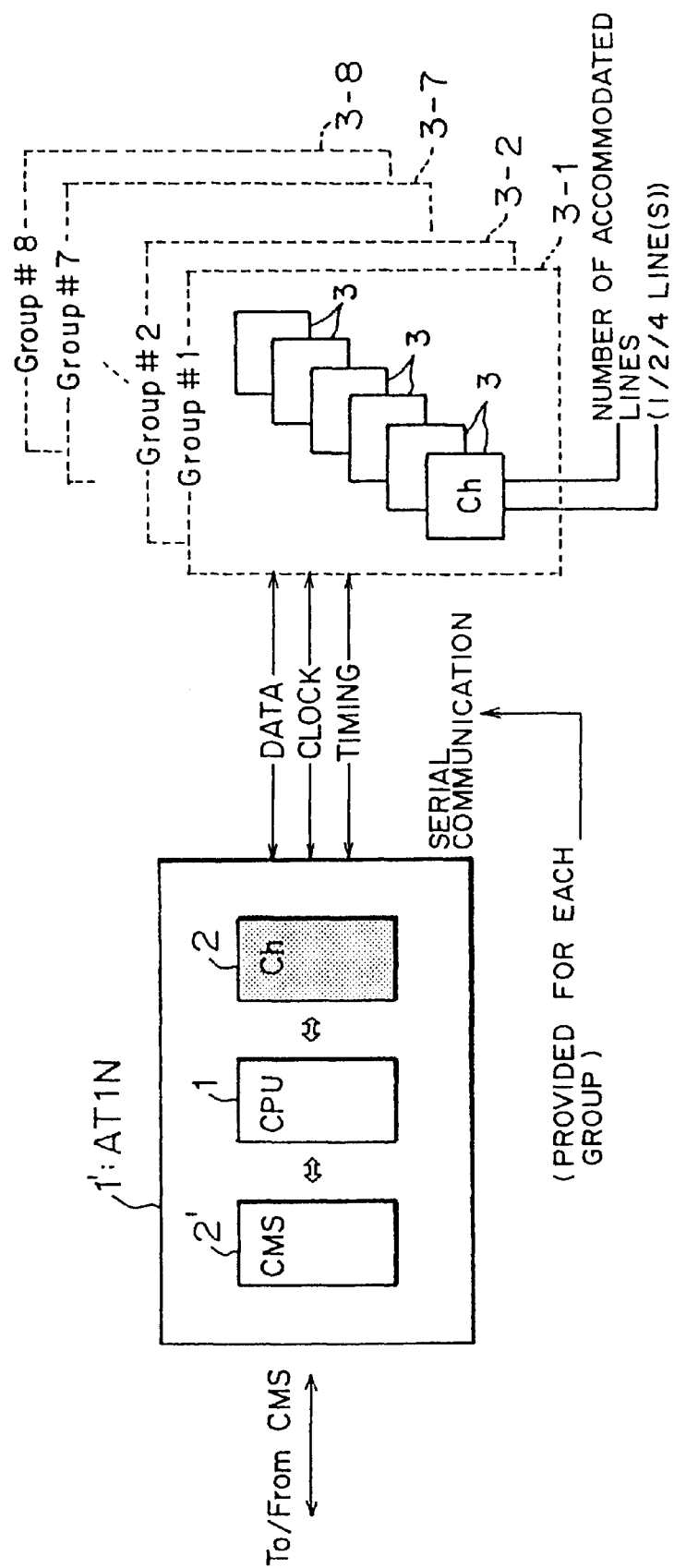
FIG. 2 is a block diagram showing the configuration of a communication control apparatus according to one embodiment of the present invention.
Figure 52:
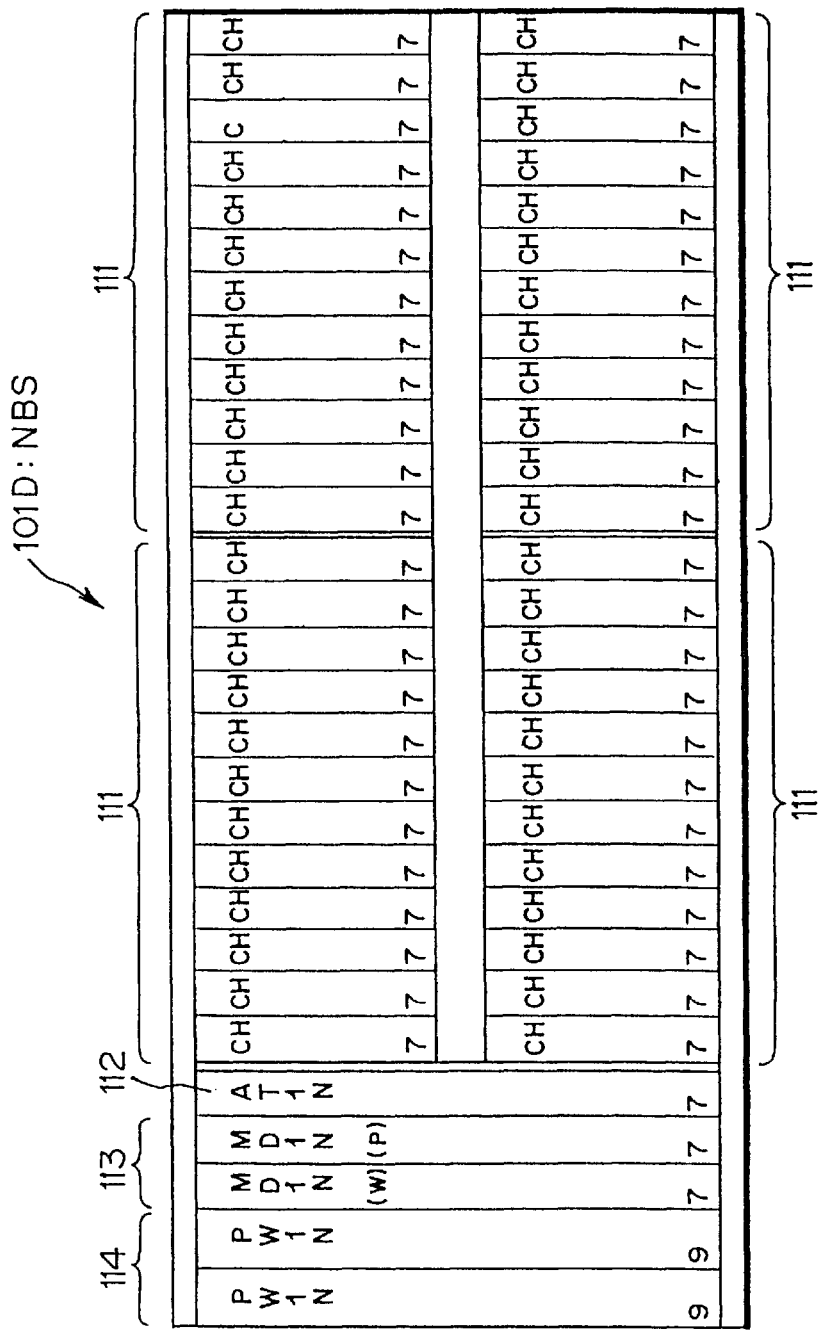
FIG. 52 is a block diagram showing the detail configuration of a narrow-band shelf (NBS) used in a common optical communication system.

FIG. 2 is a block diagram showing the configuration of a communication control apparatus according to one embodiment of the present invention. In FIG. 2, numeral 1' is a communication control section (AT1N), and numeral 3 is a channel unit (Ch: slave unit) capable of accommodating one, two, or four subscriber lines. These communication control section and the channel units are applied to a narrow-band shelf (NBS) 101D shown in FIG. 52. In the present embodiment, a total of 48 channel units 3 are divided into eight groups (Group #1, #2, . . . #8) 3-1 to 3-8, each group comprising six channel units. For example, each of the groups 3-1 to 3-8 is connected to the communication control section 1' through a serial bus (DATA) 4 for data transmission, a clock signal line 5 for clock transmission, and a timing signal line 6 for frame pulse transmission, as shown in FIG. 3.

Figure 51:
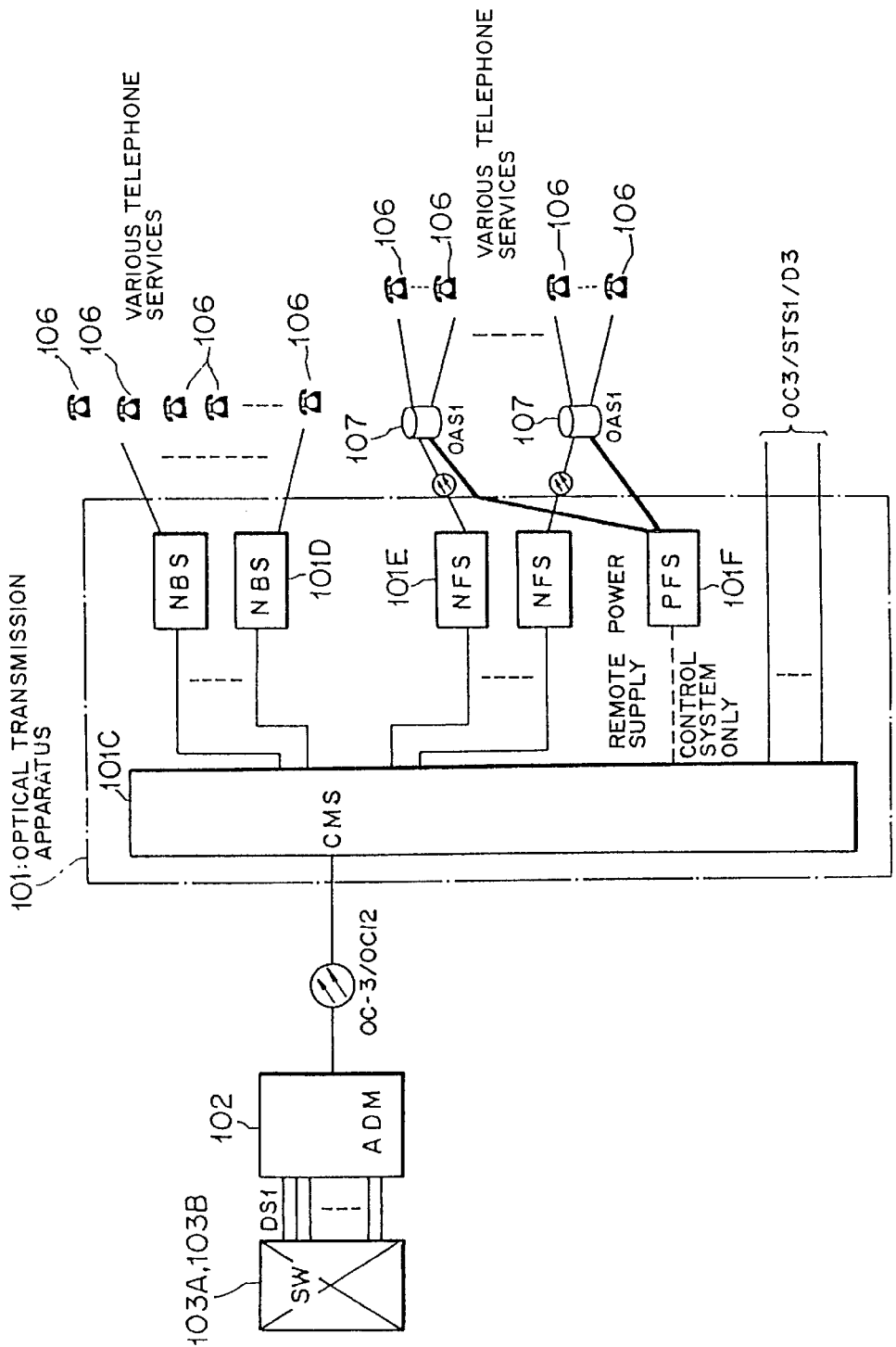
FIG. 51 is a block diagram showing an example of a common optical communication system.

The communication control section 1' notifies a common shelf (CMS) 101C (see FIG. 51) of information which is obtained from the 48 channel units 3 through communication therewith. As a result, it becomes possible for a local terminal connected to the common shelf 101C to carry out control and monitor operations or it becomes possible for a remote terminal which utilizes overhead bits on a transmission line to remotely perform control and monitor operations. The communication control section 1' is provided with a CPU 1, a channel unit control apparatus 2, and a common shelf control apparatus 2'.

The CPU (a master communication control unit) 1 executes communication control for the common shelf 101C, which is connected to the CPU 1 as a higher-level unit, and the channel units 3, which are connected to the CPU 1 as lower-level units. The channel unit control apparatus (an intermediate communication control unit) 2 executes communication control (primarily the control of transmission of communication data to and reception of communication data from each of the channel units 3) for each channel unit 3 instead of the CPU 1 in response to a communication processing request from the CPU 1.

Figure 3:
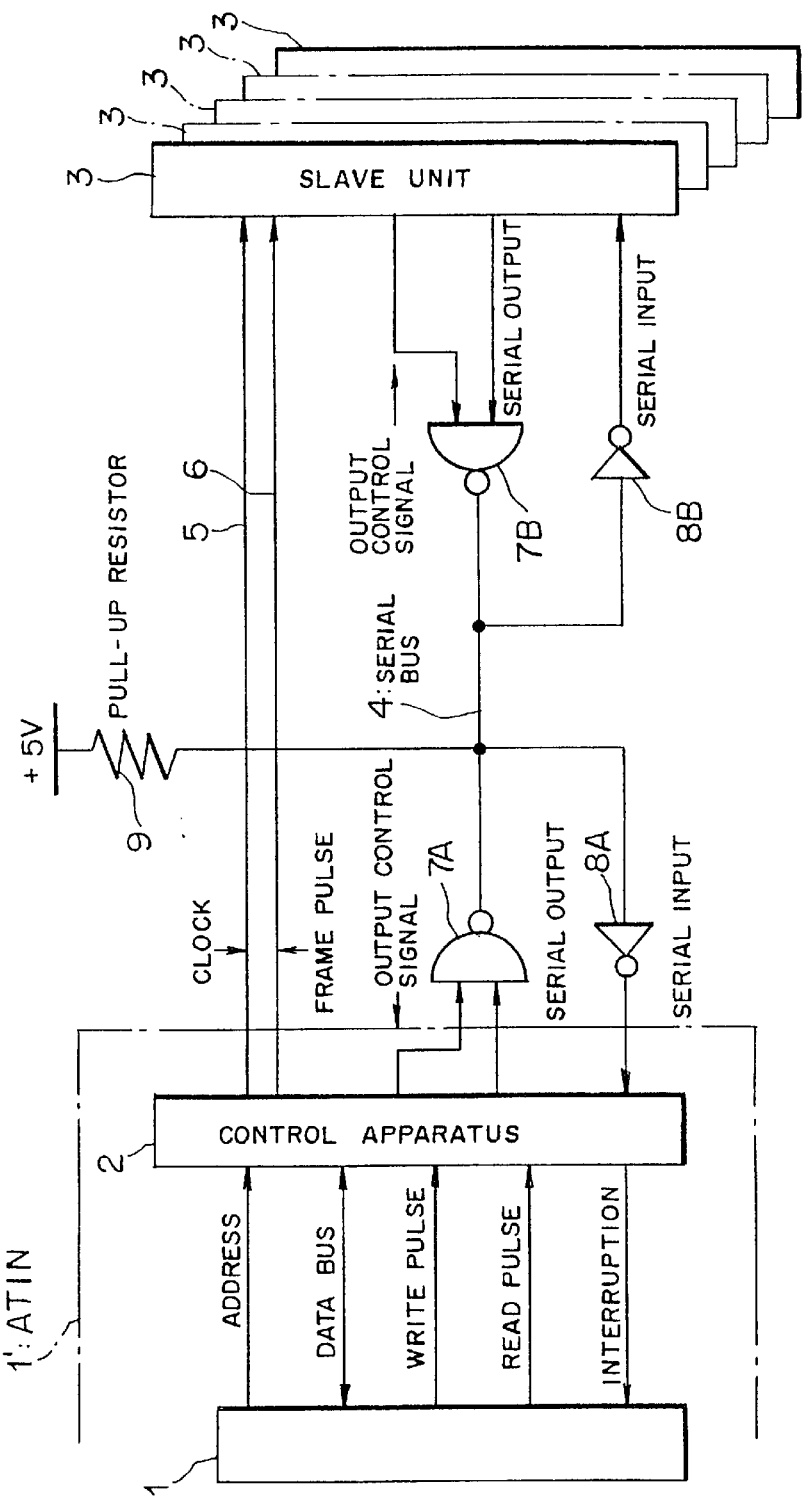
FIG. 3 is a block diagram showing the configuration of the communication control apparatus according to the embodiment.

To this end, the channel unit control apparatus 2 receives the communication data necessary to carry out communication processing for each channel unit 3 from the CPU 1 through a data bus, as shown in FIG. 3. The thus received communication data are sequentially stored in an unillustrated internal memory at a corresponding address according to a write signal (a write pulse). The channel unit control apparatus 2 executes communication processing for the channel unit 3 on the basis of the communication data. Upon completion of the communication processing, the channel unit control apparatus notifies the CPU 1 of the completion of the communication processing using an interruption signal. The communication data in the memory are sequentially read out according to a read signal (a read pulse) from the CPU 1.

The common shelf control apparatus 2' carries out communication control for the common shelf (CMS) 101C in response to a communication processing request from the CPU 1.

In FIG. 3, numerals 7A and 7B denote NAND gates, numerals 8A and 8B denote inverters for inverting the polarity of an input signal, and numeral 9 denotes a pull-up resistor connected to the serial bus 4. The NAND gates 7A and 7B are controlled by output control signals output from the channel unit control apparatus 2 and the channel unit 3 so as to prevent the data (a serial output) sent from the communication control section 1' and the data (a serial input) sent from the channel unit 3 from interfering with each other on the serial bus 4.

Specifically, the data sent from the communication control section 1' are output to the channel unit 3 through the NAND gate 7A and the inverter 8B. On the other hand, the data sent from each channel unit 3 are input to the communication control section 1' via the NAND gate 7B and the inverter 8A.

Figure 4:
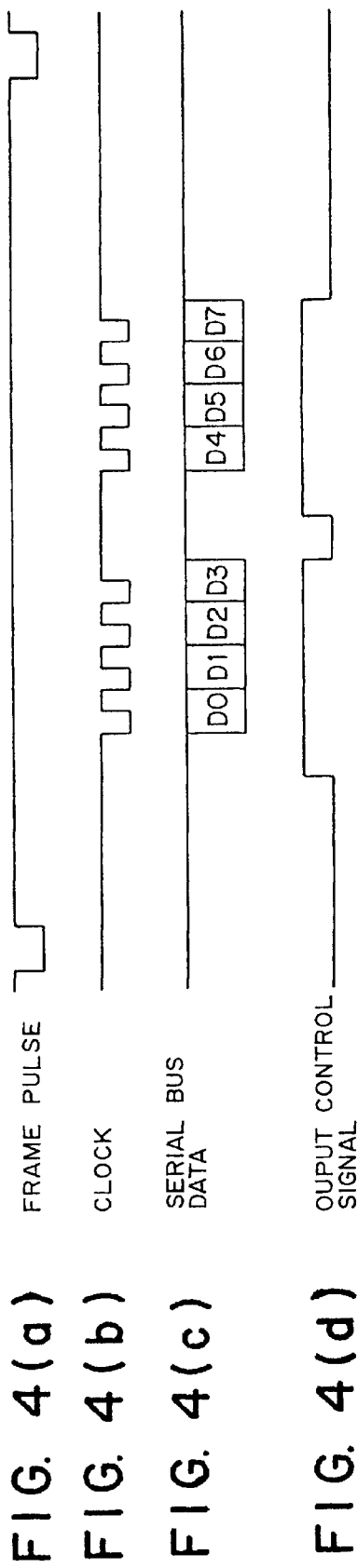
FIGS. 4(a) to 4(d) are timing charts for explaining the operation of the communication control apparatus of the embodiment.

For example, when an output control signal is output from the channel unit control apparatus 2 with timing as shown in FIG. 4(d) on the basis of frame pulses as shown in FIG. 4(a) and clocks as shown in FIG. 4(b), the NAND gate 7A is turned on, and the NAND gate 7B is turned off. As a result, the data sent from each channel unit 3 from being sent, and serial bus data (D0-D3 and D4-D7) shown in FIG. 4(c), for example, are output as the transmission data of the communication control section 1' to the channel unit 3 through the NAND gate 7A, the serial bus 4, and the inverter 8B.

Figure 5:
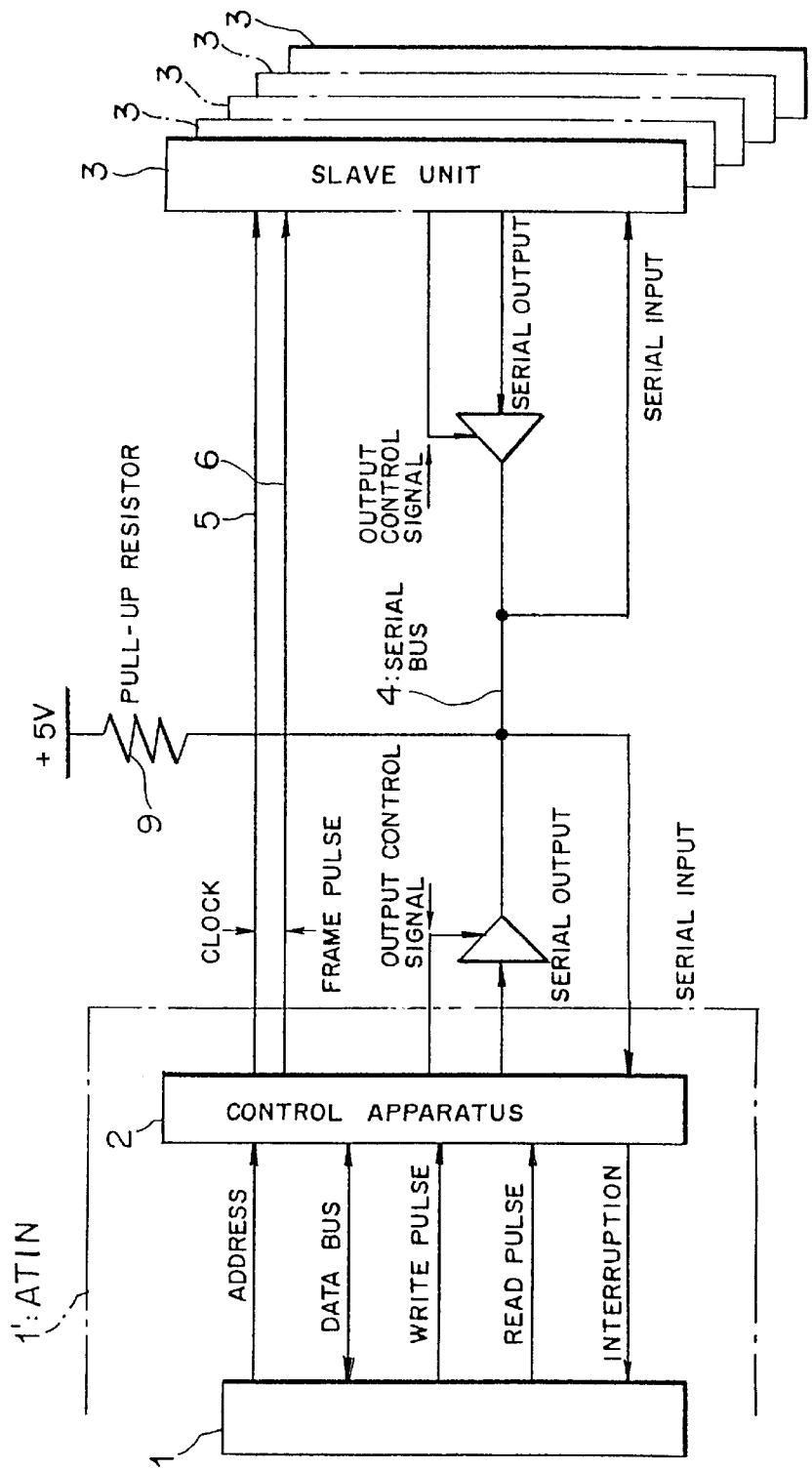
FIG. 5 is a block diagram showing another configuration of the communication control apparatus of the embodiment.

When bus gates 7A' and 7B' shown FIG. 5 are used in lieu of the NAND gates 7A and 7B of the circuit configuration shown in FIG. 3, the inverters 8A and 8B can be omitted. In consequence, the master communication control section 1' and each channel unit 3 can be connected to each other with a simpler circuit configuration. In the present embodiment, the previously described communication control section 1' (the CPU 1 and the channel unit control apparatus 2) is miniaturized and packaged into a high-density LSI chip.

Figure 6:
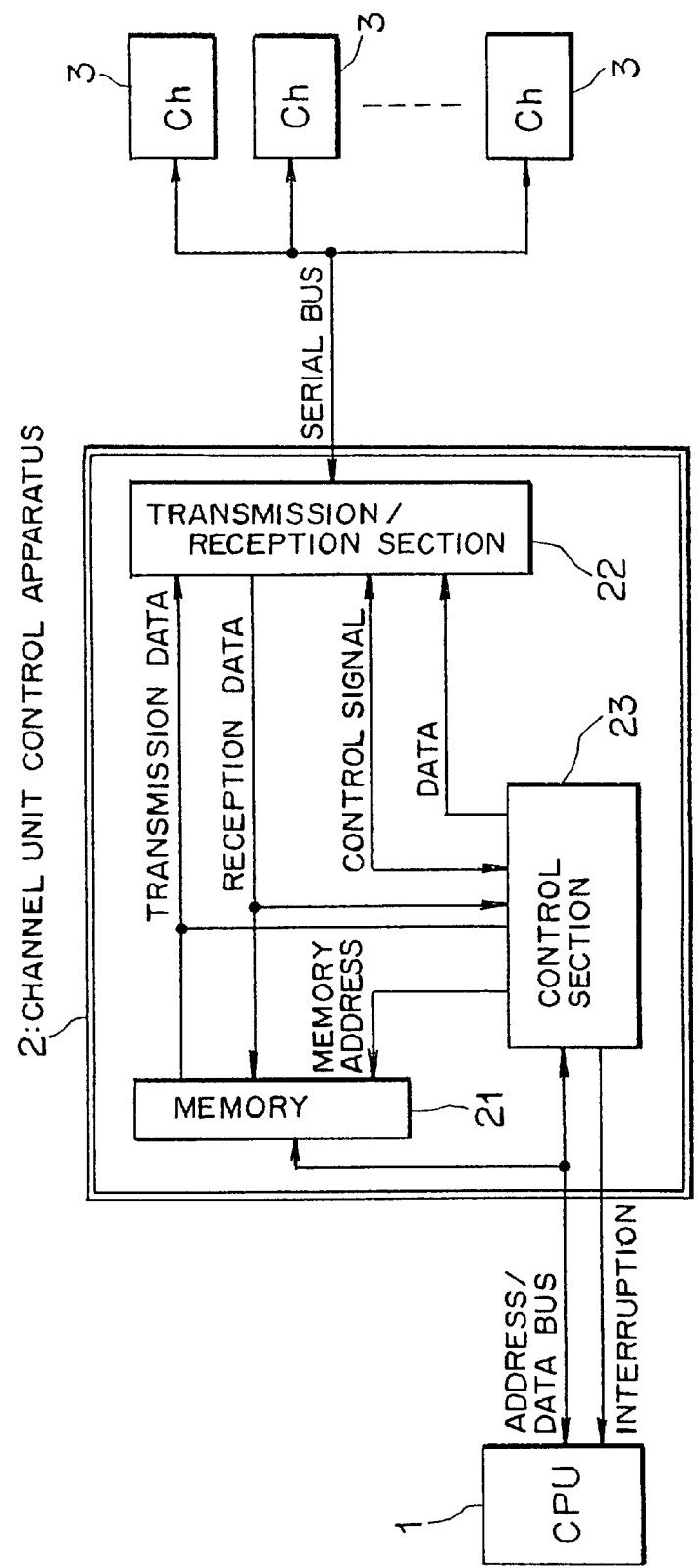
FIG. 6 is a block diagram showing the configuration of a channel unit control apparatus in the communication control apparatus of the embodiment.

FIG. 6 is a block diagram showing the configuration of the previously described channel unit control apparatus 2. As shown in FIG. 6, the channel unit control apparatus (hereinafter sometimes simply referred to as a control apparatus) 2 comprises a memory section 21, a transmission/reception section 22, and a controller section 23.

The memory section 21 stores communication data (specifically, transmission data to be sent to each channel unit 3 and response data sent from the channel unit 3 in response to the transmission data) necessary to execute communication processing (communication processing for a slave unit) for the channel unit 3. The communication data are stored for each type of communication processing such as automatic scanning processing (simultaneous mount status examination processing), control processing (control/setting processing), and monitoring processing [mount (connection)/operation status examination processing]. For example, the memory section 21 comprises a data storage area 21A for automatic scanning processing (hereinafter simply referred to as auto scan), a data storage area 21B for control processing (hereinafter referred to as a control sequence), and a data storage area 21C for monitoring processing (hereinafter referred to as a monitor sequence).

The data storage area 21B for control sequence use is further provided with a transmission data memory area 212 and a reception data (response data) memory area 213. The data storage area 21C for monitor sequence use is also provided with a transmission data memory area 214 and a reception data memory area 215. As will be described later, transmission data for auto scan are automatically produced in the control apparatus 2. For this reason, the data memory area 21A for auto scan is only provided with a reception data memory area 211.

The transmission/reception section 22 serves to send the communication data (i.e., transmission data and response data) to, or received them, from the channel units 3, as shown in FIG. 6. The transmission/reception section 22 converts parallel data sent from the memory section 21 into serial data through parallel/serial (P/S) conversion, as well as converting serial data received from each channel unit 3 into parallel data through serial/parallel (S/P) conversion under control of the controller section 23.

The controller section (communication processing control section) 23 executes reception of a communication request from the CPU 1, priority determination, address control for the memory section 21, and control of the transmission/reception section 22. Upon reception of a communication processing request from the CPU 1, the controller section 23 sends desired transmission data to a corresponding channel unit 3 in a predetermined order through the transmission/reception section 22 according to the type of the communication processing request (i.e., control sequence, monitor sequence, and auto scan). Further, the controller section 23 writes the data, which are received as a response to the transmission data in a predetermined order from the corresponding channel unit 3 through the transmission/reception section 22, into the memory section 21. Any one of the control sequence, the monitor sequence, and the auto scan is resultantly executed. When a sequence of communication processing operations have been completed, the controller section 23 notifies the CPU 1 of the completion of the communication processing using an interruption signal.

Specifically, the controller section 23 previously receives the following data as the transmission data necessary to execute the control sequence or the monitor sequence from the CPU 1. The thus reception data are written into corresponding regions (i.e., the transmission data memory areas 212 or 214) of the memory section 21. Further, the controller section 23 receives the following data from the channel units 3 during the course of the execution of the auto scan, the control sequence, and the monitor sequence. The thus reception data are written into corresponding areas (i.e., the reception data memory areas 211, 213, and 215) of the memory section 21.

As for the transmission data necessary to carry out the auto scan, the following data are automatically generated for all of the channel units 3 when an auto scan execution request (i.e., an auto scan start trigger) is received. The data are not written into the memory section 21, and they are sent to all of the channel units 3.

Transmission data when a control sequence is carried out (four types of data):

(1) "CHAD" (Channel Address: notification data for notifying execution of the sequence), (2) "ID" (Command Data for executing a sequence), (3) "DATA" (Data for controlling and setting purposes), and (4) "EBL" (End of Block: Transmission end data which represents the end of the transmission data).

Reception data when the control sequence is carried out (one type of data):

(1) "ACK" (Acknowledge: reception acknowledge data)

Transmission data when the monitor sequence is carried out (three types of data):

(1) "CHAD", (2) "ID", (3) "EBL" (Transmission end data)

Received data when the monitor sequence is carried out (three types of data):

(1) "ACK", (2) "DATA" (Monitoring result data), (3) "EBL" (Reception end data which represent the end of reception data)

Transmission data when the auto scan is carried out (three types of data: automatically generated):

(1) "CHAD", (2) "ID", (3) "EBL" (Transmission end data)

Reception data when the auto scan is carried out (three types of data):

(1) "ACK", (2) "DATA" (Mount state examination result data), (3) "EBL" (Reception end data)

"CHAD" has a format comprising a three-bit "CHAD" code (identification code: 000) which represents that data (eight bits of D0–D7 here) are "CHAD", and a four-bit channel unit number (Channel Number), as shown in FIG. 9(a). "ACK" has a format comprising a three-bit "ACK" code (identification code: 001) which represents that data are "ACK", and a four-bit channel unit number, as shown in FIG. 9(b).

Similarly, "ID" has a format comprising a three-bit command code (identification code; 010) which represents that data are "ID", and four-bit command data which specify the type of command (the type of communication), as shown in FIG. 9(c). "DATA" has a format comprising a one-bit data code (identification code: 1) which represents that the data themselves are control/setting data and mount status examination result data, or the like, and the contents of actual data (remaining one to seven bits) (control/setting data, and mount/operation status examination result data), as shown in FIG. 9(e). "EBL" has a format comprising a three-bit "EBL" code (identification code: 011) which represents that data are "EBL", and a four-bit channel unit number which represents the identification of the channel unit 3 from which "EBL" has been sent, as shown in FIG. 9(d).

Therefore, the control apparatus 2 and each channel unit 3 identify "CHAD", "ACK", "ID" and "EBL" on the basis of the bit information of three uppermost bits of each communication data item. Further, the control apparatus 2 and each channel unit 3 can identify communication data whose most significant bit is "1" as data. Thus, data can be properly sent to or received from a desired channel unit 3.

Figure 18:
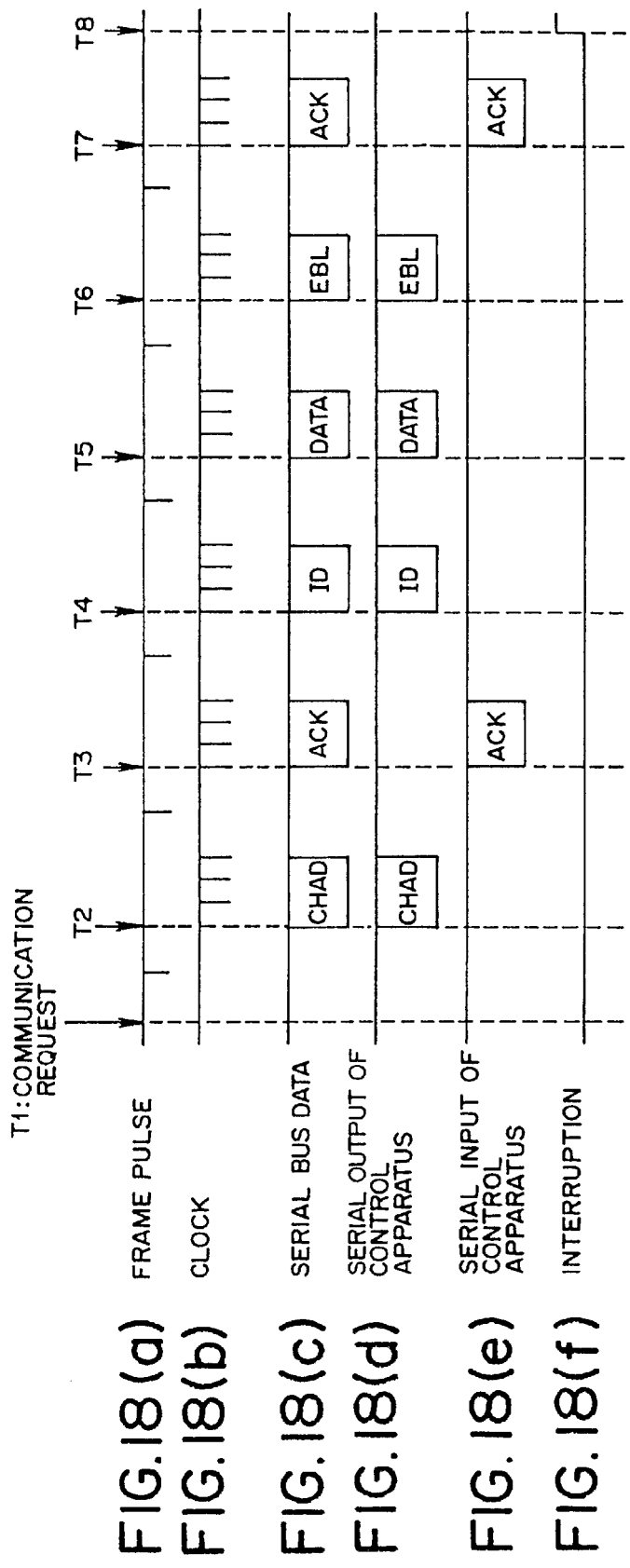
FIGS. 18(a) to 18(f) are timing charts for explaining control sequence processing according to the embodiment.

For example, when the control apparatus 2 carries out the control sequence for a certain channel unit 3, "CHAD", "ACK", "ID", "DATA", "EBL", and "ACK" are exchanged between the control apparatus 2 and the channel unit 3, as shown in FIG. 18(c). The operation of the control apparatus 2 and the channel unit 3 carried out at that time will be briefly described. Upon reception of a control sequence execution request from the CPU 1 (time T1 in FIG. 18), the control apparatus 2 sends "CHAD" [time T2 in FIG. 18(d)] to a corresponding channel unit 3 in accordance with frame pulses [see FIG. 18(a)] and clock pulses [see FIG. 18(b)] both generated in the control apparatus 2. When the channel unit 3 which has received "CHAD" operates properly, the channel unit sends "ACK" back to the control apparatus 2 as a response [time T3 in FIG. 18(e)].

Further, upon reception of "ACK", the control apparatus 2 sends "ID" for use in executing the control sequence [time T4 in FIG. 18(d)], "DATA" (control/setting data) [time T5 in FIG. 18(d)], and "EBL" [time T6 in FIG. 18(d)] to the channel unit 3 in that order. Upon reception of "EBL", the channel unit 3 again sends "ACK" back to the control apparatus 2 as a response [time T6 in FIG. 18(e)]. Upon reception of "ACK", the control apparatus 2 notifies the CPU 1 of the completion of a sequence of communication processing using an interruption signal [time T8 in FIG. 18(f)].

Figure 19:
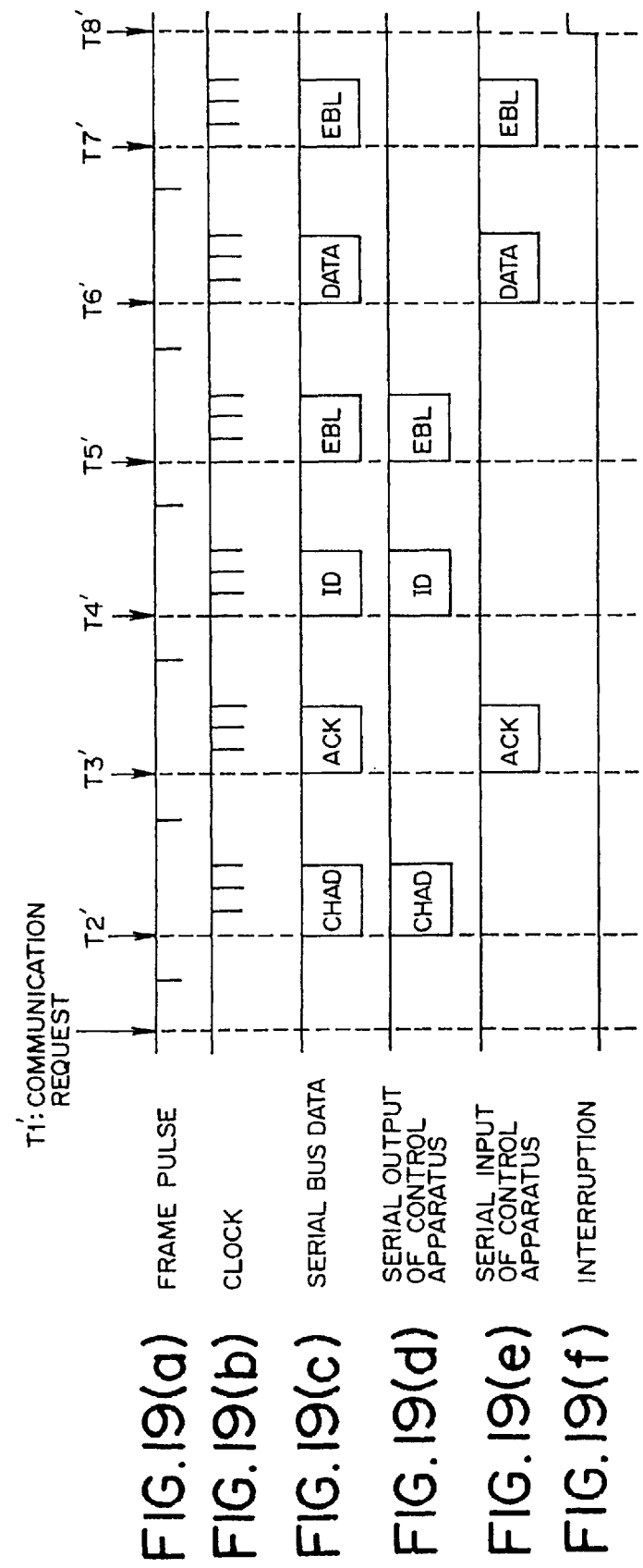
FIGS. 19(a) to 19(f) are timing charts for explaining monitor sequence processing according to the embodiment.

When the control apparatus 2 carries out the monitor sequence for a certain channel unit 3, "CHAD", "ACK", "ID", "EBL", "DATA", and "EBL" are exchanged between the control apparatus 2 and the channel unit 3, as shown in FIG. 19(c). The operation of the control apparatus 2 and the channel unit 3 carried out at that time will be briefly described. Upon reception of a monitor sequence execution request from the CPU 1 (time T1 in FIG. 19), the control apparatus 2 sends "CHAD" [time T2' in FIG. 19(d)] to a corresponding channel unit 3 in accordance with frame pulses [see FIG. 19(a)] and clock pulses [see FIG. 19(b)] similar to the previously described frame and clock pulse signals. When the channel unit 3 which has received "CHAD" operates properly, the channel unit sends "ACK" back to the control apparatus 2 as a response [time T3' in FIG. 19(e)].

Further, upon reception of "ACK", the control apparatus 2 sends "ID" for use in executing the monitor sequence [time T4' in FIG. 19(d)] and "EBL" [time T5' in FIG. 19(d)] to the channel unit 3 in that order. Upon reception of "EBL", the channel unit 3 again sends "DATA" (monitoring result data) back to the control apparatus 2 as a response [time T6' in FIG. 19(e)]. Subsequently, the channel unit 3 sends "EBL" to the control apparatus 2 [time T7' in FIG. 19(e)]. Upon reception of "EBL", the control apparatus 2 notifies the CPU 1 of the completion of a sequence of communication processing using an interruption signal [time T8' in FIG. 19(f)].

The auto scan (the monitor sequence to all of the channel units 3) is carried out by repeatedly exchanging the above described data (i.e., "CHAD", "ACK", "ID", "EBL", "DATA", and "EBL") between the control apparatus 2 and all of the channel units 3.

Figure 11:
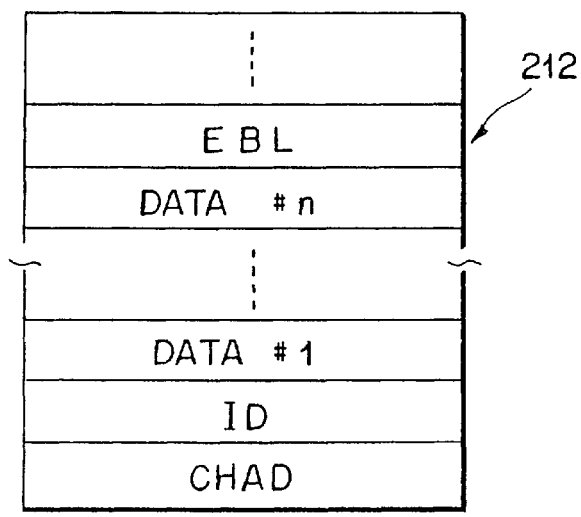
FIG. 11 is a diagram showing an example of the format of a control sequence transmission data memory area according to the embodiment.
Figure 12:
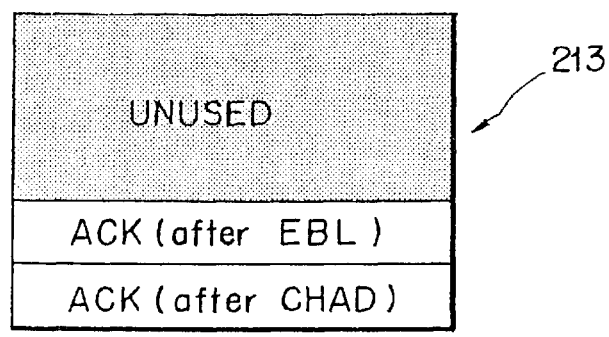
FIG. 12 is a diagram showing an example of the format of a control sequence reception data memory area according to the embodiment.

To this end, the memory areas 211 to 215 of the memory section 21 have formats as shown in FIGS. 11 to 15. For example, transmission data ("CHAD", "ID", "DATA", and "EBL") used when the control sequence is carried out are sequentially written into the transmission data memory area 212 in such an order as shown in FIG. 11. The reception data ("ACK") are written, as a response to the transmission data, into the reception data memory area 213 as shown in FIG. 12.

In this event, "ACK" received after the transmission of "CHAD" [time T3 in FIG. 18(e)] and "ACK" received after the transmission of "EBL" [time T7 in FIG. 18(e)] are written into the reception data memory area 213. As a result, "ACK" data are sequentially read from the memory section 21 in response to a data read request from the CPU 1, which makes it possible for the CPU 1 to reliably recognize the proper execution of the control sequence.

Figure 13:
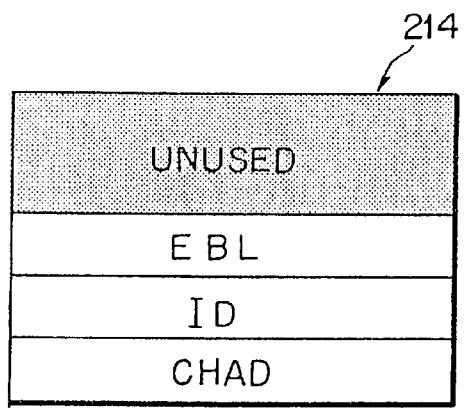
FIG. 13 is a diagram showing an example of the format of a monitor sequence transmission data memory area according to the embodiment.
Figure 14:
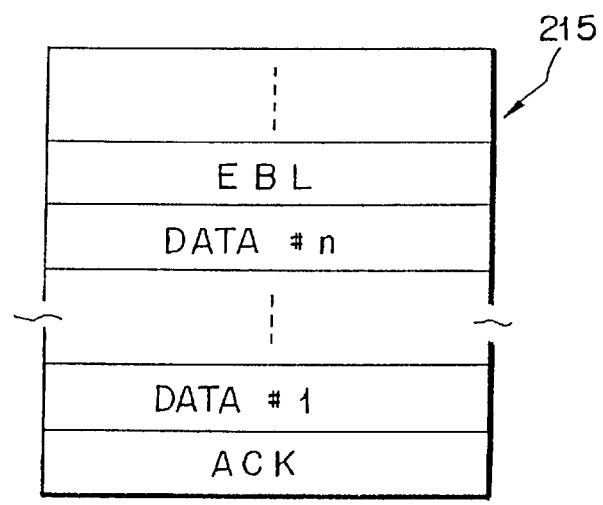
FIG. 14 is a diagram showing an example of the format of a monitor sequence reception data memory area according to the embodiment.

The transmission data ("CHAD", "ID", and "EBL") used at the time of execution of the monitor sequence are written into the transmission data memory area 214 in such an order as shown in FIG. 13. On the other hand, the reception data ("ACK", "DATA", and "EBL") which are responses to the transmission data are written into the reception data memory area 215 in such an order as shown in FIG. 14.

Figure 15:
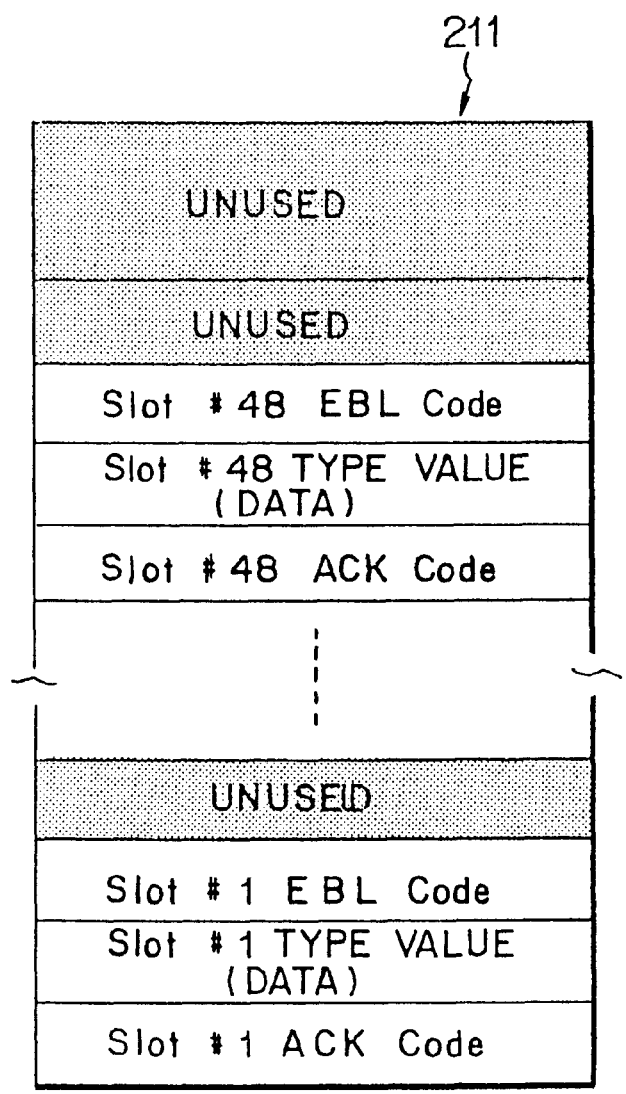
FIG. 15 is a diagram showing an example of the format of an auto scan reception data memory area according to the embodiment.

The reception data ("ACK", "DATA", and "EBL") received from all of the channel units 3 at the time of the execution of the auto scan are sequentially written into the reception data memory area 211 for each channel unit (slot) 3, as shown in FIG. 15.

" ACK", "DATA", and "EBL" are sequentially read from the memory section 21 in response to the data read request from the CPU 1. As a result, it becomes possible for the CPU 1 to reliably recognize the mount/operation status of the channel unit 3 from "ACK" and "DATA", as well as constantly identifying the end of "DATA" from "EBL".

Figure 7:
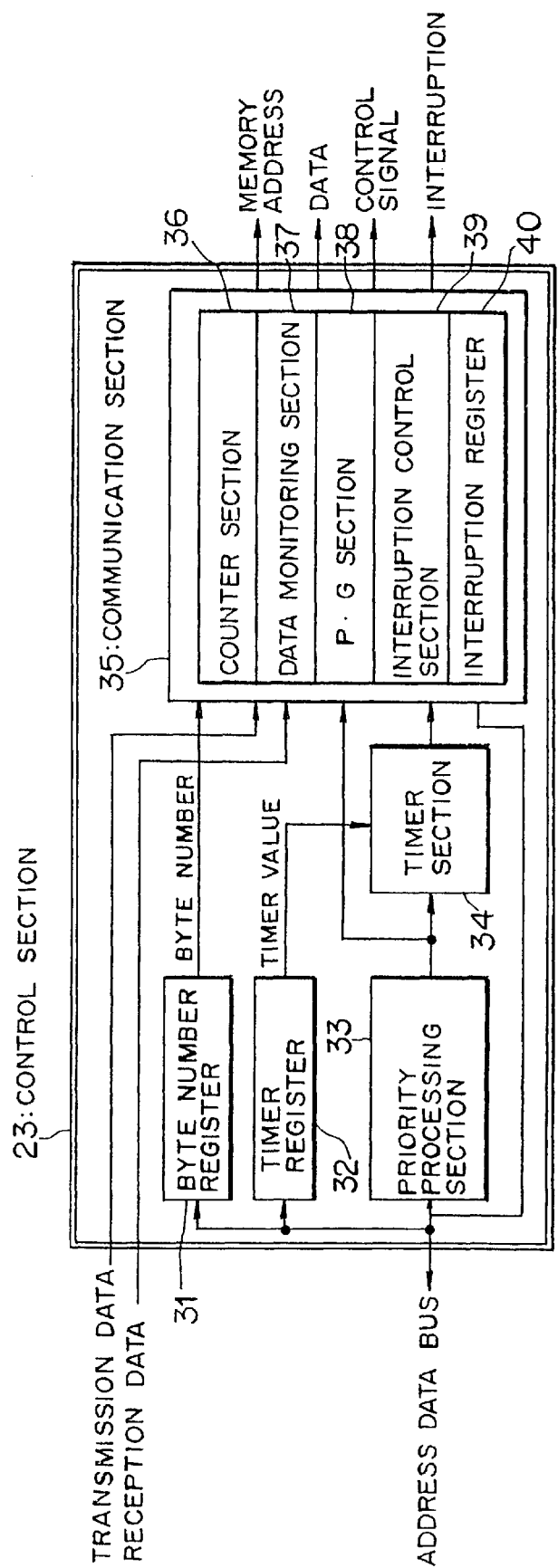
FIG. 7 is a block diagram showing the configuration of a controller section in the channel unit control apparatus of the embodiment.

FIG. 7 is a block diagram showing the configuration of the previously described controller section 23. As shown in FIG. 7, the controller section 23 comprises a byte number register 31, a timer register 32, a priority processing section 33, a timer section 34, and a communication section 35.

The byte number register 31 retains a preset byte number which is received from the CPU 1 and which represents a number of bytes to be transmitted or received, in order to prevent the controller section 23 from running away, which would otherwise occur when a data monitoring section 37, which will be described later, cannot detect "EBL" in transmission data or reception data. When the number of bytes of the transmission data or the number of bytes of the reception data reaches the corresponding preset byte number, the communication section 35 automatically terminates the transmission of the transmission data or reception of the reception data.

Figure 20:
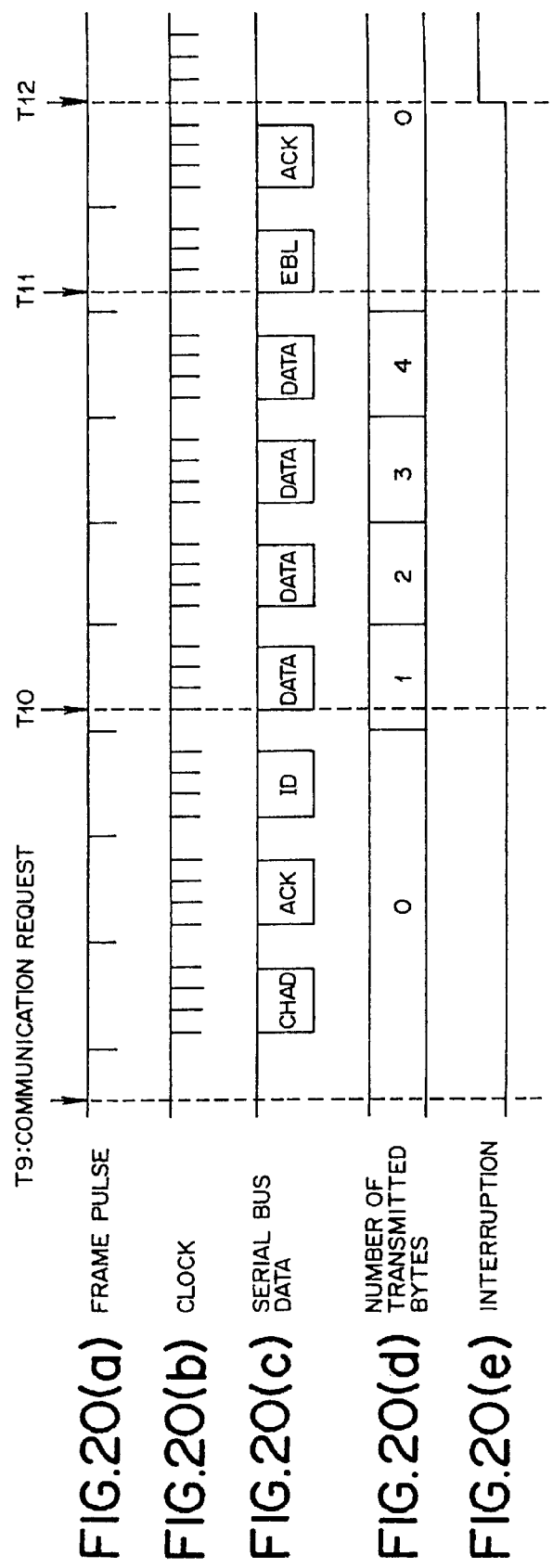
FIGS. 20(a) to 20(e) are timing charts for explaining control sequence processing according to the embodiment.

The case will be considered where the control apparatus 2 carries out a control sequence in a state in which "7" is set in the byte number register 31 as a transmission byte number. In a normal operation, the control apparatus 2 receives transmission data ("CHAD", "ID", "DATA", and "EBL") from the CPU 1 in advance, and stores the thus reception data in the transmission data memory area 212 (see FIG. 11) for control sequence use in the memory section 21. Upon reception of a control sequence execution request (hereinafter referred to as a control command) from the CPU 1 (time T9 in FIG. 20), the control apparatus 2 starts to send "DATA" [time T10] after the transmission of "CHAD", the reception of "ACK", and the transmission of "ID", shown in FIG. 20(c), in accordance with frame pulses [see FIG. 20(a)] and clock pulses [see FIG. 20(b)].

In this case, since the control apparatus 2 can properly send "EBL" (time T11), the transmission of "DATA" is completed at that time in time, that is, before the number of transmitted bytes reaches seven, as shown in FIG. 20(d). Similarly, after having received "ACK" from the channel unit 3 (time T12), the control apparatus 2 outputs an interruption signal to the CPU 1, as shown in FIG. 20(e).

Figure 21:
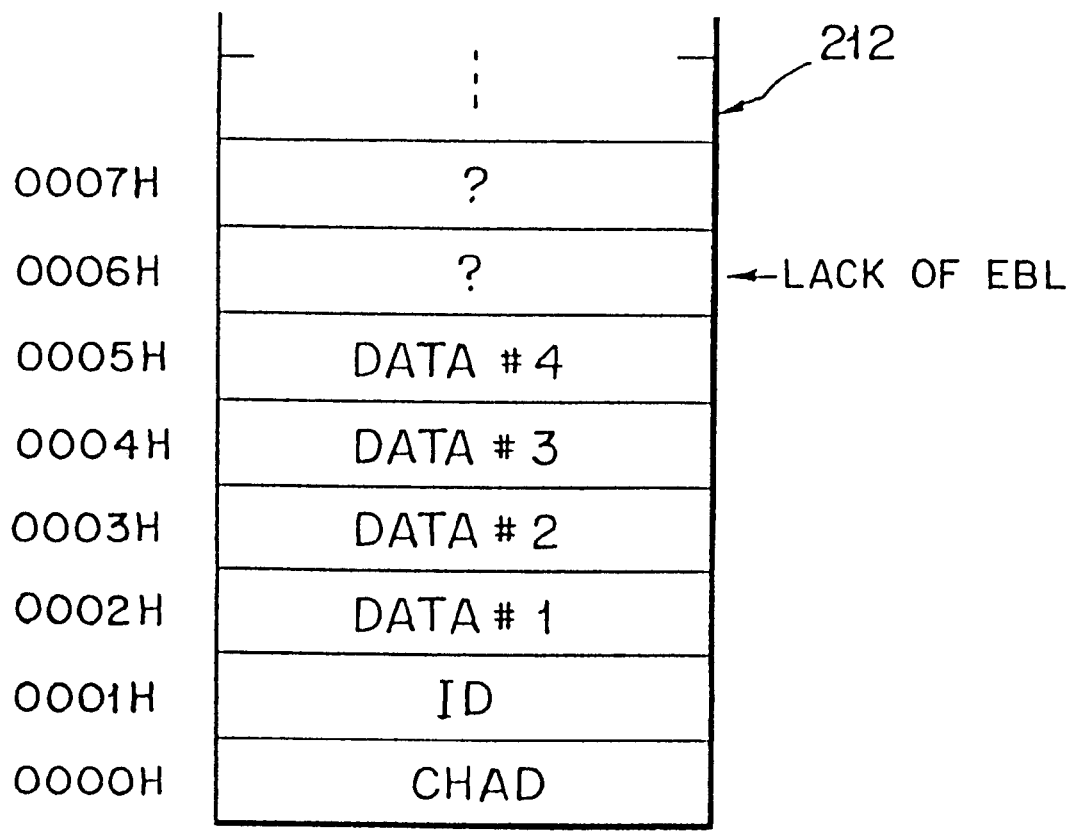
FIG. 21 is a diagram showing an example of the storage of data in the memory section when the control sequence is executed (in abnormal conditions) according to the embodiment.
Figure 22:
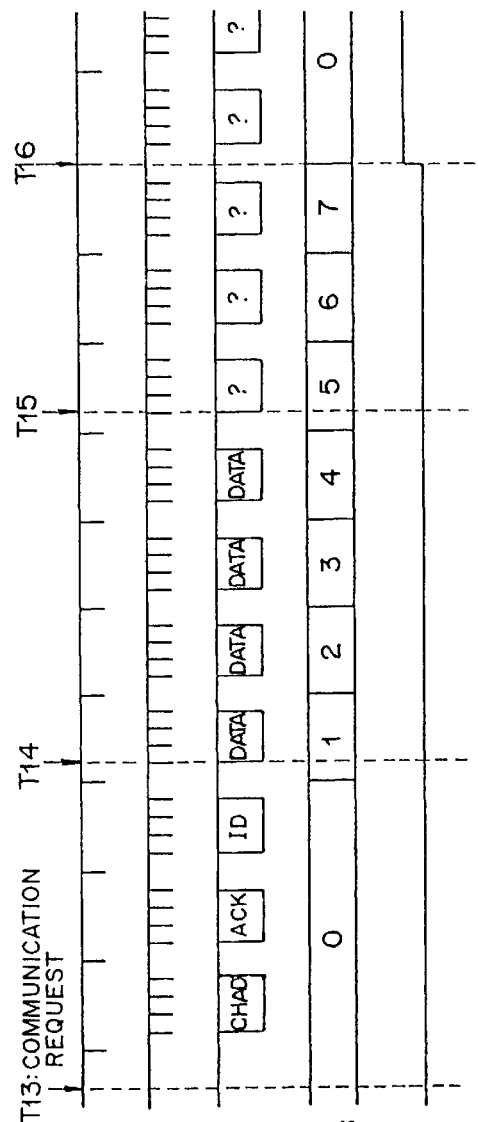
FIGS. 22(a) to 22(e) are timing charts for explaining the control sequence processing (in abnormal conditions) according to the embodiment.

In the case where the data ("CHAD", "ID", "DATA", and "EBL") sent from the CPU 1 are not properly stored in the transmission data memory area 212 in the memory section 21 due to any abnormalities (for example, "EBL" is not stored as shown in FIG. 21), upon reception of the control command from the CPU 1 (time T13 in FIG. 22), the control apparatus 2 starts to send "DATA" (time T14) after the transmission of "CHAD", the reception of "ACK", and the transmission of "ID", as shown in FIG. 22(c), in accordance with frame pulses [see FIG. 22(a)] and clock pulses [see FIG. 22(b)] in the similar manner as previously mentioned. In this case, since "EBL" of the transmission data lacks in transmission data memory area 212, it is impossible for the control apparatus 2 to send "EBL" which is to be sent at time T15. Hence, the control apparatus 2 continues sending uncertain data.

Seven is currently set to the byte number register 31, and hence the control apparatus 2 forcibly terminates the transmission processing, without receiving "ACK" at time T17, when the number of bits of the transmitted "DATA" (including uncertain data) has reached seven, and then sends an interruption signal to the CPU 1, as shown in FIG. 22(e).

Figure 23:
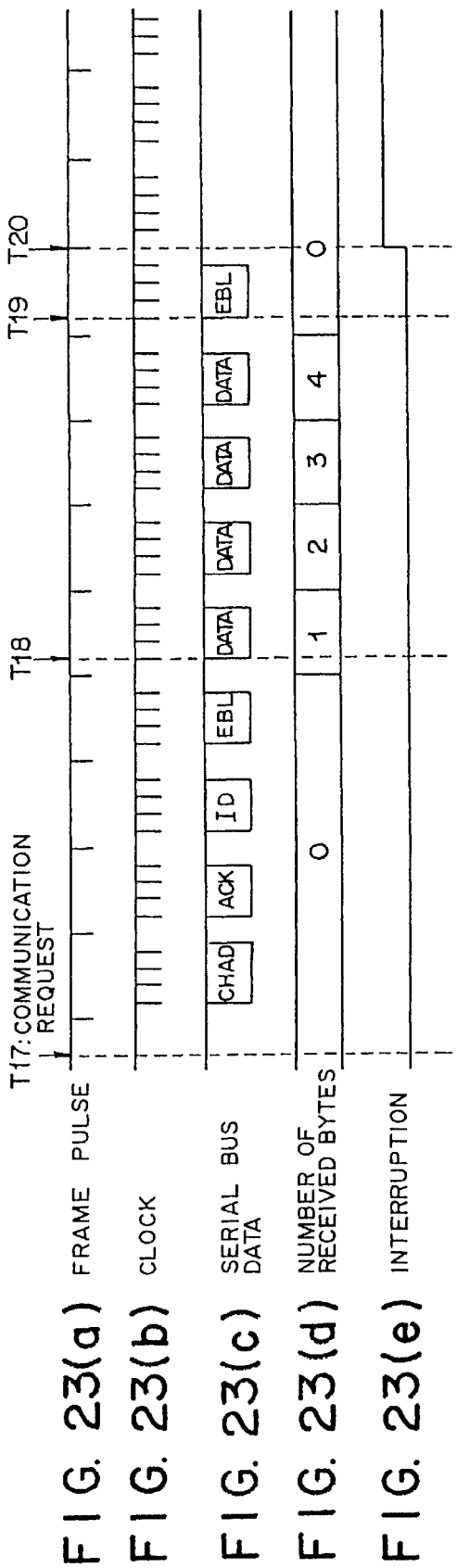
FIGS. 23(a) to 23(e) are timing charts for explaining the monitor sequence processing according to the embodiment.

Next, the case will be considered where the control apparatus 2 carries out the monitor sequence in a state in which "7" is set in the byte number register 31 as a reception byte number. When the control apparatus 2 receives a monitor sequence execution request (hereinafter referred to as a monitor command) from the CPU 1 (time T17 in FIG. 23), the control apparatus 2 starts to receive "DATA" (monitoring result data) from a corresponding channel unit 3 [time T18] after the transmission of "CHAD", the reception of "ACK", and the transmission of "ID" and "EBL", as shown in FIG. 23(c), in accordance with frame pulses [see FIG. 23(a)] and clock pulses [see FIG. 23(b)].

Figure 24:
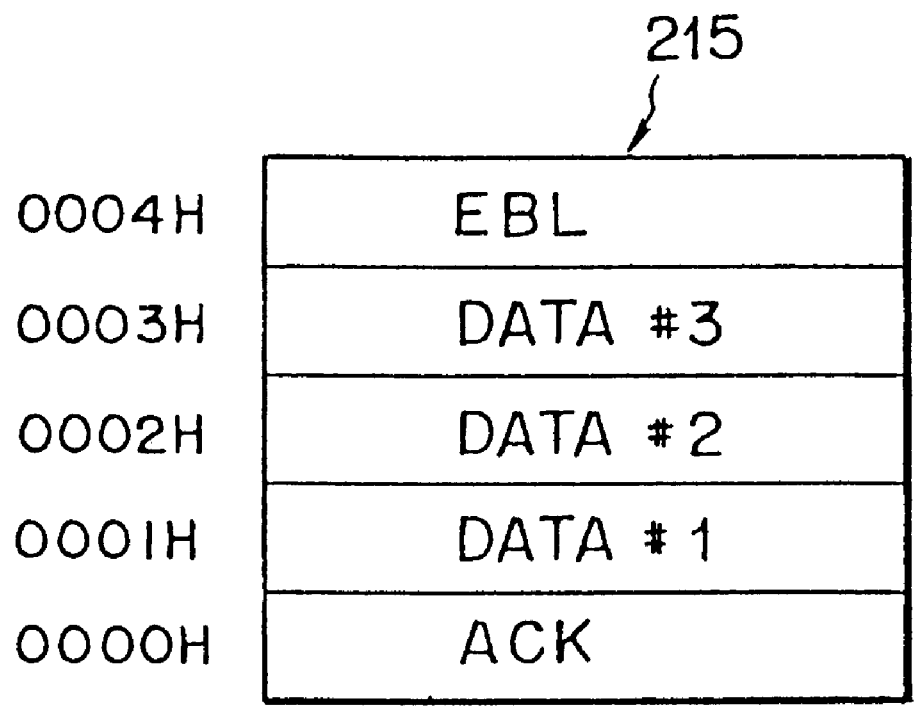
FIG. 24 is a diagram showing an example of the storage of data in the memory section when the monitor sequence is executed (in a normal condition) according to the embodiment.

The transmission of "DATA" is completed at time T19 when "EBL" is properly received from the channel unit 3, that is, before the number of received bytes reaches seven, as shown in FIG. 23(d). The control apparatus then outputs an interruption signal to the CPU 1 at time T20, as shown in FIG. 23(e). The data received at this time (i.e., "ACK", "DATA", and "EBL") are properly written into the reception data memory area 215 for monitor sequence, as shown in FIG. 24.

Figure 25:
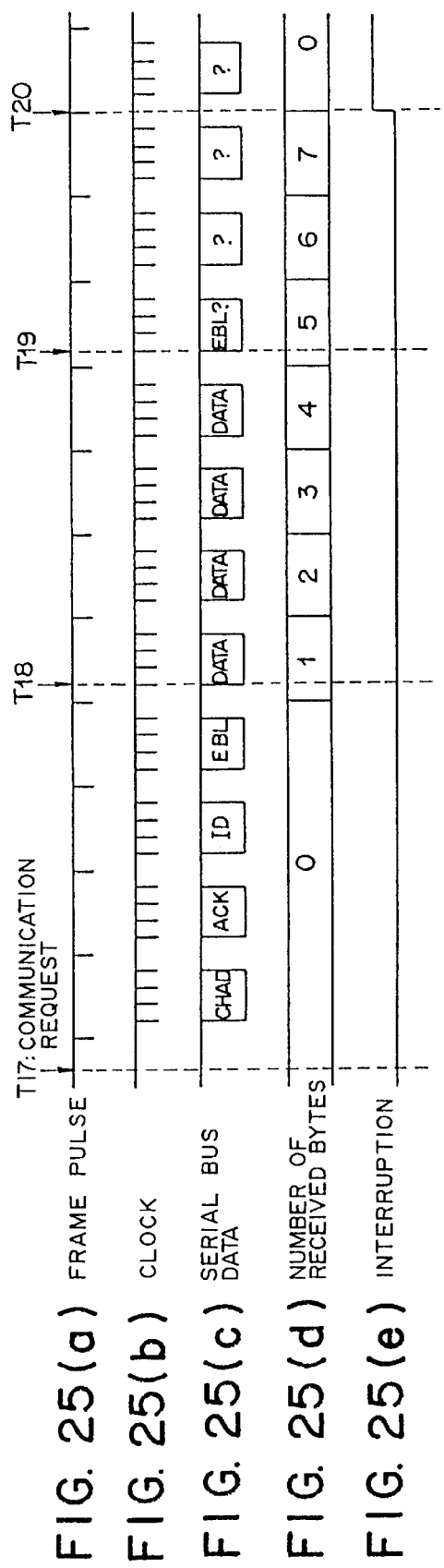
FIGS. 25(a) to 25(e) are timing charts for explaining the monitor sequence processing (in abnormal conditions) according to the embodiment.

For example, when "EBL" cannot be properly received from the channel unit 3 at time T19, as shown in FIG. 25, the control apparatus 2 continues executing communication processing and receiving uncertain data. For example, the thus reception data (including uncertain data) are written into the reception data memory area 215, as shown in FIG. 26. In this event, since seven is set in the byte number register 31 as a reception byte number, and hence the control apparatus 2 forcibly sends an interruption signal to the CPU 1, as shown in FIG. 25(e), without receiving "EBL" at time T20, when the reception data has reached seven, as shown in FIG. 25(d).

The timer register 32 shown in FIG. 7 retains a given preset time (a timer value: e.g., the number of data frames) received from the CPU 1 in order to adjust a period of time between when it receives a communication processing request from the CPU 1 and when it actually starts to execute communication processing for the channel unit 3. The length of time from the time when the timer register 32 receives a communication processing request from the CPU 1 to the time when the CPU 1 starts the communication processing is determined by the delay time set in the timer register 32.

Figure 27:
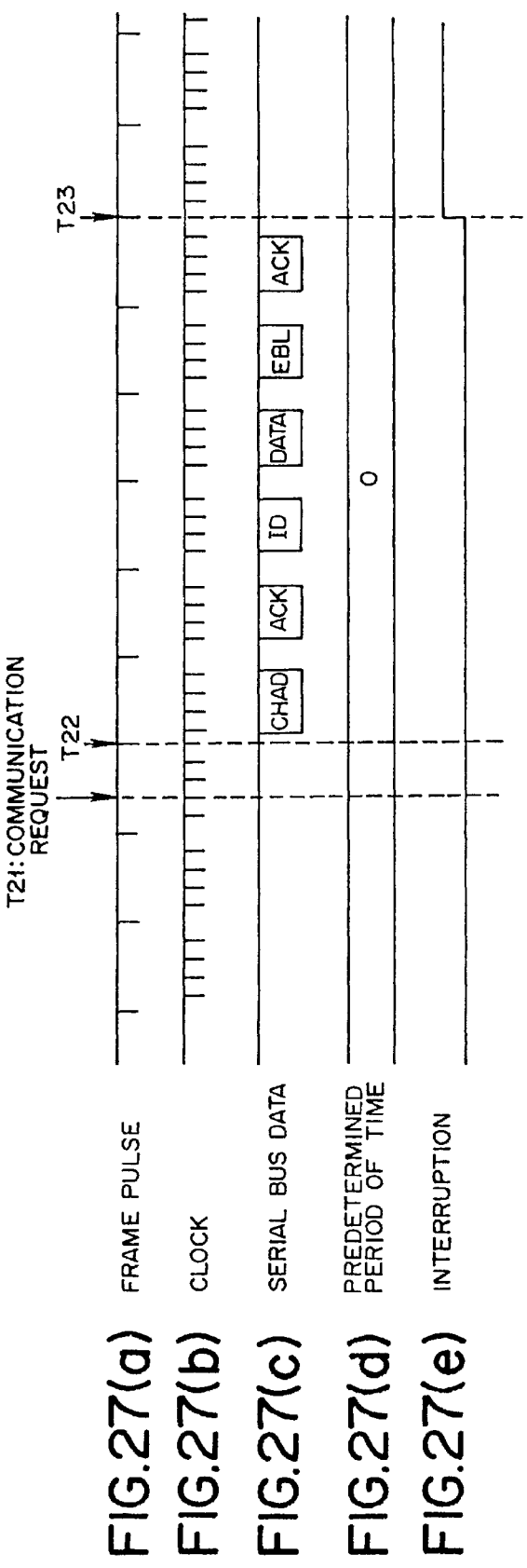
FIGS. 27(a) to 27(e) are timing charts for explaining the control sequence processing according to the embodiment.

For example, in the case where the number of frames is used as a timber value and "0" is set to the timer register 32 as the timer value, as shown in FIG. 27(d), when a communication processing request (here, control command) from the CPU1 is received (see time T21 in FIG. 27), the communication section 35 immediately executes a sequence of communication processing from time T22 at which the first frame pulse is detected. Namely, from time T22, the transmission of "CHAD", the reception of "ACK", the transmission of "ID", the transmission of "EBL", and the reception of "ACK" are performed through the serial bus 4, as shown in FIG. 27(c), in accordance with an internally generated clock pulses as shown in FIG. 27(b). When the above-described series of communication processing is completed, an interruption signal is output to the CPU 1.

Figure 28:
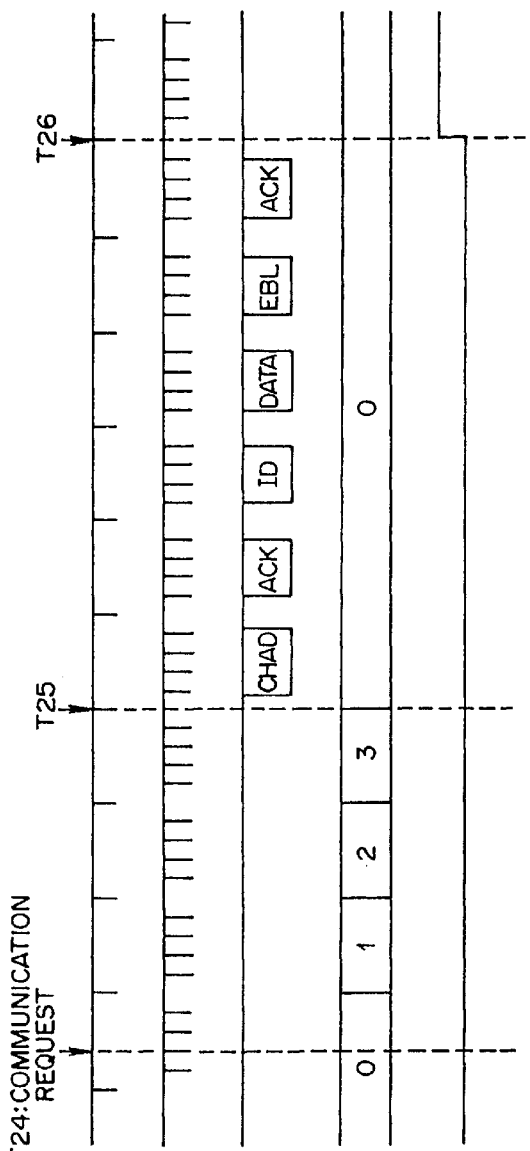
FIGS. 28(a) to 28(e) are timing charts for explaining the control sequence processing according to the embodiment.

Next, the case is considered wherein "3" is set in the timer register 32 as the timer value. Upon reception of a communication processing request (i.e., the control command) from the CPU 1 (time T24 in FIG.28), the communication section 35 waits until the frame pulse shown in FIG. 28(a) is detected three times, as shown in FIG. 28 (d), and then executes a control sequence in the same manner as previously described. An interruption signal is output to the CPU 1 at time T26 when the processing is completed.

Thus, the control apparatus 2 is designed so as to be able to absorb the difference between the speed of processing of the CPU 1 and the speed of communication processing for the channel units 3 by using the timer register 32. As a result, it becomes possible to flexibly cope with the case where the CPU 1 and the channel unit 3 are different from each other in operating speed.

The priority processing section (priority judging section) 33 judges the levels of priority of communication processing requests received from the CPU 1, and it then notifies a communication processing request having the highest priority to the communication section 35 and the timer section 34. The timer section 34 produces a time lag on the basis of a communication processing request from the priority processing section 33 and the timer value of the timer register 32 in the same manner as previously described. After lapse of a predetermined time, the communication section 35 is given communication permission. The communication section 35 carries out desired communication processing for the channel unit 3 in accordance with the permitted communication processing request. An interruption signal is output to the CPU 1 when the sequence of communication processing has been completed.

Figure 29:
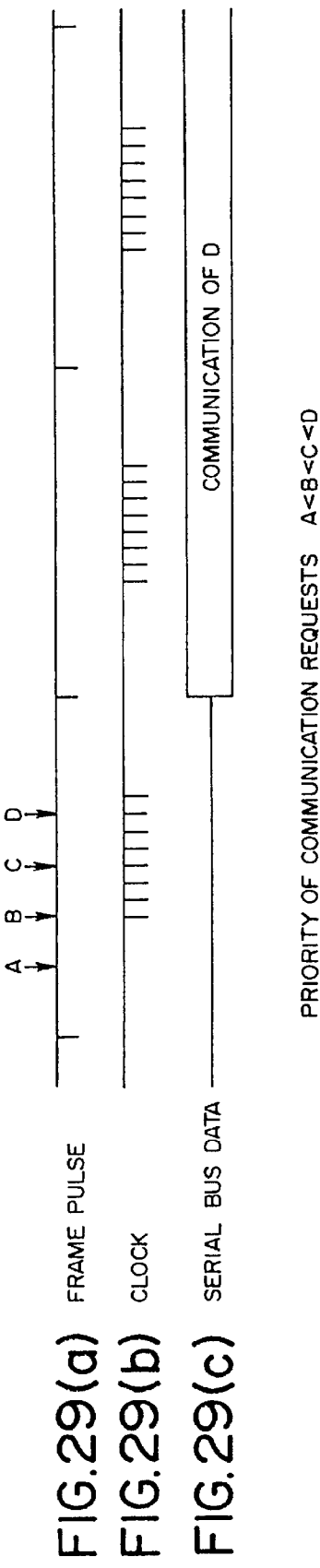
FIGS. 29(a) to 29(c) are timing charts for explaining priority processing according to the embodiment.

For example, when the control apparatus 2 receives a plurality of communication processing requests (A–D) from the CPU 1 in a period of time between successive two frame pulses, as shown in FIG. 29(*a*), the controller section 23 determines the priority of each of the communication processing requests using the previously described priority processing section 33. A communication processing request having the highest priority (D in this example) is notified to the communication section 35. As shown in FIG. 29(*c*), the communication section 35 carries out communication processing corresponding to the highest-priority communication processing request on the basis of frame pulses as shown in FIG. 29(*a*) and clock pulses as shown in FIG. 29(*b*).

When the controller section 23 receives a plurality of types of communication processing requests from the CPU 1 simultaneously, the communication section 35 preferentially carries out communication processing for the communication processing request which has been decided as having the highest priority by the priority processing section 33.

Figure 30:
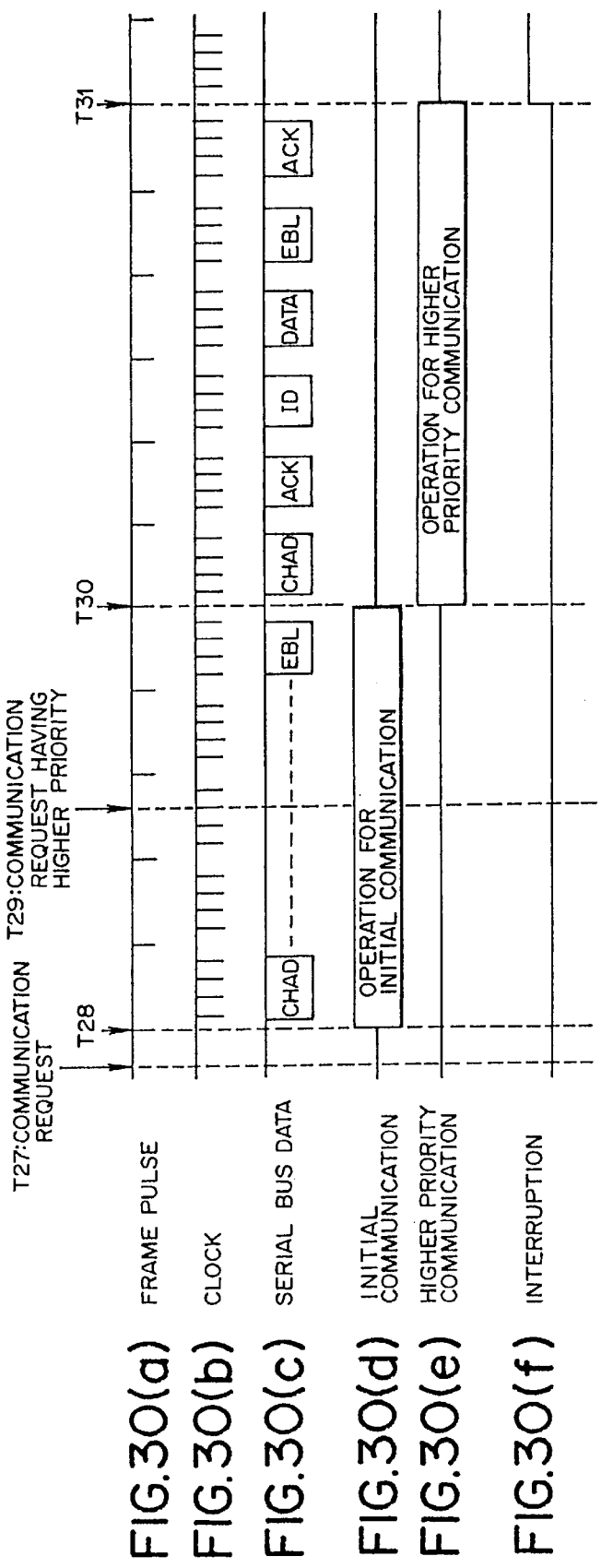
FIGS. 30(a) to 30(f) are timing charts for explaining the priority processing according to the embodiment.

For example, when the controller section 23 receives a certain communication processing request (monitor command or auto scan command in this example) from the CPU 1 at time T27 as shown in FIGS. 30(*c*) and 30(*d*), the controller section 23 executes a sequence of communication processing from time T28 on the basis of frame pulses [see FIG. 30(*a*)] and clock pulses [see FIG. 30(*b*)] generated in the controller section 23. When the controller section 23 receives a communication processing request (e.g., a control command) having a priority level higher than that of the communication processing currently being executed, the communication processing currently being executed is not immediately stopped, but the sequence of communication processing is allowed to be completed. Thereafter (from time T30 in FIG. 30), communication processing for another communication processing having a higher priority is executed. After the higher-priority communication processing has been completed, an interruption signal is output to the CPU 1.

As a result, a plurality of interruption signals are prevented from being output to the CPU 1 simultaneously. As a result, the CPU 1 is prevented from reading communication data from the memory section 21 while the control apparatus 2 is executing communication processing having a higher priority.

However, as will be described later, when the controller section 23 receives a communication processing request having the highest priority (in the present embodiment, a remote test access request from a remote terminal which remotely controls the CPU 1 in the present embodiment) during the course of executing a sequence of communication processing for a certain communication pressing request, the controller section 23 immediately halts the execution of the communication processing currently being executed by stopping shift clocks used to execute the communication processing.

For example, the previously described communication section 35 comprises a counter section 36, a data monitoring section 37, a signal generating section (P G section) 38, an interruption control section 39, and an interruption register 40, as shown in FIG. 7.

The counter section 36 receives a communication permission from the timer section 34 and a communication processing request from the priority processing section 33. The counter section 36 then starts an internal counter (not shown) in accordance with the contents (type) of the received communication processing request. As a result, memory addresses (control signals for the transmission/reception section 22) for reading out transmission data from the memory section 21 and for writing reception data into the memory section 21 are generated.

The data monitoring section 37 monitors the status of transmission of transmission data and the status of reception of response data, and it detects whether or not "EBL" included in the reception data has been written into the memory section 21. The signal generating section (transmission data generating section, control signal generating section) 38 generates control signals for the transmission/reception section 22, memory addresses for use in the memory section 21, communication data used when executing the auto scan processing (i.e., "CHAD", "DATA", and "EBL"), or the like, which are shown in FIG. 6.

The interruption control section 39 outputs an interruption signal to the CPU 1 when the data monitoring section 37 confirms that "EBL" has been written into the memory section 21 and that the sequence of communication processing for the channel unit 3 has been completed. The interruption register (communication interruption factor register) 40 retains information on the type of interruption, which shows what kind of communication processing has been completed, for each type of communication.

Figure 16:
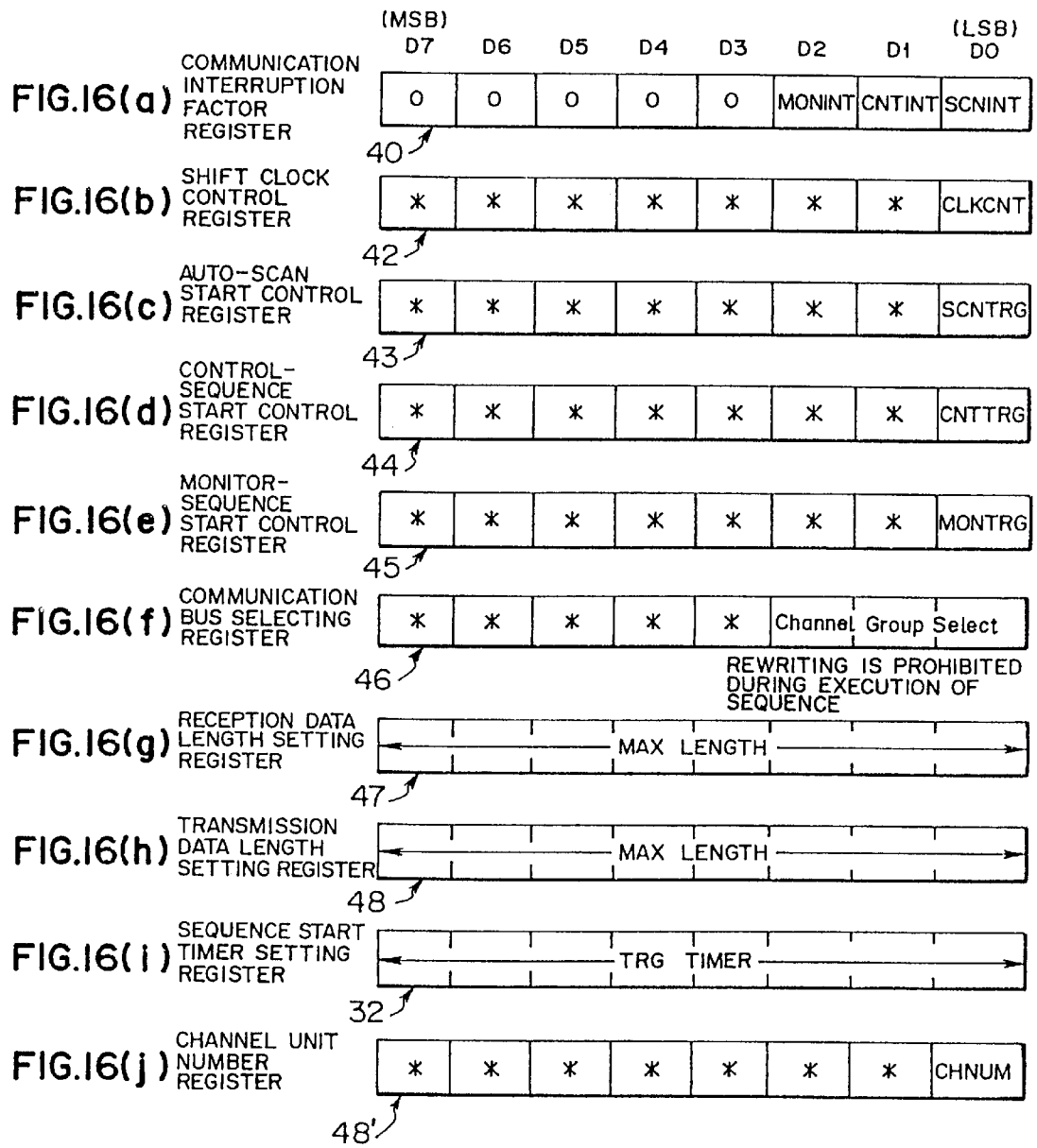
FIGS. 16(a) to 16(j) are diagram showing an example of the formats of registers used in the channel unit communication control apparatus according to the embodiment.

To this end, for example, the above described interruption register 40 comprises eight bits (D0–D7) so as to retain a maximum of eight types of interruption-type information, as shown in FIG. 16(*a*). In the present embodiment, for example, interruption information (SCNINT) which represents the completion of the auto scan, interruption information (CNTINT) which represents the completion of the control sequence, and information (MONINT) which represents the completion of the monitor sequence are written into the three lowermost bits (D0–D2). When there are more than eight types of communication, the number of bits of the register 40 is increased.

Figure 17:
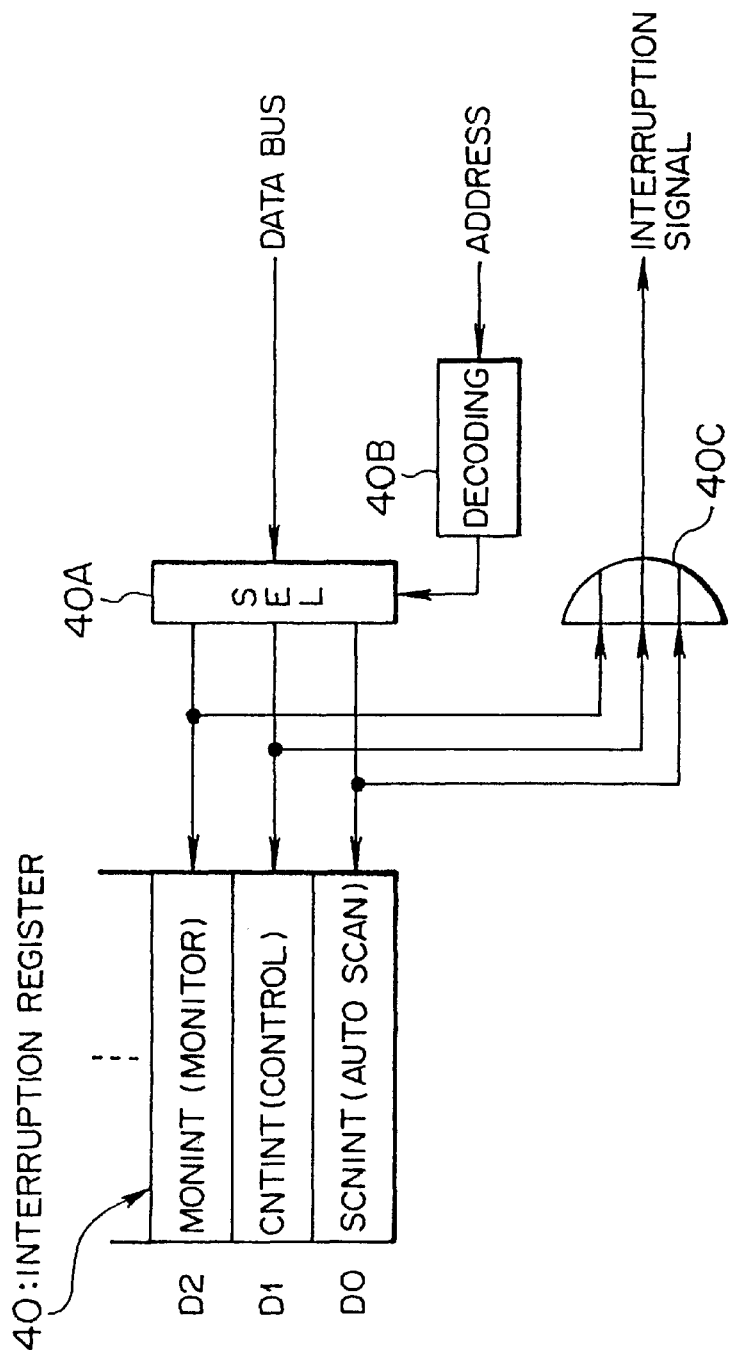
FIG. 17 is a block diagram showing an example of an interruption register and its peripheral circuit used in the channel unit control apparatus of the embodiment.

More specifically, for example, the above-described interruption is written into the interruption register 40, as shown in FIG. 17. A selector 40A is switched according to address information decoded by a decoder 40B, so that the interruption type information (SCNINT, CNTINT, and MONINT) is input to a corresponding area (D0–D2) of the interruption register 40 through the data bus. Outputs from the interruption registers 40 are supplied to an OR gate 40C for logical OR operation, and a signal from the OR gate 40C is supplied to the CPU 1 as an interruption signal.

Figure 31:
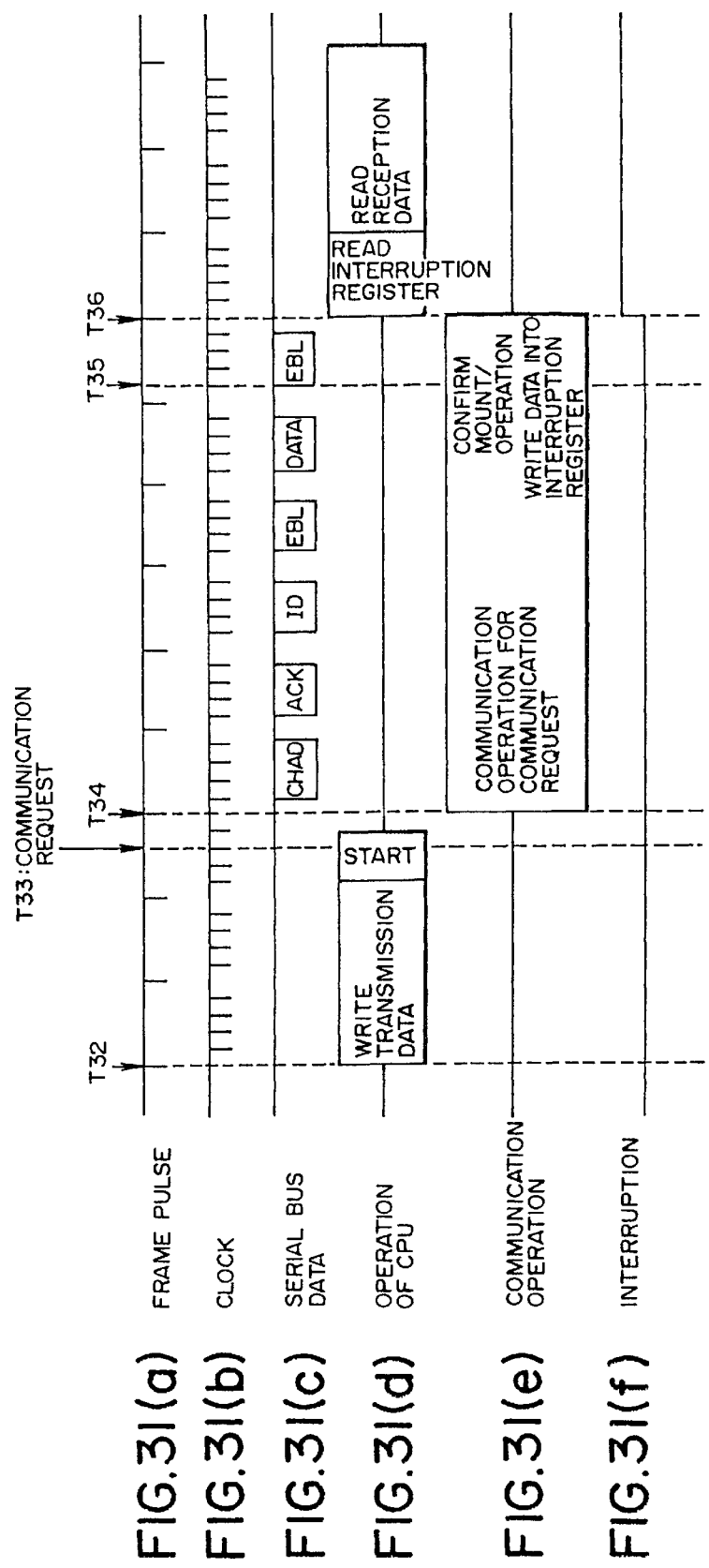
FIGS. 31(a) to 31(f) are timing charts for explaining the monitor sequence processing according to the embodiment.

Upon reception of an interruption signal from the controller section 23, the CPU 1 reads the interruption-type information in the interruption register 40, whereby the CPU 1 becomes possible to identify the type of communication processing that the control apparatus 2 has completed. For example, when the CPU 1 executes the monitor sequence for a certain channel unit 3, transmission data ("CHAD", "ID", and "EBL") for executing the monitor sequence are previously stored in the memory section 21 of the control apparatus 2, from time T32, as shown in FIG. 31(d), in the same manner as previously described, on the basis of frame pulses [see FIG. 31(a)] and clock pulses [see FIG. 31(b)]. Thereafter, the CPU 1 outputs a monitor command in order to start the control apparatus 2 (time T34 in FIG. 31).

As a result, the control apparatus 2 executes a sequence of communication processing [i.e., transmission of "CHAD", reception of "ACK", transmission of "ID", transmission of "EBL", reception of "DATA", and reception of "EBL": see FIG. 31(c)] from time T34, as shown in FIG. 31(e). The control apparatus 2 writes the interruption-type information (MONINT) which represents the completion of execution of the monitor sequence into the corresponding area of the interruption register 40 at time T35 at which the control apparatus 2 has received "EBL" from the corresponding channel unit 3. An interruption signal is output to the CPU 1 at time T36 at which the writing of the interruption-type information has been completed, as shown in FIG. 31(f).

Upon reception of an interruption signal, the CPU 1 reads out the interruption-type information held in the interruption register 40, and it further reads out the reception data (monitoring result data) from a corresponding area (reception data area 215) of the memory section 21 in the control apparatus 2 according to the interruption type information.

In this way, signals which are retained in the interruption register 40 and each of which indicates interruption type are subjected to OR operation performed by the OR gate 40C. The control apparatus 2 outputs the thus obtained result to the CPU 1 as an interruption signal. Therefore, it is possible to reliably notify the CPU 1 of the completion of the communication processing for any channel unit 3. Further, the CPU 1 reads the interruption-type information in the interruption register 40, and hence it becomes possible to constantly know the channel unit 3 for which the communication processing (control sequence, monitor sequence, or auto scan) has been completed, which greatly contributes to improvements in reliability of the communication processing.

Figure 8:
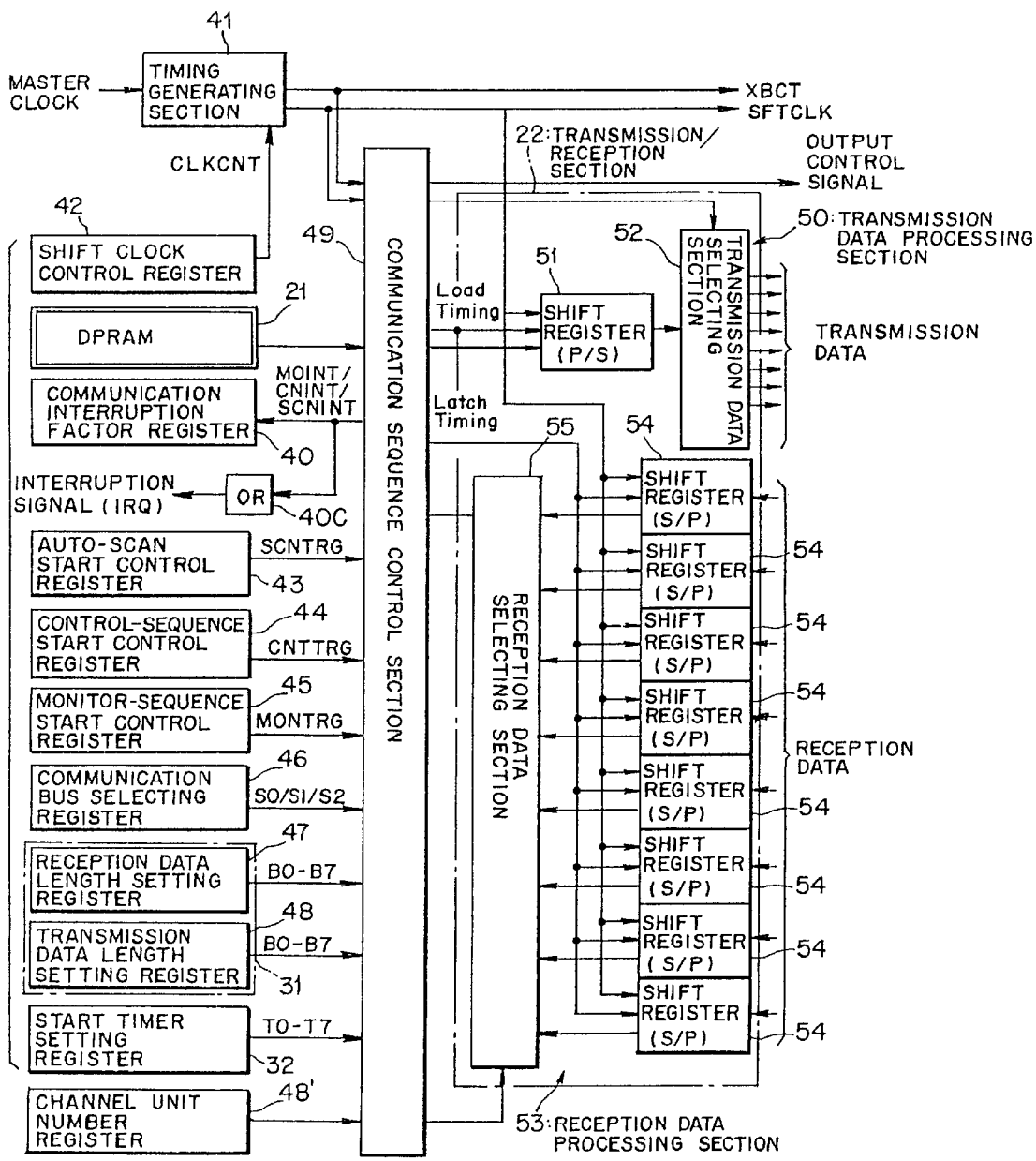
FIG. 8 is a block diagram showing the detailed configuration of the channel unit control apparatus of the embodiment.

FIG. 8 is a block diagram showing the detailed configuration of the previously described channel unit control apparatus 2. In FIG. 8, numeral 41 denotes a timing generating section, numeral 42 denotes a shift clock control register, numeral 43 denotes an auto-scan start control register, numeral 44 denotes a control-sequence start control register, numeral 45 denotes a monitor-sequence start control register, numeral 46 denotes a communication bus selecting register, numeral 47 denotes a reception data length setting register, numeral 48 denotes a transmission data length setting register, numeral 48' denotes a register for storing the number of channel units (hereinafter referred to as channel unit number register), and numeral 49 denotes a communication sequence control section corresponding to the previously described controller section 23.

As shown in FIG. 8, the control apparatus 2 comprises, as the previously described transmission/reception section 22, a transmission data processing section 50 and a reception data processing section 53. The transmission data processing section 50 further comprises a parallel/serial (P/S) converter (shift register) 51 and a transmission data selecting section 52. The reception data processing section 53 comprises eight serial/parallel (S/P) converters (shift registers) 54 provided so as to correspond to the channel unit groups 3-1 to 3-8 (see FIG. 2) and a reception data selecting section 55.

In FIG. 8, elements corresponding to those in FIG. 7 are denoted by the same numerals as those used in FIGS. 6 and 7. In FIG. 8, a DPRAM (Dual-Port RAM) is used as the memory section 21.

The previously described timing generating section 41 generates shift clocks and frame pulses on the basis of a clock control signal (CLKCNT) from the shift clock control register 42. The shift clocks and frame pulse signals are fed to each channel unit 3 through the clock signal line 5 and the timing signal line 6 shown in FIG. 3. These signals are also fed, as an operation timing signal, to the communication sequence control section 49 within the control apparatus 2.

As previously described, when the controller section 23 receives a remote test access request which has the highest priority and which is sent from a remote terminal through the CPU 1, "HALT INSTRUCTION (CLKCNT)" is set in the shift clock control register 42. As a result, the operation of the timing generating section 41 is stopped, so that the generation of the shift clock signal used in the communication processing is stopped.

The auto-scan start control register 43 retains a start trigger (SCNTRG) for executing the auto scan which is received from the CPU 1. The control-sequence start control register 44 retains a start trigger (CNTTRG) for executing the control sequence which is received from the CPU 1. The monitor-sequence start control register 45 retains a start trigger (MONTRG) for executing the monitor sequence which is received from the CPU 1.

The communication bus selecting register 46 retains a channel group number of any of the channel groups 3-1 to 3-8 for which communication processing is to be performed in accordance with a communication processing request from the CPU 1. One of the serial bus 4 corresponding to the channel group number set in the communication bus selecting register 46 is selected by the communication sequence control section 49. The communication processing is carried out for the channel unit 3 using the thus selected serial bus 4. The communication bus selecting register 46 is designed such that the channel group number is written every time a sequence of communication processing is completed.

As previously described, the reception data length setting register 47 retains a preset reception byte number which is output from the CPU 1. The transmission data length setting register 48 retains a preset transmission byte number which is also output from the CPU 1. The channel unit number register 48' retains a preset value which is output from the CPU 1 and which indicates the number of channel units 3 which form each of the channel groups 3-1 to 3-8.

Like the interruption register 40, each of the registers 42 to 48, 32, and 48' in FIG. 8 has an 8-bit configuration (D0 to D7), for example, as shown in FIGS. 16(b) to 16(j). Each of these registers is designed such that the previously described various kinds of information (CLKCNT, SCNTGR, CNTTRG, MONTRG, or the like) are respectively set from the least significant bit (LSB) toward the most significant bit (MSB).

The communication sequence control section 49 controls the entire communication processing carried out inside the controller section 23 on the basis of the information retained in the register 40, 42 to 48, and 32. For example, when a start trigger (i.e., CNTTRG/MONTRG/SCNTRG) is set in any of the registers 43 to 45 by the CPU 1, communication processing corresponding to the start trigger is executed.

Figure 10:
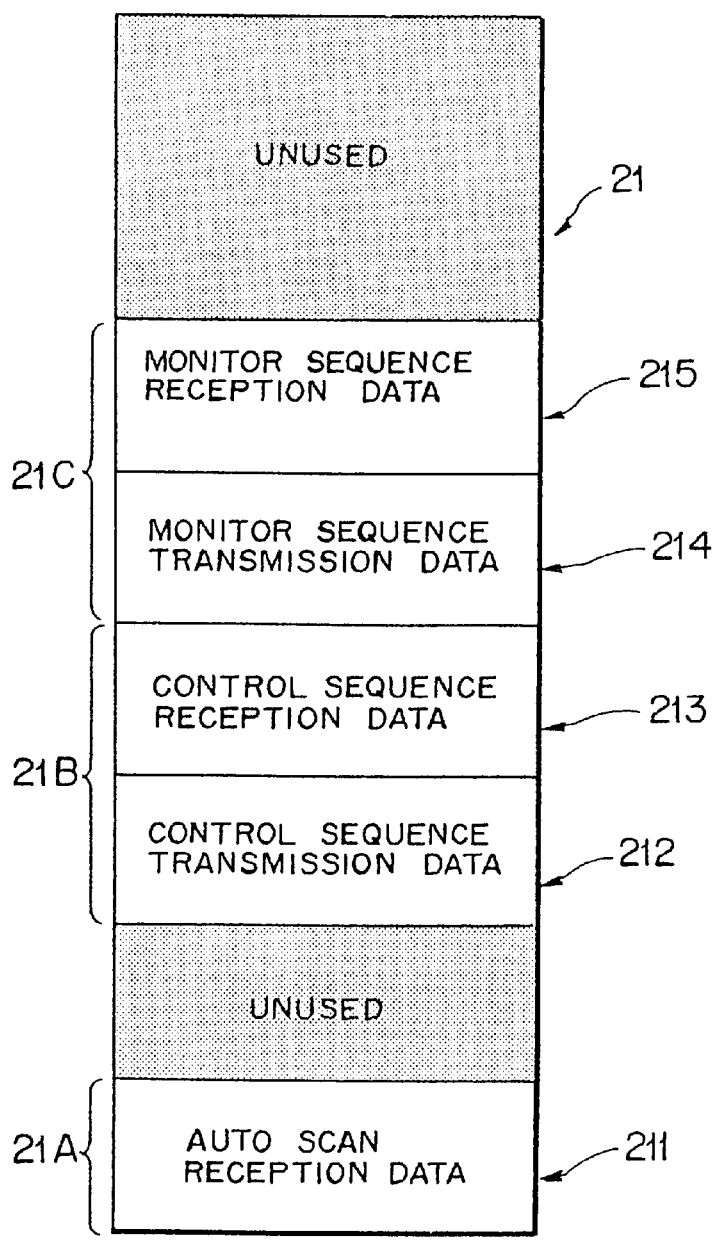
FIG. 10 is a block diagram showing the configuration of a memory section in the channel unit control apparatus of the embodiment.

The transmission data processing section 50 sends corresponding transmission data to a corresponding channel unit 3 in accordance with the type of a communication processing request from the CPU 1. For example, when the CPU 1 sets the start trigger (CNTTRG) in the control-sequence start control register 44 (time T37 in FIG. 32), "CHAD", "ID", "DATA", and "EBL" are sequentially read out from the transmission data memory area 212 in the memory section 21 (see FIGS. 10 and 11) on the basis of frame pulses [see FIG. 32(a)] and clock pulses [see FIG. 32(b)] [times T38, T40, T41, and T42 in FIGS. 32(c) and 32(e)]. These data are converted into serial data by the shift register 51, and the thus converted serial data are sent to a corresponding channel unit 3 through the transmission data selecting section 52.

Figure 33:
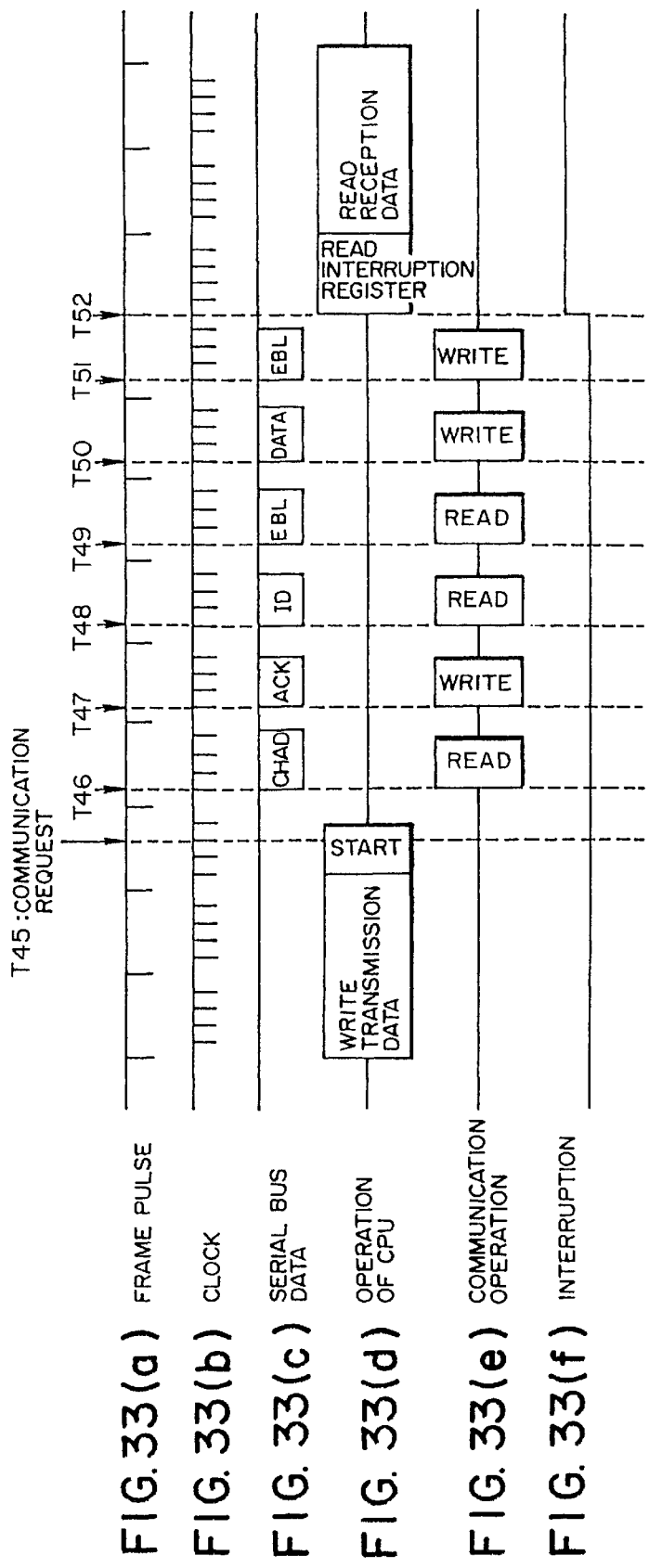
FIGS. 33(a) to 33(f) are timing charts for explaining the monitor sequence processing according to the embodiment.

When the monitor-sequence execution request is received from the CPU 1, and when the start trigger (MONTRG) is set in the monitor-sequence start control register 45 (time T45 in FIG. 33), "CHAD", "ID", and "EBL" are sequentially read from the transmission data memory area 214 in the memory section 21 (see FIGS. 10 and 13) on the basis of frame pulses [see FIG. 33(a)] and clock pulses [see FIG. 33(b)] [times T46, T48, and T49 in FIGS. 33(c) and 33(e)].

Figure 34:
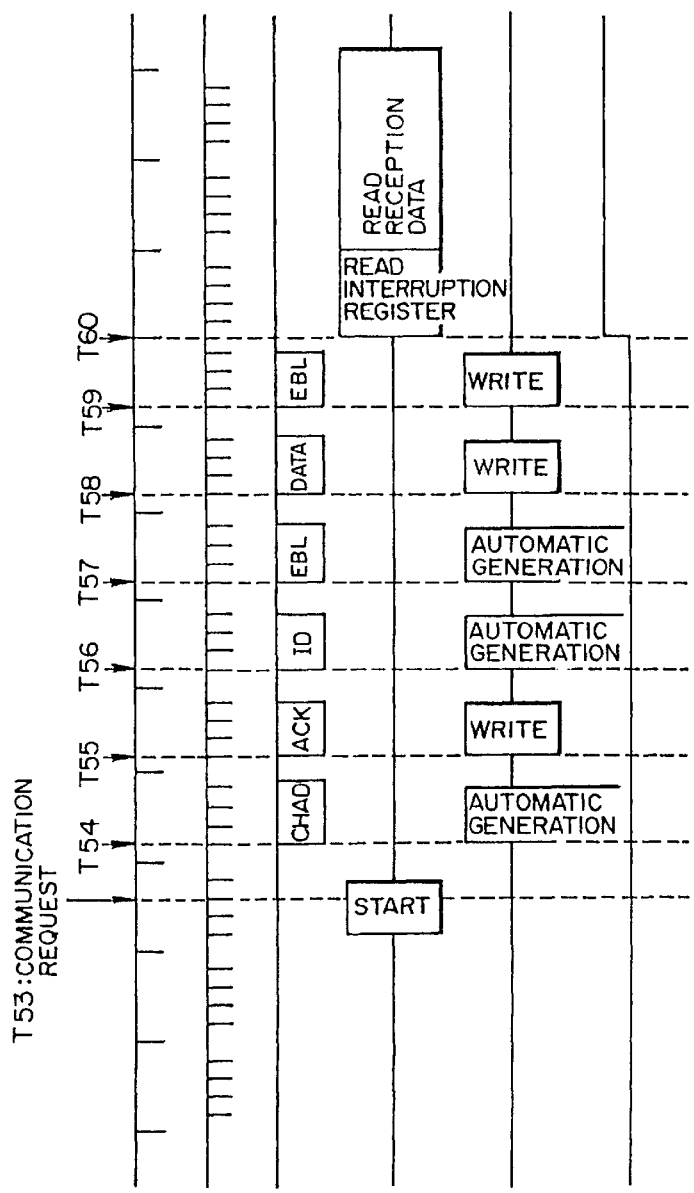
FIGS. 34(a) to 34(f) are timing charts for explaining the auto scan according to the embodiment.

When the auto scan execution request is received from the CPU 1 and when the start trigger (SCNTRG) is set in the auto-scan start control register 43 (time T53 in FIG. 34), "CHAD", "ID", and "EBL" are automatically generated [times T54, T56, and T57 in FIGS. 34(c) and 34(e)] by the signal generating section 38 on the basis of frame pulses [see FIG. 34(a)] and clock pulses [see FIG. 34(b)]. The thus generated data are successively sent to all of the channel groups 3-1 to 3-8.

In the reception data processing section 53, the shift registers 54 convert the data, which are received in a predetermined order from the corresponding one of the channel groups 3-1 to 3-8 as a response to the above described transmission data through a corresponding serial bus 4, into parallel data in accordance with a latch timing signal from the communication sequence control section 49. The thus converted parallel data are selectively output by the reception data selecting section 55, so that the reception data are written into the corresponding areas of the memory section 21 through the communication sequence control section 49.

For example, data of "ACK" received at the time of execution of the control sequence are sequentially written into the control sequence reception data memory area 213, as shown in FIG. 12, [times T39, T41, and T43 in FIGS. 32(c) and 32(e)] on the basis of frame pulses [see FIG. 32(a)] and clock pulses [see FIG. 32(b)]. Further, "ACK", "DATA", and "EBL" received at the time of execution of the monitor sequence are sequentially written into the monitor sequence reception data memory area 215, as shown in FIG. 14 [times T47, T50, and T51 in FIGS. 33(c) and 33(e)] on the basis of frame pulses [see FIG. 33(a)] and clock pulses [see FIG. 33(b)]. "ACK", "DATA", and "EBL" which are repetitively and simultaneously received from all of the channel groups 3-1 to 3-8 at the time of execution of the auto scan are multiplexed by time-division multiplexing by the shift registers 54 and the reception data selecting section 55. The thus multiplexed data are sequentially written into the reception data memory area 211 for each of the channel groups 3-1 to 3-8, as shown in FIG. 16 [times T55, T58, and T59 shown in FIGS. 34(c) and 34(e)] on the basis of frame pulses [see FIG. 34(a)] and clock pulses [see FIG. 34(b)].

Figure 32:
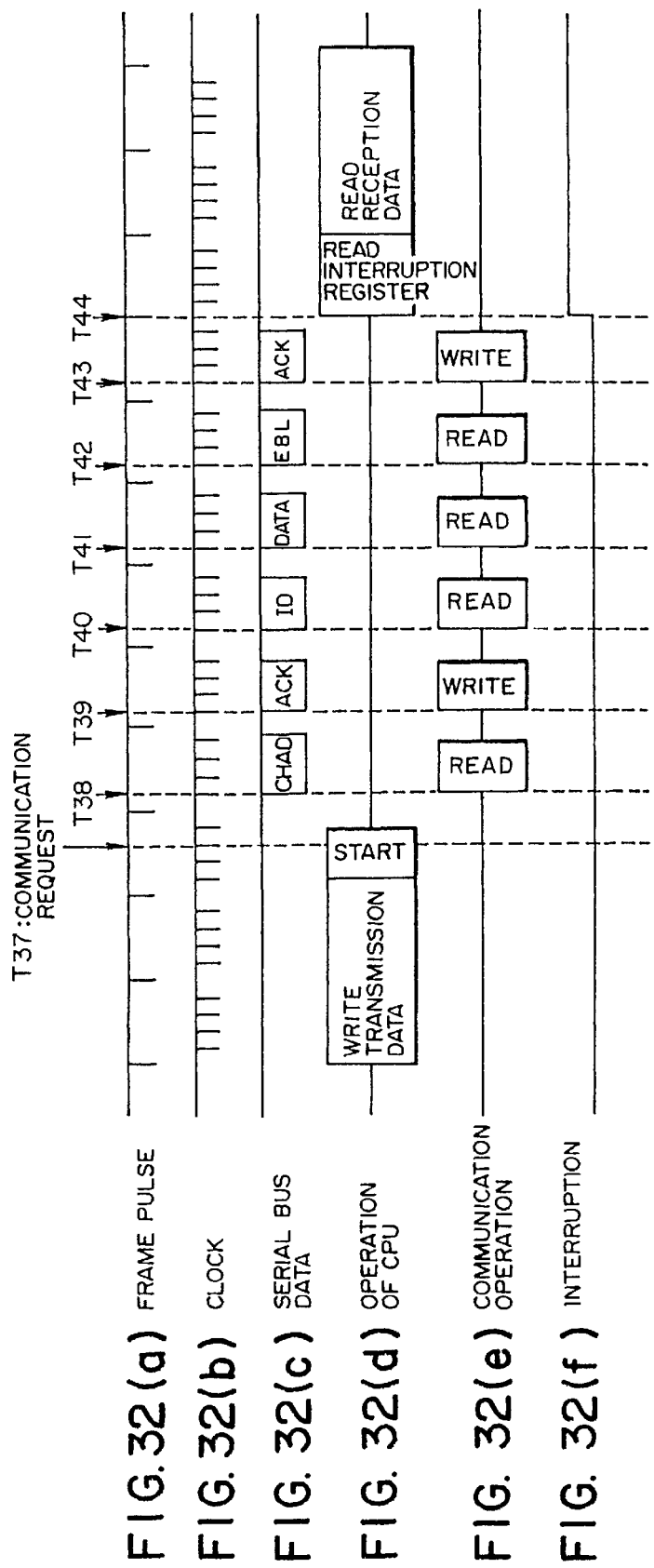
FIGS. 32(a) to 32(f) are timing charts for explaining the control sequence processing according to the embodiment.

FIGS. 32(f) to 34(f) respectively show that an interruption signal is output to the CPU 1 whenever each of the various kinds of sequential communication processing has been completed (i.e., time T44 in FIG. 32, time T52 in FIG. 33, and time T60 in FIG. 34).

The operation of the communication control apparatus (channel unit control apparatus 2) of the present embodiment having the above described configuration will now be described in detail.

(1) Control Sequence

The operation of the previously described communication control apparatus will be described hereunder with reference to a local test access which is an example of the control sequence.

Figure 35:
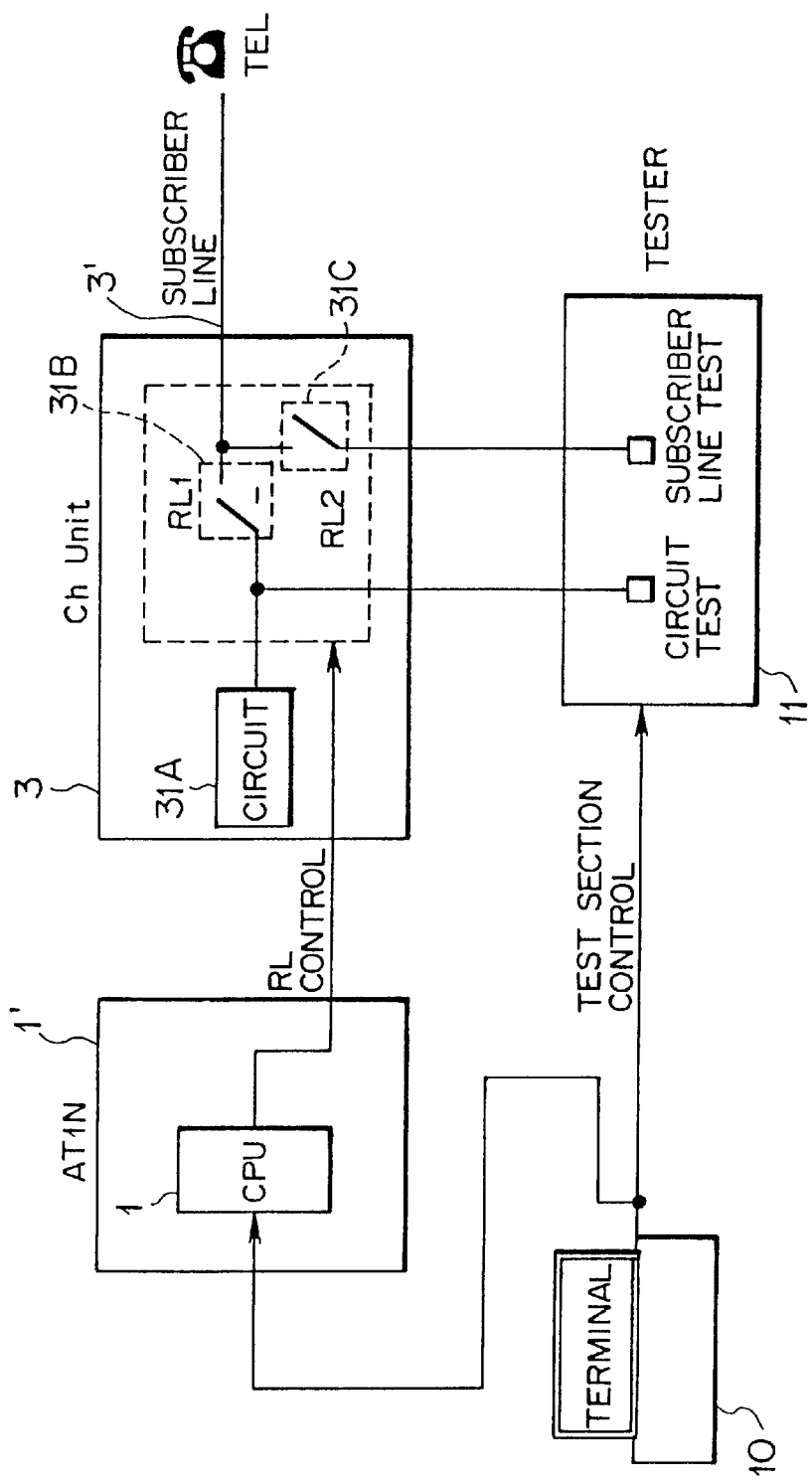
FIG. 35 is a diagram for explaining local test access processing according to the embodiment.

The local test access is a test, for example, for checking a breaking of a line or a short circuit. When the local test access is performed, a line through which an internal circuit 31A of the channel unit 3 and the subscriber line 3' are connected together in an ordinary state is extended to a tester 11, as shown in FIG. 35. A local terminal 10 usually sends an execution request for the local test access to the CPU 1 in the communication control section (AT1N) 1'. As a result, the CPU 1 controls ON and OFF operations of test relays 31B and 31C (RL1 and RL2) in the channel unit 3, and signals on both sides of the relay RL1 are sent to the tester 11.

In general, the local test access includes monitor access and split access. The test relays 31B and 31C are controlled in the manner as shown in the following table for the cases of a normal operation, the monitor access, and the split access.

TABLE 1

TEST RELAY CONTROL

| Mode | RL1 | RL2 | |
| --- | --- | --- | --- |
| Normal Operation | OFF | OFF | Normal state (internal circuit and subscriber line are connected with each other) |
| Monitor Access | OFF | ON | Access without affecting (disconnecting) the line |
| Split Access | ON | ON | Access to internal circuit and subscriber line while they are disconnected from each other |

Figure 36:
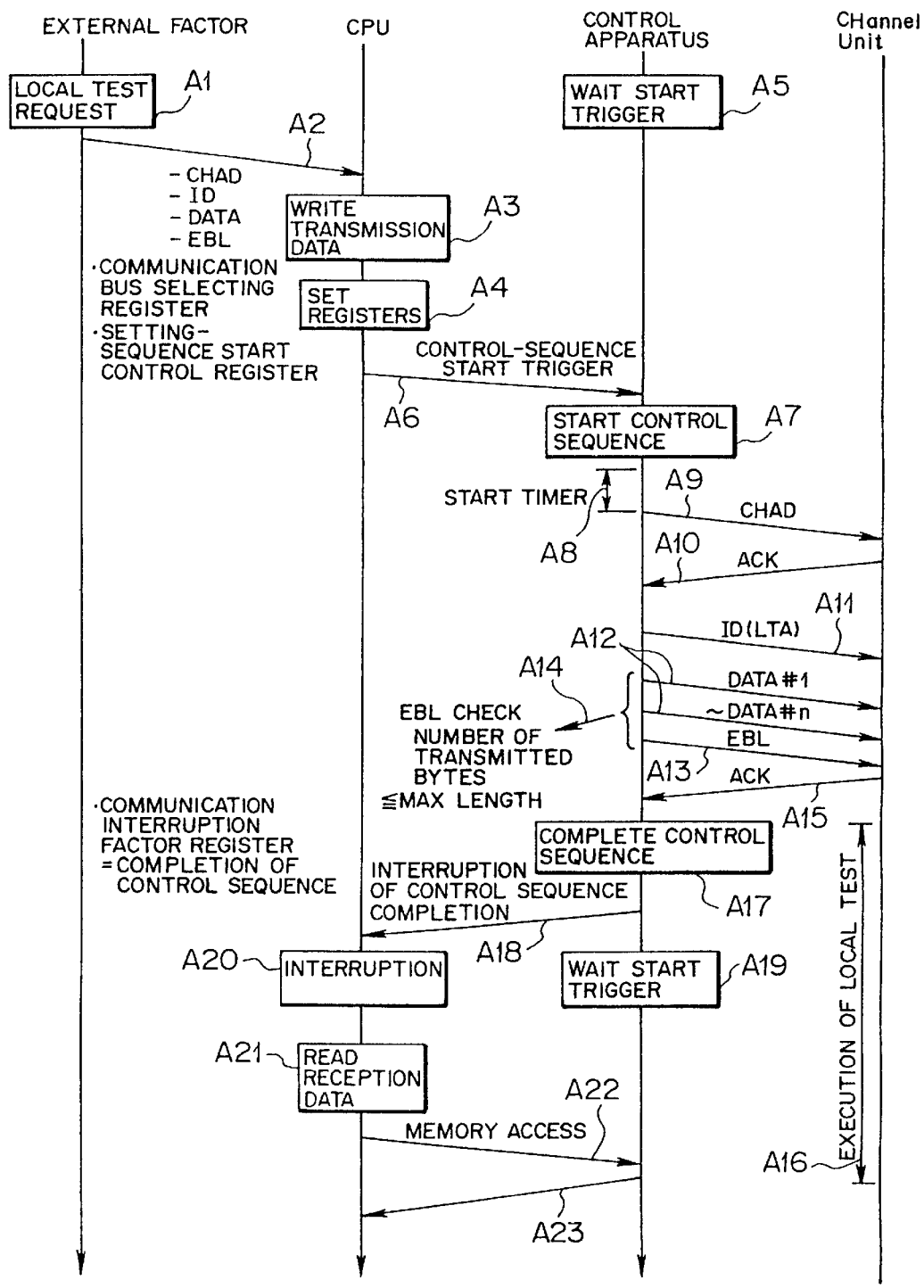
FIG. 36 is a sequence chart for explaining the control sequence processing according to the embodiment.

The operation of the communication control section at the time of local test access will now be described with reference to a sequence chart (steps A1 to A23) shown in FIG. 36.

The local terminal 10 first sends "CHAD", "ID", "DATA", and "EBL", data (i.e., a channel group number for which a sequence is carried out) required for setting the communication bus selecting register 46 (see FIG. 8), and a start trigger (CNTTRG) for setting the control sequence start control register 44 (see FIG. 8), as the data necessary to carry out the local test access (a control sequence), to the CPU 1 (step A2).

The CPU 1 writes the transmission data ("CHAD", "ID", "DATA", and "EBL") into a corresponding memory area [the transmission data memory area 212 (see FIGS. 10 and 11)] of the memory section 21 in the control apparatus 2 (writing of transmission data: step A3). The data received from the CPU 1 are written into the registers 44 and 46 in the control apparatus 2, whereby the registers are set (step A4). At this time, the control apparatus 2 is waiting for a communication processing request from the CPU 1 (i.e., it is waiting for a start trigger) (step A5).

The control apparatus 2 recognizes that the start trigger (CNTTRG) is set to the control-sequence start control register 44 (step A6) and starts to execute the control sequence (step A7). As previously described with reference to FIGS. 28(a) to 28(e), in the present embodiment, the control apparatus 2 does not immediately execute the control sequence in response to the start trigger (CNTTRG) but executes the sequence after the timer section 34 (see FIG. 7) has counted up the value set in the timer register (the start timer setting register) 32 (i.e., after the lapse of a predetermined time) (step A8).

Specifically, after the timer section 34 has counted up the timer value, the control apparatus 2 reads "CHAD" from the transmission data memory area 212 of the memory section 21. The thus read "CHAD" data are sent to a corresponding channel unit 3 through the transmission/reception section 22 (step A9). When the channel unit 3 that has received "CHAD" operates properly, it sends "ACK" back to the control apparatus 2 as a response to acknowledge the proper reception of "CHAD" (step A10).

Upon reception of "ACK", the control apparatus 2 writes it into a corresponding memory area (control sequence reception data memory 213: see FIGS. 10 and 12) in the memory section 21. "ID(LTA)" is sent to the channel unit 3 as command data for executing the local test access (step A11). Thereafter, the data "DATA(#1–#n)" for controlling/setting the test relays 31B and 31C in the channel unit 3 are sent to the channel unit 3 (step A12). "EBL" is sent as the end of the sequence of transmission data (step A13).

At this time, as previously described, the control apparatus 2 (the controller section 23) is monitoring whether or not the number of transmitted bytes of "DATA(#1–#n)" reaches the transmission byte number previously set in the byte number register 31 (transmission data length setting register 48) (step A14). When "EBL" is not properly read from the memory section 21 and the transmission of "EBL" is not detected, the transmission of "DATA(#1–#n)" is terminated when the number of transmitted bytes of "DATA(#1–#n)" reaches the preset transmission byte number.

Upon reception of "EBL", the channel unit 3 sends "ACK" back to the control apparatus 2 again as a response to the proper reception of "EBL" (step A15). The channel unit 3 then controls the "ON" and "OFF" operations of the test relays 31B and 31C on the basis of the "DATA(#1–#n)" received from the control apparatus 2, whereby the local test access is executed (step A16).

Upon reception of "ACK" from the channel unit 3, the control apparatus 2 writes it into the reception data memory area 213, so that the sequence of communication processing (the control sequence) is now completed (step A17). Subsequently, the control apparatus 2 sets the interruption type information (CNTINT) in a corresponding area of the interruption register 40, as well as outputting an interruption signal to the CPU 1 (step A18). Then, the control apparatus 2 enters the wait state (i.e., it waits for the start trigger) (step A19).

Upon reception of an interruption signal from the control apparatus 2 (step A20), the CPU 1 identifies the completed communication processing as the control sequence by reading the interruption type information from the interruption register 40. Further, the CPU identifies that the local test access processing has been normally executed by reading "ACK" one by one from the reception data memory area 213 (steps A21 to A23).

Figure 37:
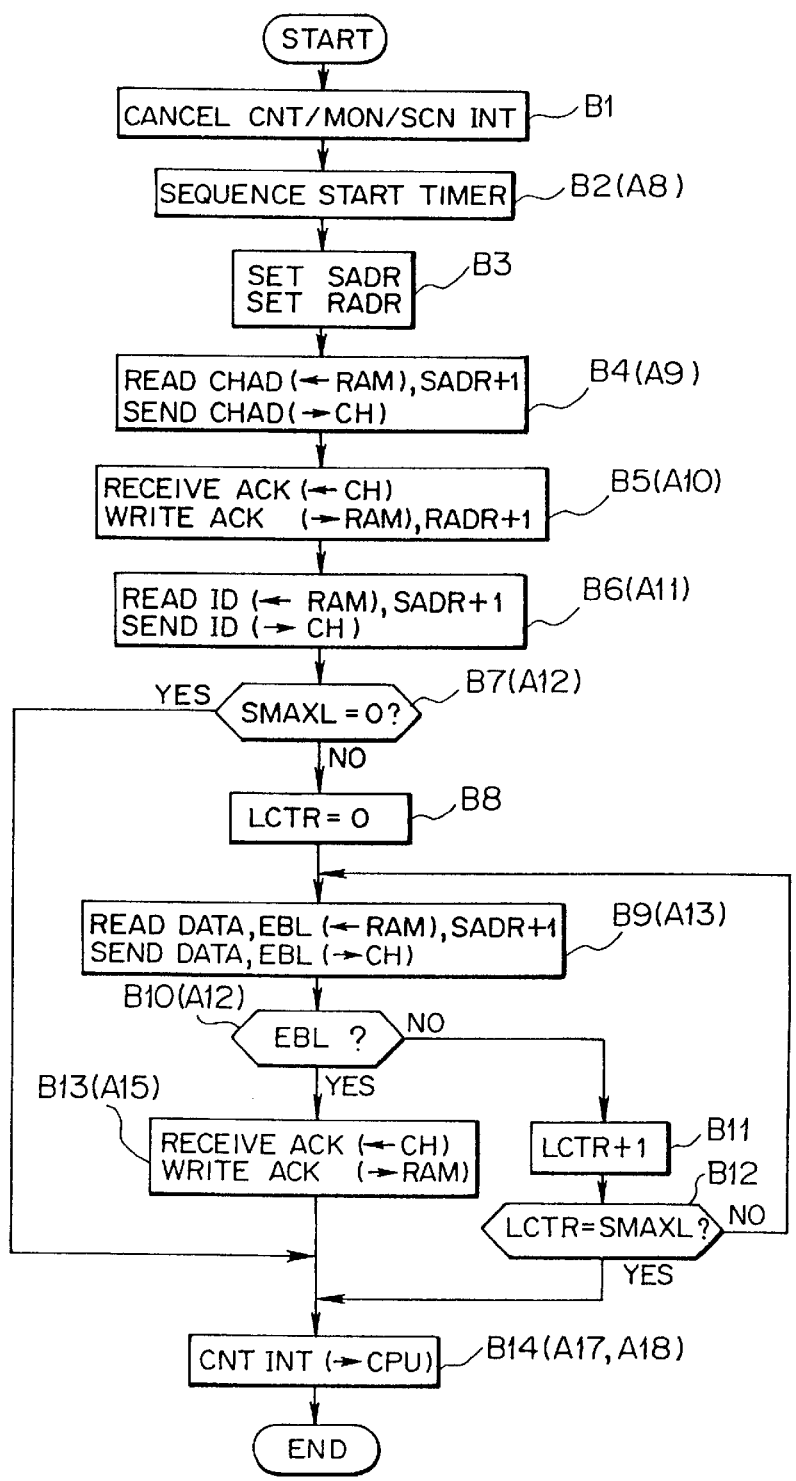
FIG. 37 is a flow chart for explaining the control sequence processing according to the embodiment.

With reference to a flowchart (steps B1 to B14) shown in FIG. 37, the operation of the control apparatus 2 (controller section 23) at the time of the execution of the control sequence will be described hereunder. In FIG. 37, parenthesized steps (A8, A9, or the like) correspond to the steps which have been previously described referring to FIG. 36.

When the timer section 34 has counted up the timer value, the controller section 23 of the control apparatus 2 acknowledges that the start trigger (CNTTRG) is set in the control-sequence start control register 44. As a result, the controller section 23 initializes the interruption register 40 (i.e., it cancels CNT/MON/SCN INT) (step B1), and starts the timer section 34 on the basis of the timer value set in the timer register 32 (step B2). A corresponding address in the transmission data memory area 212 is set as an address (SADR) which holds the transmission data ("CHAD") to be read from the memory section 21. On the other hand, a corresponding address of the reception data memory area 213 is set as a storage address (RADR) for the reception data ("ACK") to be written into the memory section 21 (step B3).

The controller section 23 reads "CHAD" from the transmission data memory area 212 whose reading-out address is designated by the transmission data storage address (SADR), and the transmission data storage address (SADR) is incremented (SADR+1). The thus read "CHAD" is sent to the channel unit 3 (step B4). Upon reception of "ACK" from the channel unit 3 as a response to "CHAD", the controller section 23 writes "ACK" into the reception data memory area 213 whose writing address is designated by the reception data storage address (RADR). The reception data storage address (RADR) is incremented (RADR+1) (step B5).

The controller section 23 then reads "ID" from the incremented transmission data storage address (SADR+1) of the transmission data memory area 212. The transmission data storage address (SADR) is further incremented (SADR+1), and the thus read "ID" is sent to the channel unit 3 (step B6).

When "zero" is set in the byte number register 31 (transmission data length setting register 48) as the transmission byte number (SMAXL) (i.e., when an affirmative judgment is made in step B7), the controller section 23 immediately writes the interruption type information (CNTINT) into the interruption register 40. An interruption signal is then output to the CPU 1, whereby the processing is completed (step B14). However, when a value other than "zero" (e.g. seven) is set as the transmission byte number (SMAXL) (i.e., when a negative judgment is made in step B7), the count value (LCTR) for counting the number of transmitted bytes is set to "zero" (step B8).

The controller section 23 reads "DATA" or "EBL" from the transmission data memory area 212 whose reading-out address is designated by the transmission data storage address (SADR+1) which was incremented in step B6. The transmission data storage address (SADR) is further incremented, and "DATA" or "EBL" is sent to the channel unit 3 (step B9).

The controller section 23 determines whether or not the transmitted data are "EBL" (step B10). When the transmitted data are not "EBL" (i.e., when a negative judgment is made in step B10), the count value (LCTR) is incremented (LCTR+1) (step B11). Further, the control apparatus determines whether or not the count value (LCTR) has reached the transmission byte number (SMAXL) set in the byte number register 31 (step B12).

As a result, when the count value (LCTR) has not reached the transmission byte number (SMAXL) set in the byte number register 31 yet (when a negative judgment is made in step B12), the processes in step B9 and the following steps are repeated until "EBL" is sent or until the count value (LCTR) reaches the transmission byte number (SMAXL) set in the byte number register 31, because the data to be sent ("DATA") still remains.

When the count value (LCTR) has reached the transmission byte number (SMAXL) set in the byte number register 31 (i.e. when an affirmative judgment is made in step B12), the interruption type information (CNTINT) is written into the interruption register 40 without receiving "ACK" from the channel unit 3. Then, the data transmission is forcibly terminated by outputting an interruption signal to the CPU 1 (step B14).

When it is judged in step B10 that the transmitted data are "EBL" in step B10 (i.e., when an affirmative judgment is made in step B10), the controller section 23 receives "ACK" from the channel unit 3 as a response to "EBL". The thus received "ACK" is then written into the reception data memory area 213 whose address is designated by the incremented reception data storage address (RADR: step B5) (step B13). Further, the interruption type information (CNTINT) is written into the interruption register 40, and an interruption signal is normally output to the CPU 1 in order to terminate the transmission processing (step B14).

As described above, according to the communication control apparatus (the channel unit control apparatus 2) of the present embodiment, the control apparatus 2 notifies the CPU 1 of the completion of the communication processing using an interruption signal after the completion of the sequence of communication processing rather than outputting an interruption signal to the CPU 1 every time the transmission data ("CHAD", "ACK", "ID", "DATA", "EBL", and "ACK") are exchanged between the control apparatus 2 and the channel unit 3. As a result, it becomes unnecessary for the CPU 1 to constantly communicate with the control apparatus 2 as well as to directly communicate with the channel unit 3.

Therefore, the CPU 1 becomes possible to execute other processing until the control apparatus 2 has finished the sequence of communication processing, which makes it possible to considerably reduce the processing load due to communication processing for the channel unit 3.

The control apparatus 2 sequentially sends "CHAD", "ID", "DATA", and "EBL" to a corresponding channel unit 3, and it then receives "ACK" one by one from that channel unit 3 as a response to the transmission data. As a result, the control sequence for the channel unit 3 is executed, and the completion of the sequence of communication processing can be recognized. It becomes possible to reliably notify the CPU 1 whether or not the control/setting processing for a certain channel unit 3 has been properly carried out.

In this case, as previously described with reference to FIG. 2, a total of 48 channel units 3 are divided into eight groups 3-1 to 3-8, each group comprising six channel units. These channel groups 3-1 to 3-8 are connected to the control apparatus 2 through eight serial buses 4. A communication bus selecting register 46 is provided in the control apparatus 2. When the previously described communication processing is executed, it is possible to send data to, or receive data from, a corresponding channel unit 3 by selecting the serial bus 4 connected to one of the channel groups 3-1 to 3-8 which includes the corresponding channel unit 3.

The number of the serial buses 4 is not set to be equal to the number of channel units 3 (i.e., forty eight), but it can be considerably reduced so as to be equal to the number of channel groups 3-1 to 3-8 (i.e., eight), which greatly contributes to the reduced size and increased packaging density of the apparatus.

The CPU 1 can read "ACK" held in the control apparatus 2 (i.e., the memory section 21) at any time after reception of an interruption signal from the control apparatus 2. It is possible for the CPU 1 to reliably know the fact as to whether or not the control sequence was properly executed.

"CHAD" comprises the "CHAD" code and a channel unit number [see FIG. 9(a)], and "EBL" comprises the "EBL" code and the channel unit number [see FIG. 9(b)]. Therefore, it is possible to reliably exchange data between the control apparatus and the corresponding channel unit 3, which makes it possible to considerably improve the reliability of the previously described sequence of communication processing.

The control apparatus 2 automatically terminates the transmission of data ("DATA") when the number of transmitted bytes of the control/setting data ("DATA") has reached the transmission byte number set in the byte number register 31. Even in the event that the CPU 1 encounters any trouble so that the control apparatus 2 becomes impossible to receive "EBL" which represents the end of the transmission data, the control apparatus 2 can be reliably prevented from running away.

(2) Monitor Sequence

Figure 38:
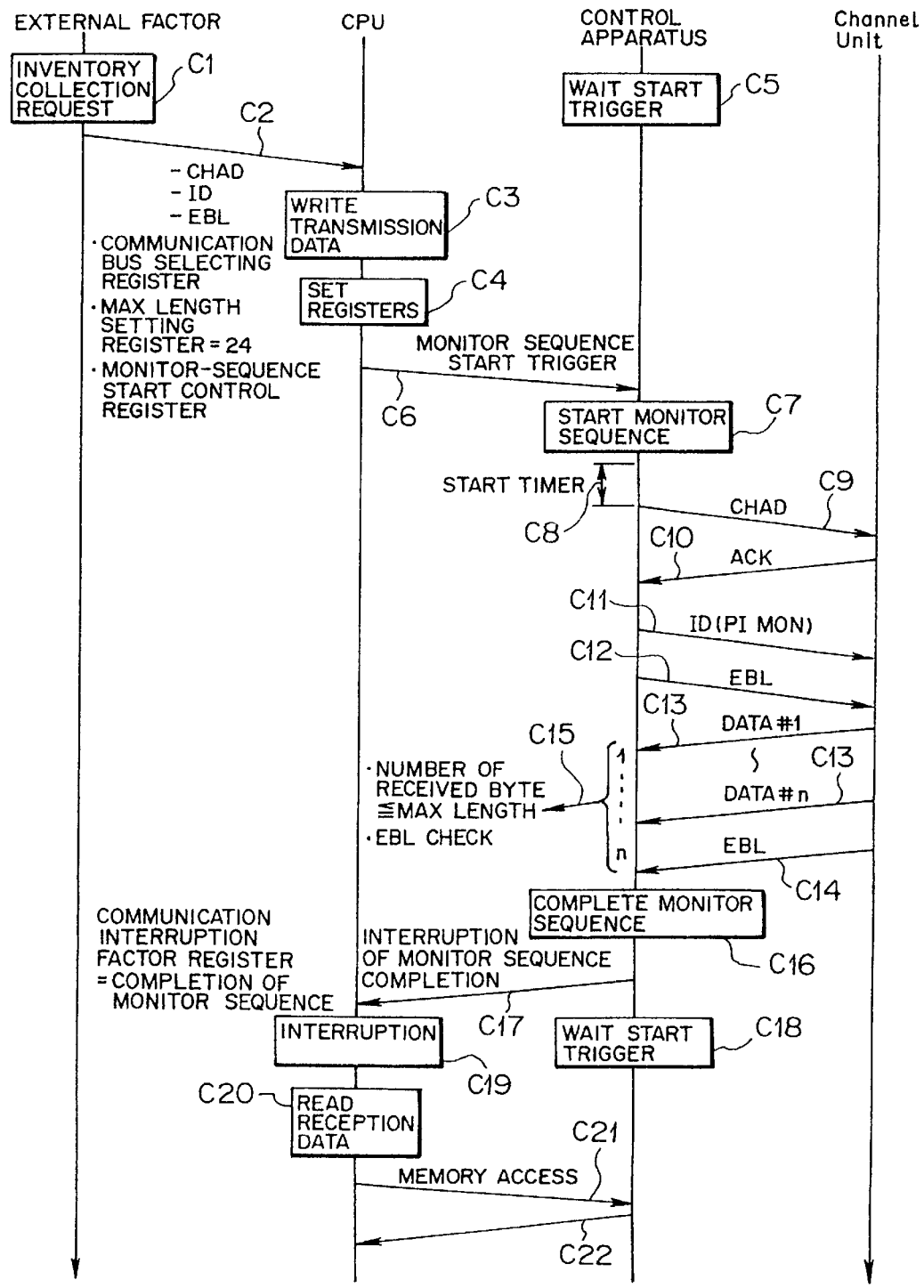
FIG. 38 is a sequence chart for explaining the monitor sequence processing according to the embodiment.

Using a sequence chart (steps C1 to C22) shown in FIG. 38, the operation of the control apparatus will now be described for an example of the monitor sequence, that is, the case where unit management information (inventory), such as the manufacturing date and name of the channel unit 3, is collected.

The CPU 1 first receives from outside data necessary to collect inventories (e.g., the local terminal 10) (steps C1 and C2). The data include "CHAD", "ID", and "EBL", data (i.e., a channel group number for which a sequence is carried out) for setting the communication bus selecting register 46 (see FIG. 8), data (the number of bytes of reception data is set to, e.g., 24 in this example) for setting the reception data length setting register 47, and a start trigger (MONTRG) for setting the monitor sequence start control register 45.

The CPU 1 writes the transmission data ("CHAD", "ID", and "EBL") into a corresponding memory area [the transmission data memory area 214 (see FIGS. 10 and 13)] of the memory section 21 in the control apparatus 2 (writing of transmission data: step C3). The data received from the CPU 1 are written into the registers 45–47 in the control apparatus 2, whereby the registers are set (step C4). At this time, the control apparatus 2 is waiting for a communication processing request from the CPU 1 (i.e., it is waiting for a start trigger) (step C5).

The control apparatus 2 recognizes that the start trigger (MONTRG) is set to the monitor-sequence start control register 45 (step C6) and starts to execute the monitor sequence (step C7). In this case as well, the control apparatus 2 does not immediately execute the monitor sequence in response to the start trigger but executes the sequence after the timer section 34 (see FIG. 7) has counted up the timer value set in the timer register 32 (start timer setting register) (i.e., after the lapse of a predetermined time) (step C8).

After the timer section 34 has counted up the timer value, the control apparatus 2 reads "CHAD" from the transmission data memory area 214 of the memory section 21. The thus read "CHAD" data are sent to a corresponding channel unit 3 through the transmission/reception section 22 (step C9). When the channel unit 3 that has received "CHAD" operates properly, it sends "ACK" back to the control apparatus 2 as a response to acknowledge the proper reception of "CHAD" (step C10).

Upon reception of "ACK", the control apparatus 2 writes it into a corresponding memory area (control sequence reception data memory 215: see FIGS. 10 and 14) in the memory section 21. "ID (PI MON: Physical Inventory Monitor)" is sent to the channel unit 3 as command data for executing the local test access (step C11). Thereafter, "EBL" is sent as the end of the sequence of transmission data (step C12).

The channel unit 3 which received "EBL" sends its own inventory information ("DATA(#1–#n)") back to the control apparatus 2 (step C13). After having finished sending "DATA(#1–#n)", the channel unit 3 sends "EBL" back to the control apparatus 2 (step C14). The control apparatus 2 compares the channel unit number (Channel Number) of the five lowermost bits of "EBL" with the channel unit number (Channel Number) of the five lowermost bits of the first transmitted "CHAD". When there is a match between them, the control apparatus identifies "EBL" as the end of "DATA" and writes the reception data into the memory section 21. When this is not the case, the control apparatus 2 does not identify the reception data as "EBL" and continues receiving "DATA".

In other words, the control apparatus 2 compares the channel unit number in the transmitted "CHAD" with the channel unit number in "EBL" received from the channel unit 3 as a response to the transmission data. As a result, the accuracy of "DATA" sent from the responding channel unit 3 is judged, thereby improving the accuracy of the communication processing.

At this time, as previously described, the control apparatus 2 (the controller section 23) is monitoring whether or not the number of received bytes of "DATA(#1–#n)" reaches the reception byte number (24 in the present embodiment) previously set in the reception data length setting register 47 (step C15). As will be described later with reference to FIG. 39, when the reception of "EBL" is not detected, the reception of "DATA(#1–#n)" is terminated when the number of received bytes of "DATA(#1–#n)" reaches the reception byte number previously set in the reception data length setting register 47.

The control apparatus 2 sequentially writes "DATA (#1–#n)" and "EBL" received from the channel unit 3 into the reception data memory area 215 in the memory section 21, so that the sequence of communication processing (monitor sequence) is now completed (step C16). Subsequently, the control apparatus 2 sets the interruption type information (MONINT) in a corresponding area of the interruption register 40, as well as outputting an interruption signal to the CPU 1 (step C17). Then, the control apparatus 2 enters the wait state (i.e., it waits for the start trigger) (step C18).

Upon reception of an interruption signal from the control apparatus 2 (step C19), the CPU 1 identifies the completed communication processing as the monitor sequence by reading an interruption type information from the interruption register 40. Subsequently, the CPU 1 collects inventory information of the channel unit 3 by sequentially reading "ACK" and "DATA(#1–#n)", and "EBL" from the reception data memory area 215 (steps C20 to C22).

Figure 39:
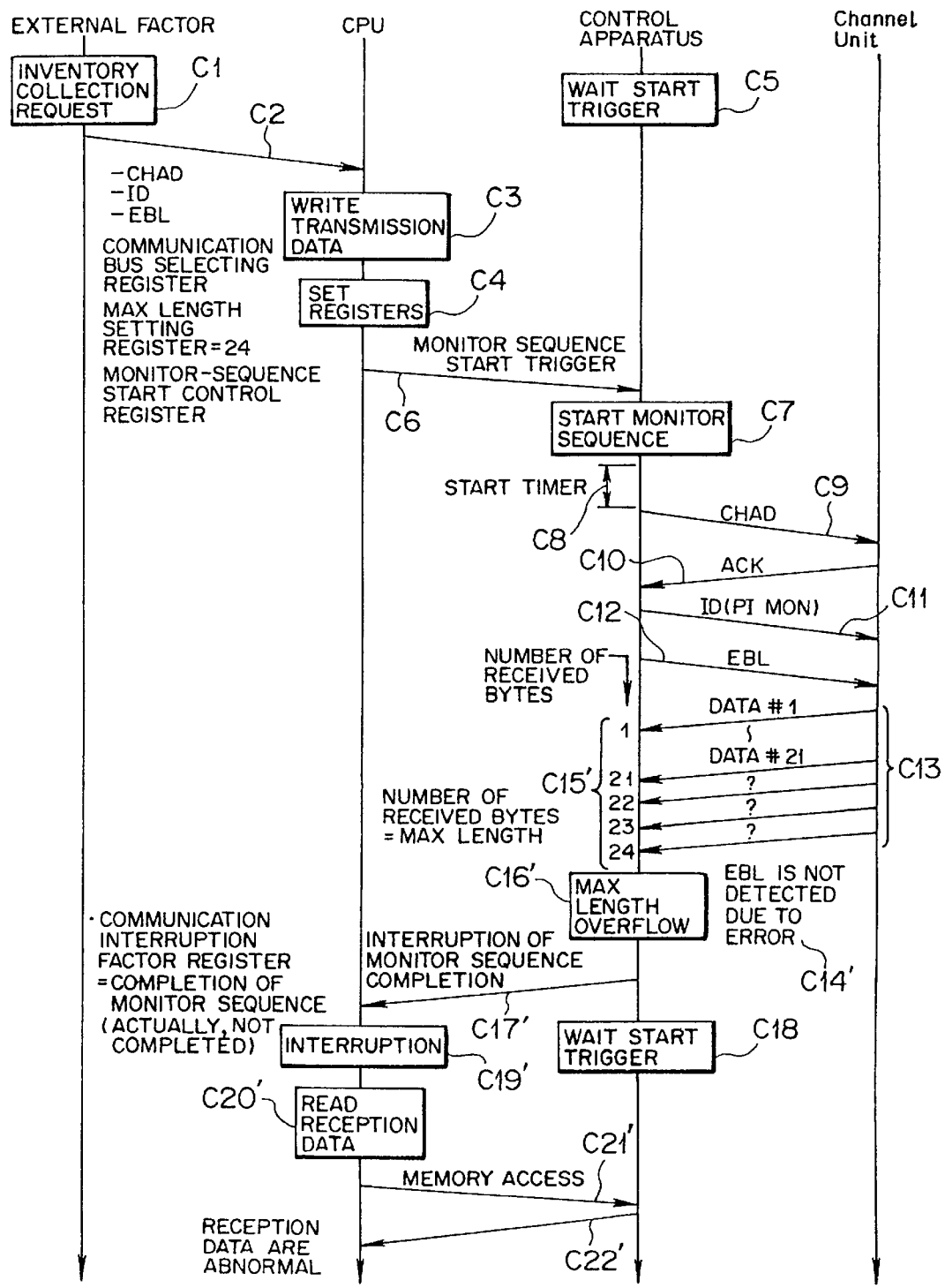
FIG. 39 is a sequence chart for explaining the monitor sequence processing (in abnormal conditions) according to the embodiment.

When the channel unit 3 encounters any trouble so that it becomes impossible to properly send "EBL" to the control apparatus 2 (step C14'), as shown in FIG. 39, while sending the inventory information of the channel unit 3 itself "DATA (#1–#n)" back to the control apparatus 2 in step C13, the control apparatus 2 forcibly terminates the monitory sequence by stopping the reception of "DATA(#1–#n)" (i.e., the reception of "EBL" and the writing of it into the memory section 21) when the number of received bytes of "DATA (#1–#n)" has reached the reception byte number (24 in the present embodiment) previously set in the reception data length setting register 47 (step C15'), whereby the number of received bytes (MAX LENGTH) overflows (step C16).

The control apparatus 2 sets the interruption type information (MONINT) in a corresponding area of the interruption register 40, as well as outputting an interruption signal to the CPU 1 (step C17'). Then, the control apparatus 2 enters the wait state (i.e., it waits for the start trigger) (step C18'). Subsequently, upon reception of an interruption signal from the control apparatus 2 (step C19'), the CPU 1 identifies the completed communication processing as the monitor sequence by reading the interruption type information from the interruption register 40. The CPU 1 sequentially reads "ACK" and "DATA(#1–#n)" from the reception data memory area 215. However, it is impossible for the CPU 1 to read "EBL" at this time, and hence the CPU 1 recognizes an abnormality in the reception data and the abnormal completion of the monitor sequence (steps C20' to C22').

Figure 40:
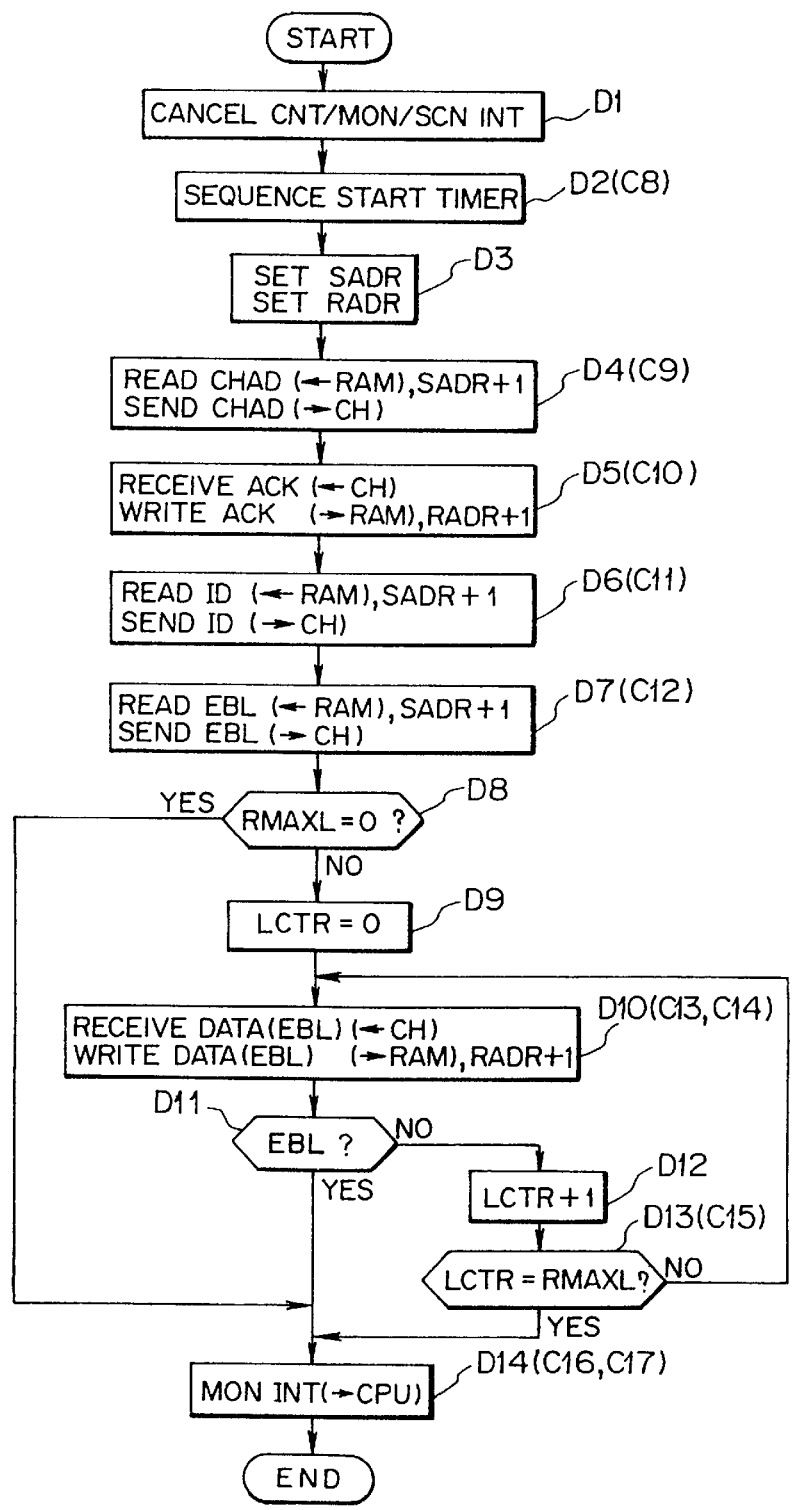
FIG. 40 is a flow chart for explaining the monitor sequence processing according to the embodiment.

With reference to a flowchart (steps D1 to D14) shown in FIG. 40, the operation of the control apparatus 2 (the controller section 23) at the time of the execution of the previously described monitor sequence will be described hereunder. In FIG. 40, parenthesized steps (C8, C9, or the like) correspond to the steps which are previously described referring to FIG. 38 (or FIG. 39).

When the controller section 23 of the control apparatus 2 acknowledges that the start trigger (MONTRG) is set in the monitor-sequence start control register 45, the controller section 23 initializes the interruption register 40 (i.e., it cancels CNT/MON/SCN INT) (step D1), and starts the timer section 34 on the basis of the timer value set in the timer register 32 (step D2). A corresponding address in the transmission data memory area 214 is set as the address (SADR) which holds the transmission data ("CHAD") to be read from the memory section 21. On the other hand, a corresponding address of the reception data memory area 215 is set as the storage address (RADR) for the reception data ("ACK") to be written into the memory section 21 (step D3).

After the timer section 34 has counted up the timer value, the controller section 23 reads "CHAD" from the transmission data memory area 214 whose reading-out address is designated by the transmission data storage address (SADR). The transmission data storage address (SADR) is incremented (SADR+1), and the thus read "CHAD" is sent to the channel unit 3 (step D4). Upon reception of "ACK" from the channel unit 3 as a response to "CHAD", the controller section 23 writes "CHAD" into the reception data memory area 215 whose writing address is designated by the reception data storage address (RADR). The reception data storage address (RADR) is incremented (RADR+1) (step D5).

The controller section 23 then sequentially reads "ID" and "EBL" from the transmission data memory area 214 while incrementing the transmission data storage address (SADR). The thus read "ID" and "EBL" are sent to the channel unit 3 (steps D6 and D7).

When "zero" is set in the reception data length setting register 47 as the reception byte number (RMAXL) (i.e., when an affirmative judgment is made in step D8), the controller section 23 immediately writes the interruption type information (MONINT) into the interruption register 40. An interruption signal is then output to the CPU 1, whereby the processing is completed (step D14). However, since 24 is set as the reception byte number (RMAXL) (i.e., a negative judgment is made in step DS), the count value (LCTR) for counting the number of received bytes is set to "zero" (step D9).

Upon reception of "DATA" (or "EBL") from the channel unit 3, the controller section 23 writes "DATA" (or "EBL") in a corresponding area of the memory section 21 (i.e., the area designated by the reception data storage address (RADR) in the reception data memory area 215). The reception data storage address (RADR) is incremented (step D10).

The controller section 23 determines whether or not the data written into the reception data memory area 215 are "EBL" (step D11) using the data monitoring section 37. When the data are not "EBL" (i.e., when a negative judgment is made in step D11), the count value (LCTR) is incremented (LCTR+1) (step D12). Further, the control apparatus determines whether or not the count value (LCTR) has reached the reception byte number (RMAXL) set in the reception data length setting register 47 (step D13).

As a result, when the count value (LCTR) has not reached the reception byte number (RMAXL) set in the reception data length setting register 47 yet (when a negative judgment is made in step D12), the processes in step D10 and the following steps are repeated until "EBL" is received or until the count value (LCTR) reaches the reception byte number (RMAXL) set in the reception data length setting register 47, because the data ("DATA") received from the channel unit 3 still remains.

When the count value (LCTR) has reached the reception byte number (RMAXL) set in the reception data length setting register 47 (i.e. when an affirmative judgment is made in step D13), the interruption type information (MONINT) is written into the interruption register 40 without receiving "EBL" from the channel unit 3. Then, the data transmission is forcibly terminated by outputting an interruption signal to the CPU 1 (abnormal completion) (step D14).

When it is judged in step D11 that the data received from the channel unit 3 are "EBL" (i.e., when an affirmative judgment is made in step D11), the controller section 23 writes "EBL" into the reception data memory area 215 whose address is designated by the incremented reception data storage address (RADR: see step D10). Further, the interruption type information (MONINT) is written into the interruption register 40, and an interruption signal is normally output to the CPU 1 in order to terminate the processing (step D14).

As described above, according to the communication control apparatus (the channel unit control apparatus 2) of the present embodiment, the control apparatus 2 sequentially sends "CHAD", "ID", and "EBL" to a corresponding channel unit 3 (for which the monitor sequence is executed), and sequentially receives "ACK", "DATA", and "EBL" as a response to the transmission data. The monitor sequence is executed for the channel unit 3, and the control apparatus 2 recognizes the completion of the sequence of communication processing. As a result, the connection/operation status and inventory information of the channel unit 3 are reliably acquired, and the completion of the acquisition of the information can be notified to the CPU 1.

In this case as well, the previously described communication control apparatus has a total of 48 channel units 3 which are divided into eight groups 3-1 to 3-8, each group comprising six channel units 3. These channel groups 3-1 to 3-8 are connected to the control apparatus 2 through eight serial buses 4. The communication bus selecting register 46 is provided in the control apparatus 2. When the monitor sequence is executed with respect to a certain channel unit 3, it is possible to send data to, or receive data from, that channel unit 3 by selecting the serial bus 4 connected to one of the channel groups 3-1 to 3-8 which includes the corresponding channel unit 3.

The number of serial buses 4 between the control apparatus 2 and the channel units 3 is not set to be equal to the number of channel units 3 (i.e., forty eight), but it can be considerably reduced so as to be equal to the number of channel groups 3-1 to 3-8 (i.e., eight), which greatly contributes to the reduced size and increased packaging density of the apparatus.

The CPU 1 can read the data ("ACK" and "DATA") held in the control apparatus 2 (i.e., the memory section 21) at any time after reception of an interruption signal from the control apparatus 2. It is possible for the CPU 1 to reliably know the fact as to whether or not the channel units 3 are properly connected to the control apparatus 2 and the fact as to whether or not the channel units 3 operate properly.

In this event, it is possible for the CPU 1 to constantly recognize the end of "DATA" by reading "EBL" from the control apparatus 2 after reading "DATA". Therefore, the amount of "DATA" can be very easily changed.

In this case as well, "CHAD" comprises the "CHAD" code and the channel unit number, and "EBL" comprises the "EBL" code and a channel unit number. Therefore, it is possible to clearly recognize the ends of the transmission data and reception data as well as to reliably exchange the data between the control apparatus and the corresponding channel unit 3, which makes it possible to considerably improve the reliability of the previously described monitor sequence.

The control apparatus 2 automatically terminates the transmission of "DATA" without receiving "EBL" when the number of bytes (amount of data) of "DATA" received from the channel unit 3 has reached the reception byte number set in the byte number register 31 (reception data length setting register 47). Therefore, in the event that the control apparatus 2 cannot receive "EBL", the control apparatus 2 can be reliably prevented from running away.

(3) Auto scan

Figure 41:
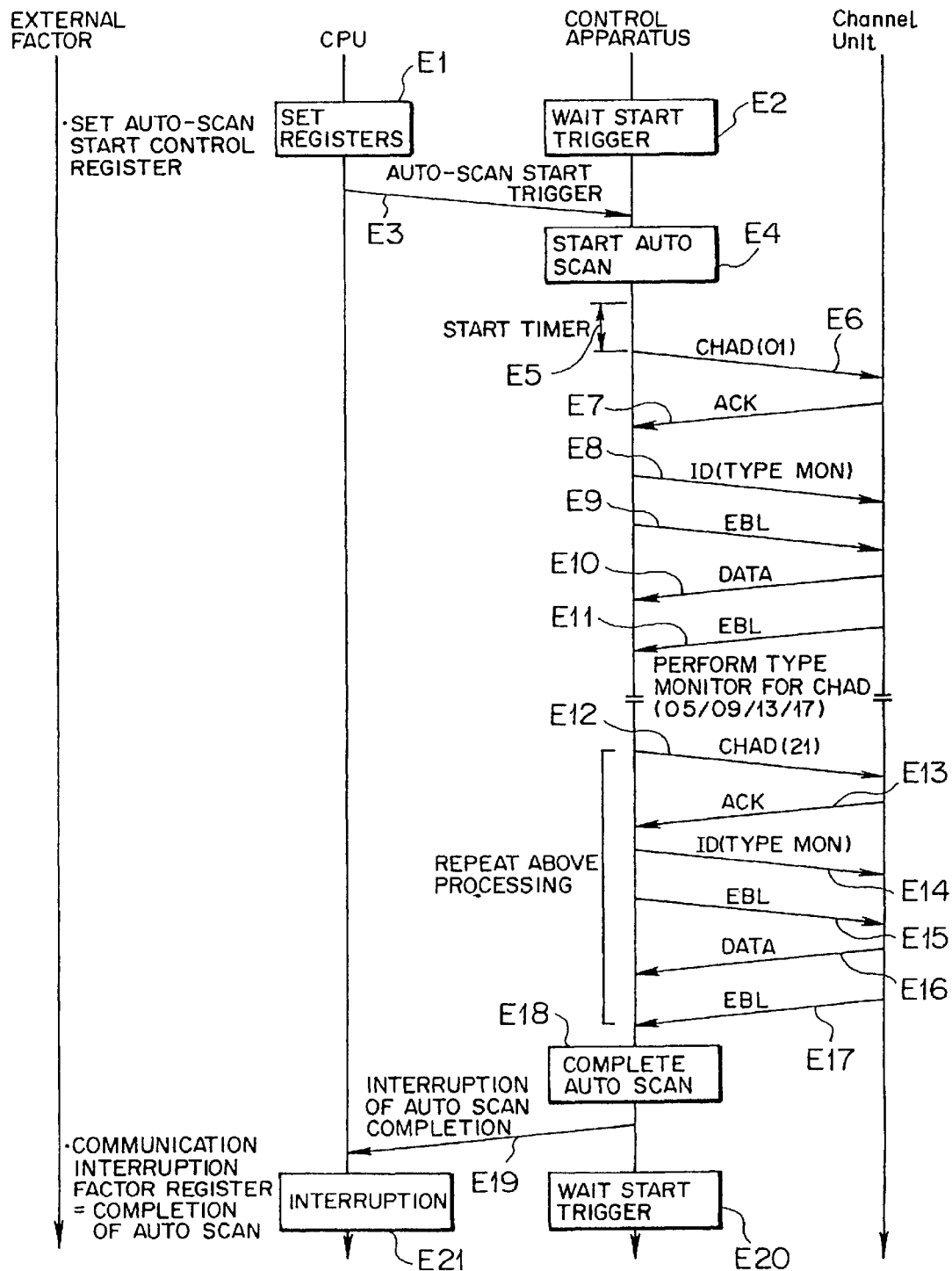
FIG. 41 is a sequence chart for explaining the auto scan processing according to the embodiment.

The operation of the control apparatus will now described hereinbelow for the case where auto scan is executed, with reference to a sequence chart (steps E1 to E21) shown in FIG. 41.

Differing from the previously described control sequence and monitor sequence, the auto scan for each channel unit 3 is not carried out in response to an external request (external factor) such as the local terminal 10, but it is repeatedly executed as a result of the automatic output of a start trigger to the control apparatus 2 at constant intervals by the CPU 1.

First, the CPU 1 automatically sets a start trigger (SCNTRG: see FIG. 16(c)) in the auto-scan start control register 43 in the controller section 23 of the control apparatus 2 (step E1). At this time, the control apparatus 2 is waiting for a start trigger (step E2). Upon acknowledgement of the start trigger (SCNTRG) being set in the auto-scan start control register 43 (step E3), the control apparatus 2 executes auto scan for all of the channel units 3 (step E4). In this case as well, the control apparatus 2 does not immediately execute the auto scan in response to the start trigger (SCNTRG) but executes the operation in the following manner after the timer section 34 (see FIG. 7) has counted up the value set in the timer register (start timer setting register) 32 (i.e., after the lapse of a predetermined time) (step E5).

Specifically, in order to simultaneously examine the mounted state of the channel units 3 (each channel unit accommodates four subscriber lines "01" to "04") for each of the channel unit groups 3-1 to 3-8, the control apparatus 2 simultaneously sends "CHAD(01)", which designates a subscriber-line number "01", to each of the channel unit groups 3-1 to 3-8 through the eight serial buses 4 respectively connected to the channel unit groups 3-1 to 3-8 (step E6).

When the channel units 3 of each of the channel unit groups 3-1 to 3-8 that received "CHAD01" are properly mounted, "ACK" is simultaneously (in a parallel manner) sent back to the control apparatus 2 through the eight serial buses 4.

Upon reception of "ACK" simultaneously sent from each of the channel unit groups 3-1 to 3-8 through all of the serial buses 4, the control apparatus 2 multiplexes the received "ACK" data by time-division multiplexing using the reception data processing section 53. The thus multiplexed data are sequentially written into a corresponding area in the memory section 21 [auto scan reception data memory area 211: see FIGS. 10 and 15] for each channel unit (slot) 3 in a time-division manner (step E7).

The control apparatus 2 simultaneously sends "ID(TYPE MON)" designating "monitoring execution" to the channel unit groups 3-1 to 3-8 which sent "ACK" back to the control apparatus 2, as command data, through all of the serial buses 4 (step E8). Thereafter, the control apparatus 2 sends "EBL" back to the channel unit groups (step E9). Upon reception of "ID" and "EBL", each channel unit 3 sends "DATA" (mount status data) back to the control apparatus 2 as a response (step E10). Thereafter, the channel unit sends "EBL" back to the control apparatus 2 (step E11). The control apparatus 2 multiplexes the received "DATA" and "EBL" and sequentially writes the multiplexed data into the above-described reception data memory area 211 in a time-division manner for each channel unit 3.

As a result, the mount state of one channel unit 3 (a channel number of "01") of six channel units 3 in each of the channel unit groups 3-1 to 3-8 is retained in the memory section 21.

The control apparatus 2 automatically increments a subscriber line number used with "CHAD" (hereinafter referred to as a "CHAD" number), and repeatedly executes the similar communication processing for the remaining five channel units 3 in each of the channel unit groups 3-1 to 3-8. In consequence, the control apparatus 2 acquires "DATA" and "EBL" from all of the channel units 3 of each of the channel unit groups 3-1 to 3-8 (steps E12 to E17).

In general, with regard to the mount status of the channel unit 3, it is only necessary to examine one of a plurality of subscriber lines included in the channel unit 3. For this reason, the control apparatus 2 automatically updates the "CHAD" number to any one of channel numbers of the subscriber lines included in the remaining channel units 3 of each of the channel unit groups 3-1 to 3-8. The thus updated "CHAD" is simultaneously sent to each of the channel unit groups 3-1 to 3-8.

For example, each of the six channel units 3 in one channel unit group accommodates four subscriber lines (that is, subscriber-line numbers in one channel unit group are "01" to "24"). Therefore, the "CHAD" number is automatically incremented by four at a time; namely, "01"→"05"→"09"→"13"→"17"→"21", and "CHAD" is simultaneously sent to each of the channel unit groups 3-1 to 3-8.

As previously described, the control apparatus 2 simultaneously receives "DATA" and "EBL" from all of the channel units 3 from each of the channel unit groups 3-1 to 3-8 through all of the serial buses 4. The thus received "DATA" and "EBL" are written into the reception data memory area 211 in the memory section 21 in a time-division manner for each channel unit 3. The auto scan is now completed (step E18). Subsequently, the control apparatus 2 sets the interruption type information (SCNINT) in a corresponding area of the interruption register 40, as well as outputting an interruption signal to the CPU 1 (step E19). Then, the control apparatus 2 enters the wait state (i.e., it waits for the start trigger) (step E20).

Upon reception of an interruption signal from the control apparatus 2, the CPU 1 identifies the completed communication processing as the auto scan by reading the interruption type information (SCNINT) from the interruption register 40. Subsequently, the CPU 1 sequentially reads "DATA" and "EBL" which were written in the memory section 21 (the reception data memory area 211) in a time-division manner as previously described. As a result, the CPU 1 can know the mounted status of all of the channel units 3 without directly executing the previously described sequence of communication processing for each channel unit 3.

Figure 42:
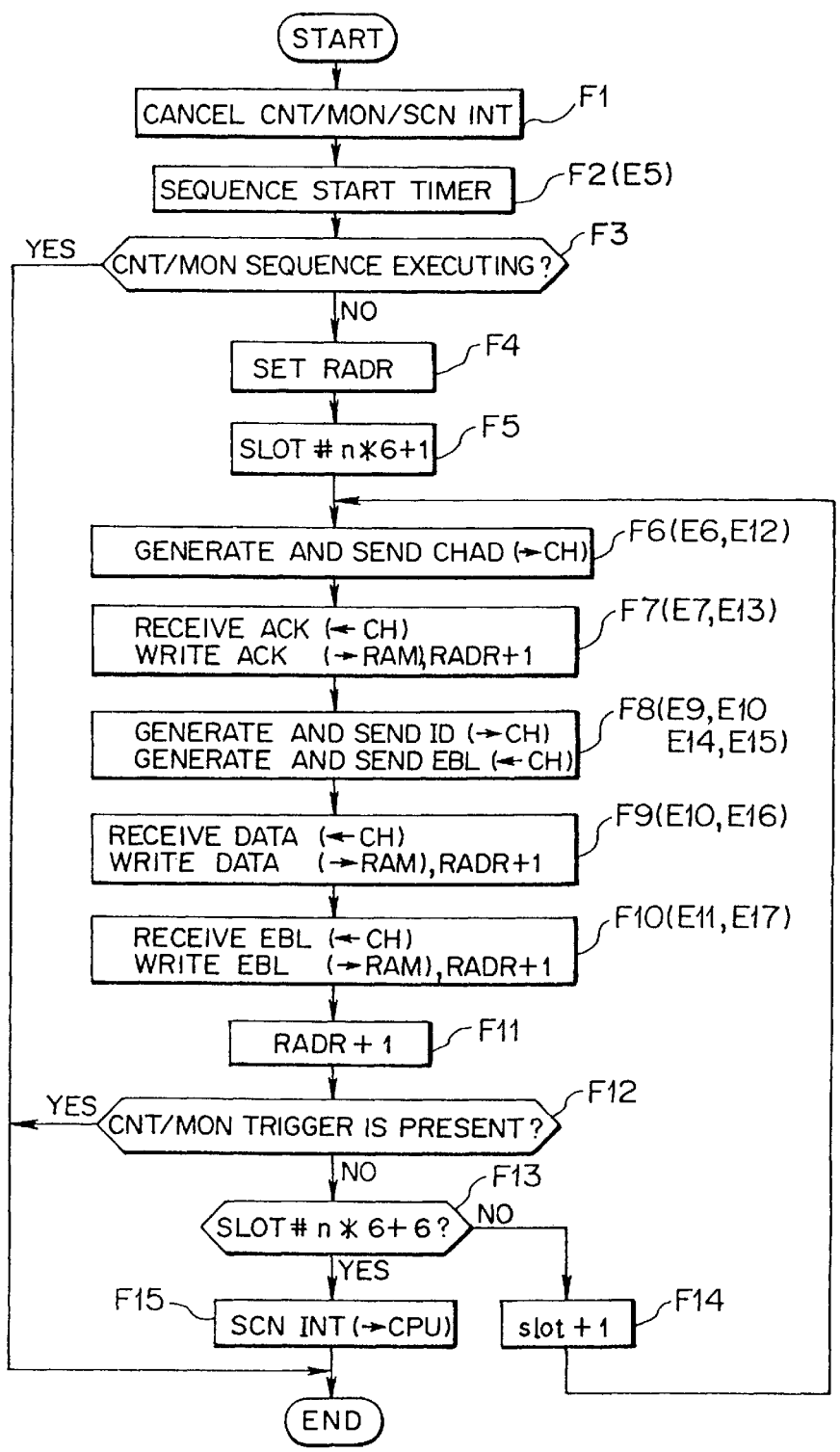
FIG. 42 is a flow chart for explaining the auto scan processing according to the embodiment.

With reference to a flowchart (steps F1 to F15) shown in FIG. 42, the operation of the control apparatus 2 (the controller section 23) at the time of the execution of the previously described auto scan will be described hereunder. In FIG. 42, parenthesized steps (E5, E6, or the like) correspond to the steps which are previously described referring to FIG. 41.

When the controller section 23 of the control apparatus 2 acknowledges that the start trigger (SCNTRG) is set in the auto-scan start control register 43, the control sections 23 initializes the interruption register 40 (i.e., it cancels CNT/MON/SCN INT) (step F1), and activates the timer section 34 on the basis of the timer value set in the timer register 32 (step F2).

In this event, the controller section 23 determines whether or not the control sequence or the monitor sequence as previously described in sections (1) and (2) is currently executed (i.e., the controller section 23 determines the level of priority of communication processing) using the priority processing section 33 (step F3). When the control sequence or the monitor sequence is currently executed (i.e., when an affirmative judgment is made in step F3), the auto scan is not executed even when the start trigger (SCNTRG) is set in the auto-scan start control register 43, because the priority processing section 33 determines that the control sequence or the monitor sequence has a higher priority.

The reason why the auto scan is not executed while the control sequence or the monitor sequence is being executed is that, as described above, the auto scan is cyclically executed in response to a request issued from the CPU 1 at constant intervals, whereas the control sequence and the monitor sequence are immediately executed in response to a request (external factor) from the local terminal 10, or the like (i.e., the control sequence and the monitor sequence are operations which must be performed immediately.)

When the control sequence or the monitor sequence is not currently executed (i.e., when a negative judgment is made in step F3), the control apparatus 2 sets a corresponding address of the reception data memory area 211 as the storage address (RADR) for the reception data ("ACK") to be written into the memory section 21 (step F4). The control apparatus 2 sets initial values (SLOT #n*6+1:n=0–7) for the channel unit number (the slot number) in each of the channel unit groups 3-1 to 3-8 to which "CHAD" is to be initially sent (step F5).

As a result, channel units 3 having slot numbers in the first column of Table 2 (i.e., SLOT #1, 7, 13, 19, 25, 31, 37, and 43) are selected as the channel units 3, to which "CHAD" is to be sent, in each of the channel unit groups 3-1 to 3-8. The slot numbers (1–48) are sequentially provided to the channel units 3 starting from the channel unit 3 in the channel unit group 3-1, as shown in Table 2. To change the number of channel units 3 which form each of the channel unit groups 3-1 to 3-8, it is only necessary to reset the channel unit numbers (slot numbers) in the channel unit number register 48' (sew FIG. 8), as required.

TABLE 2

EXAMPLE OF AUTOMATIC INCREMENT OF CHAD

| Order | Slots in Each Group (slot) | | | | | | | | Ch No. |
|---|---|---|---|---|---|---|---|---|---|
| | G3-1 | G3-2 | G3-3 | G3-4 | G3-5 | G3-6 | G3-7 | G3-8 | |
| 1 | S.1 | S.7 | S.13 | S.19 | S.25 | S.31 | S.37 | S.43 | 01 |
| 2 | S.2 | S.8 | S.14 | S.20 | S.26 | S.32 | S.38 | S.44 | 05 |
| 3 | S.3 | S.9 | S.15 | S.21 | S.27 | S.33 | S.39 | S.45 | 09 |
| 4 | S.4 | S.10 | S.16 | S.22 | S.28 | S.34 | S.40 | S.46 | 13 |
| 5 | S.5 | S.11 | S.17 | S.23 | S.29 | S.35 | S.41 | S.47 | 17 |
| 6 | S.6 | S.12 | S.18 | S.24 | S.30 | S.36 | S.42 | S.48 | 21 |

G: Group
S.: Slot

The controller section 23 automatically generates "CHAD" for each of the channel unit groups 3-1 to 3-8, and simultaneously sends it to the first channel unit 3 in each of the channel unit groups 3-1 to 3-8 through the corresponding serial buses 4 (step F6). Upon reception of "ACK" from first channel unit 3 of each of the channel unit groups 3-1 to 3-8 as a response to "ACK", the controller section 23 multiplexes the data of "ACK". The thus multiplexed data are sequentially written into the reception data memory area 211 at address designated by the reception data storage address (RADR) in a time-division manner (for each slot). Then, the reception data storage address (RADR) is incremented (RADR+1) (step F7).

The controller section 23 automatically generates "ID" and "EBL" in that order and simultaneously sends them to each of the channel unit groups 3-1 to 3-8 in the same manner as "CHAD" is sent (step F8). The controller section 23 receives "DATA" (mount status data) and "EBL" from the first channel unit 3 of each of the channel unit groups 3-1 to 3-8 as a response to "ID" and "EBL". The thus received "DATA" and "EBL" are sequentially written into a corresponding area in the memory section 21 (area designated by the reception data storage address (RADR) in the reception data memory area 211) in a time-division manner. The reception data storage address (RADR) is incremented every time "DATA" and "EBL" are written (steps F9 and F10).

After having further incremented the reception data storage address (RADR) (step F11), that is, after having completed the auto scan for the first channel unit 3 of each of the channel unit groups 3-1 to 3-8, the controller section 23 determines whether or not the start trigger (CNTTRG or MONTRG) is set to the control-sequence start control register 44. or the monitor-sequence start control register 45 as a result of reception of the control command or the monitor command from the CPU 1 (step F12). When this is the case (i.e., when an affirmative judgment is made in step F12), the priority processing section 33 determines that the control command or the monitor command has a higher priority. Therefore, the auto scan is suspended, and the higher-priority control sequence or monitor sequence is preferentially executed.

In other words, upon reception of another communication processing request having a higher priority during the course of execution of the auto scan, the controller section 23 executes communication processing for the higher-priority communication processing request after the completion of the sequence of communication processing (i.e., transmission of "CHAD", reception of "ACK", transmission of "ID", transmission of "EBL", reception of "DATA", and reception of "EBL") without immediately stopping the auto scan currently being executed.

It is possible to definitely distinguish the communication data obtained as a result of execution of higher-priority communication processing such as the control sequence or the monitor sequence from the communication data obtained as a result of execution of the auto scan currently being executed. Therefore, faulty operations of the control apparatus 2 and the channel unit 3 caused by erroneous communication data are reliably prevented.

Further, the controller section 23 outputs an interruption signal to the CPU 1 when having completed the higher-order control sequence or monitor sequence. For this reason, a plurality of interruption signals (e.g., an auto-scan interruption signal and a control-sequence completion interruption signal) are prevented from being output to the CPU 1 simultaneously. Accordingly, the CPU 1 can read the communication data from the memory section 21 while the control apparatus 2 is executing higher-priority communication processing, which greatly contributes to improvements in the reliability of the communication data with respect to the CPU 1.

On the other hand, when the start trigger (CNTTRG or MONTRG) is not set in the control-sequence start control register 44 or the monitor-sequence start control register 45 in the previously described step F12 (i.e., when a negative judgment is made in step F12), the controller section 23 determines whether or not the slot number has reached the slot number set in the channel unit number register 48' (see FIG. 8) [the slot number of the last channel unit of each of the channel unit groups 3-1 to 3-8 (a slot number in the bottom of the column in Table 2): SLOT#n*6+6:n=0–7] (step F13).

At this time, the auto scan has been completed only for the first channel unit 3 in each of the channel unit groups 3-1 to 3-8 (i.e., a negative judgment is made in step F13). The controller section 23 increments the slot number by only "one" (the "CHAD" number is incremented by only four) (step F14), the channel units 3 having slot numbers (SLOT #2, 8, 14, 20, 26, 32, 38, and 44) in the second column in Table 2 are selected as the channel units 3, to which "CHAD" is to be next transmitted, in the channel unit groups 3-1 to 3-8. Thereafter, the communication processing similar to those previously described (i.e., transmission of "CHAD", reception of "ACK", transmission of "ID", transmission of "EBL", reception of "DATA", and reception of "EBL") (steps F14 to F16).

The controller section 23 repeatedly executes the communication processes in step F6 and the following steps (i.e., transmission of "CHAD", reception of "ACK", transmission of "ID", transmission of "EBL", reception of "DATA", and reception of "EBL") while the slot number is incremented by "one" until the slot number reaches the slot number of the last channel unit 3 in each of the channel unit groups 3-1 to 3-8 (i.e. until an affirmative judgment is made in step F13). When the slot number has reached the slot number of the final channel unit 3 in each of the channel unit groups 3-1 to 3-8 (i.e., when an affirmative judgment is made in step F13), that is, when the sequence of communication processing has been completed to all of the channel units 3 in each of the channel unit groups 3-1 to 3-8, the CPU 1 is notified of the completion of the auto scan through an interruption signal, whereby the auto scan is now completed (step F15).

In this way, according to the communication control apparatus (channel unit control apparatus 2) of the present embodiment, the control apparatus 2 repeatedly sends "CHAD", "ID", and "EBL" to all of the channel units 3 in a sequential and continuous manner. As a result of sequential reception of "EBL", "DATA", and "EBL" from each channel unit 3 as a response to the transmission data, the auto scan for each channel unit 3 (i.e., simultaneous connection status examination processing) is executed, whereby the control apparatus 2 recognizes the completion of the sequence of communication processing. As a result, the information about the mount status of all the channel units 3 is acquired, and the completion of the acquisition of the information can be notified to the CPU 1.

Figure 43:
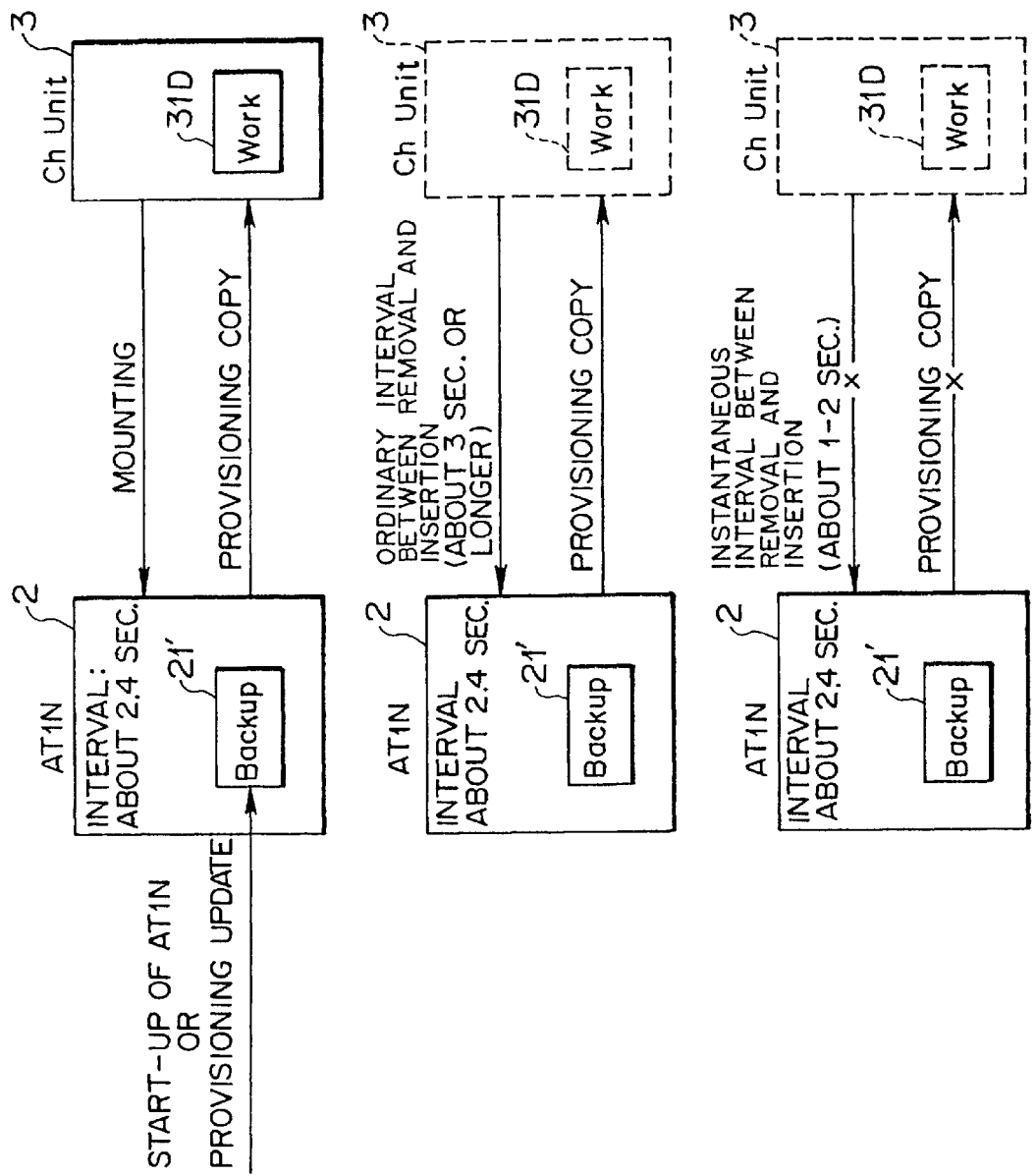
FIGS. 43(a) to 43(c) are diagrams for explaining a provisioning copying processing according to the embodiment.

As shown in FIG. 43(*a*), the channel unit 3 is usually provided with a volatile work register 31D, and the control apparatus 2 is provided with non-volatile backup memory 21' for holding the data required by the channel unit 3, that is, provisioning data for work register 31D. When the provisioning data disappear as a result of the start-up of the CPU 1 and the control apparatus 2, a provisioning data update request from outside or the removal of the channel unit 3, the control apparatus 2 writes the provisioning data in the backup memory 21' into the work register 31D in the channel unit 3.

For example, assuming that it takes about 2.4 seconds to complete auto scan when the auto scan is executed for the channel unit groups 3-1 to 3-8 in order by selectively using the serial bus 4. When it takes more than three seconds to insert the channel unit 3 after removal thereof, the removal of the channel unit is detected as a result of the auto scan, as shown in FIG. 43(*b*). The control apparatus 2 automatically writes the provisioning data in the backup memory 21' into the work register 31D in the channel unit 3.

However, when the channel unit 3 is instantaneously inserted within a very short period of time (about 1 or 2 seconds) after the removal thereof, which period is shorter than the period of time in which the auto scan is completed (about 2.4 seconds), it is impossible to detect the removal of the channel unit through the auto scan. As a result, the provisioning data in the work register 31D in the channel unit 3 remains disappeared.

In the present invention, as previously described, a total of 48 channel units 3 are divided into eight groups 3-1 to 3-8, each group comprising six channel units. These channel groups 3-1 to 3-8 are connected to the control apparatus 2 through eight serial buses 4. The control apparatus 2 (the controller section 23) is provided with the communication bus selecting register 46 and the reception data processing section 53 which acts as a multiplexing unit. The control apparatus 2 is designed to simultaneously exchange identical data between the control apparatus and all of the channel units 3, using the serial buses 4 connected to the respective channel groups 3-1 to 3-8.

By virtue of this arrangement, the time required to complete the auto scan is considerably reduced, and it becomes possible to accurately detect the short-time removal/insertion (connection/disconnection) of a certain channel unit 3. For example, on the assumption that it takes about 2.4 seconds to complete the execution of the auto scan for the channel unit groups 3-1 to 3-8 in order by selectively using the serial bus 4, the time required to complete the auto scan will be reduced to one-eighth of the original time, i.e., about 0.3 second, by means of the previously described parallel processing.

Accordingly, even when the channel unit 3 is instantaneously inserted (for a period of about 1 or 2 seconds) after the removal thereof, the auto scan will be completed with respect to all of the channel units 3, so that the removal/insertion of the channel unit 3 is detected. When the data retained in the channel unit 3 disappears as a result of the removal of the channel unit 3, it is possible to reliably cope with the data disappearance.

In this case as well, the number of serial buses 4 is not set to be equal to the number of channel units 3 (i.e., forty eight), but it can be considerably reduced so as to be equal to the number of channel groups 3-1 to 3-8 (i.e., eight), which greatly contributes to the reduced size and increased packaging density of the apparatus.

It is possible for the previously described control apparatus 2 to store the number of channel units 3 in each of the channel unit groups 3-1 to 3-8 in the channel unit number register 48'. For this reason, even when the number of channel units 3 in each of the channel unit groups 3-1 to 3-8 is increased or decreased, it is possible to execute the auto scan without any trouble on the basis of the number of channel units 3 stored in the channel unit number register 48', which greatly contributes to improved flexibility of the system configuration.

Upon reception of an interruption signal from the control apparatus 2, the CPU 1 can read the necessary data ("ACK", "DATA", and "EBL") from the memory section 21 at any time. Accordingly, it is possible for the CPU 1 to reliably know the fact as to whether or not all of the channel units 3 are properly connected to the control apparatus 2.

In this case as well, "CHAD" comprises the "CHAD" code and a channel unit number, and "EBL" comprises the "EBL" code and the channel unit number. Therefore, it is possible to clearly recognize the ends of the transmission data and reception data as well as to reliably exchange the data between the control apparatus 2 and the corresponding channel unit 3, which makes it possible to considerably improve the reliability of the communication processing at the time of the auto scan.

(4) Priority Processing

The priority processing of the priority processing section 33 in the controller section 23 will be described hereinbelow.

The CPU 1 and the control apparatus 2 periodically execute the auto scan to check the mount status of the channel units 3 in the same manner as previously described (i.e., they execute routine processing). However, in the event of the occurrence of external factors (e.g., a local test request and a provisioning data update request), an immediate operation is required because of the specifications regarding time of an external device, or the like. Therefore, higher-priority processing must be preferentially executed by interrupting the routine processing.

Specifically, there are three types of sequence execution requests (i.e., start triggers: SCNTRG/CNTTRG/MONTRG) and a shift clock stop request (CLKCNT) which are exchanged between the control apparatus 2 and the channel units 3. When the control apparatus 2 receives these requests simultaneously (i.e., when requests compete for the control apparatus 2), the priority processing section 33 determines the level of priority in the below described manner and executes communication processing for a request having a higher priority.

Priority on competition: CLKCNT>CNTTRG/MONTRG>SCNTRG:

However, the control sequence start trigger (CNTTRG) and the monitor sequence start trigger (MONTRG) have the same priority, and hence earlier requested one of them is executed (triggers are executed on a first-come, first-executed basis).

Figure 44:
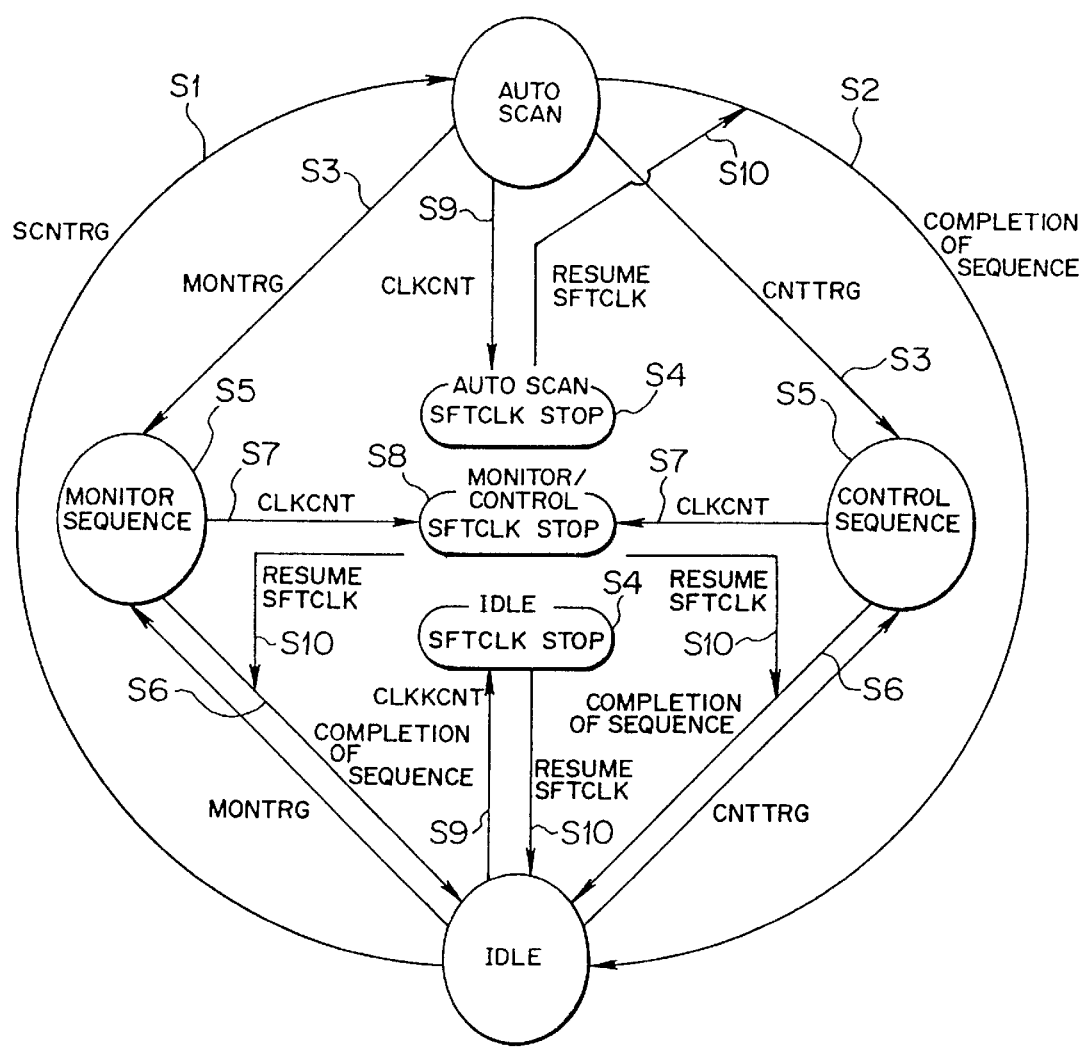
FIG. 44 is a state-transition diagram for explaining the priority processing of the embodiment.

For example, when there are no external factors (i.e., the system is in an idle state)., the control apparatus 2 periodically receives the auto-scan start trigger (SCNTRG) from the CPU 1 and executes the auto scan (steps S1 and S2), as shown in FIG. 44. For instance, when the control apparatus 2 receives the control-sequence execution request (CNTTRG) or the monitor-sequence execution request (MONTRG) from the CPU 1 as an external factor while executing the auto scan (step S3), the priority processing section 33 determines that the control sequence or the monitor sequence has a higher priority than the processing currently being executed. After the sequence of communication processing for the channel unit (slot) 3 to which access is made at that time has been completed (after the reception of "EBL"), the auto scan is interrupted, and the control sequence or the monitor sequence is preferentially executed (step S5).

At this time, even when the timer section 34 (see FIG. 7) is in the process of counting up the timer value (step E5 in FIG. 41), the communication section 35 re-starts the counting action of the timer section 34 so as to receive a control-sequence execution request or a monitor-sequence execution request.

Subsequently, after the completion of the control sequence or the monitor sequence, the control apparatus 2 again enters the routine condition (step S6). When the control apparatus further receives a shift clock stop request (CLKCNT) having a higher-priority from the CPU 1 during the execution of the control sequence or the monitor sequence, the priority processing section 33 stops the shift clock used in the sequence (step S7), thereby immediately terminating the control sequence or the monitor sequence (step S8).

Similarly, when the control apparatus receives the shift clock stop request (CLKCNT) while it is in the routine state or in the process of executing the auto scan, the priority processing section 33 stops the shift clock (step S9), thereby immediately terminates the auto scan (step S4).

When the generation of the shift clock which was stopped in the manner as previously described is resumed, the CPU 1 is notified of the completion of the highest-priority communication processing through the interruption signal in either of the previously described cases (step S10).

An example of the highest-priority communication request is a remote test access request from the remote terminal capable of remotely controlling the CPU 1. The remote test access is a test for carrying out an experiment similar to the local test access previously described referring to FIG. 35 (i.e., check of breaking of a line or a short circuit) in a remote area. For example, a remote tester 11' makes access to a desired channel unit 3 through a test access bus 4' so as to carry out the remote test upon reception of an instruction from a remote terminal 10' located at a distance from the local terminal 10, as shown in FIG. 45.

Figure 45:
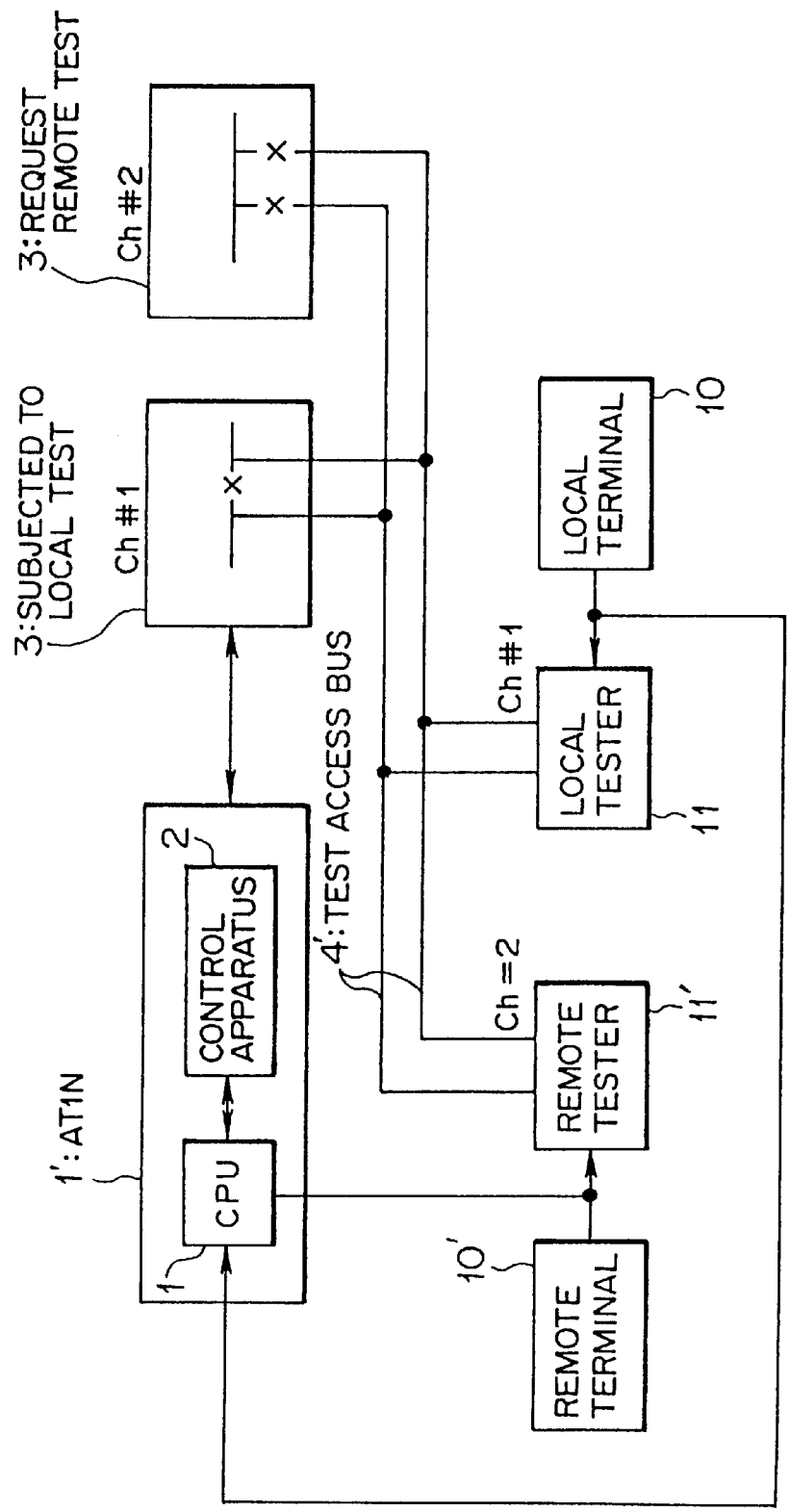
FIG. 45 is a block diagram for explaining the priority processing (remote test access priority processing) of the embodiment.

When the remote terminal 10' issues a remote test access (remote test) request with respect to the channel unit 3 having slot number "#2" while the local tester 11 is carrying out the local test access (local test) to the channel unit 3 having a channel number (slot number) "#1" in accordance with the communication request from the local terminal 10, as shown in FIG. 45, priority in use of the test access bus 4' must be determined.

In general, the remote test access request has a higher priority over the local test access request, and therefore it is necessary to forcibly cancel the local test access to the channel unit 3 having slot number "#1", thereby allowing remote test access to the channel unit 3 having slot number "#2".

To this end, upon reception of the remote access request from the remote terminal 10' through the CPU 1, the control apparatus 2 interrupts the shift clock used in the communication processing between the control apparatus 2 and the channel unit 3 having slot number "#1", so that the local test access is immediately canceled.

Figure 46:
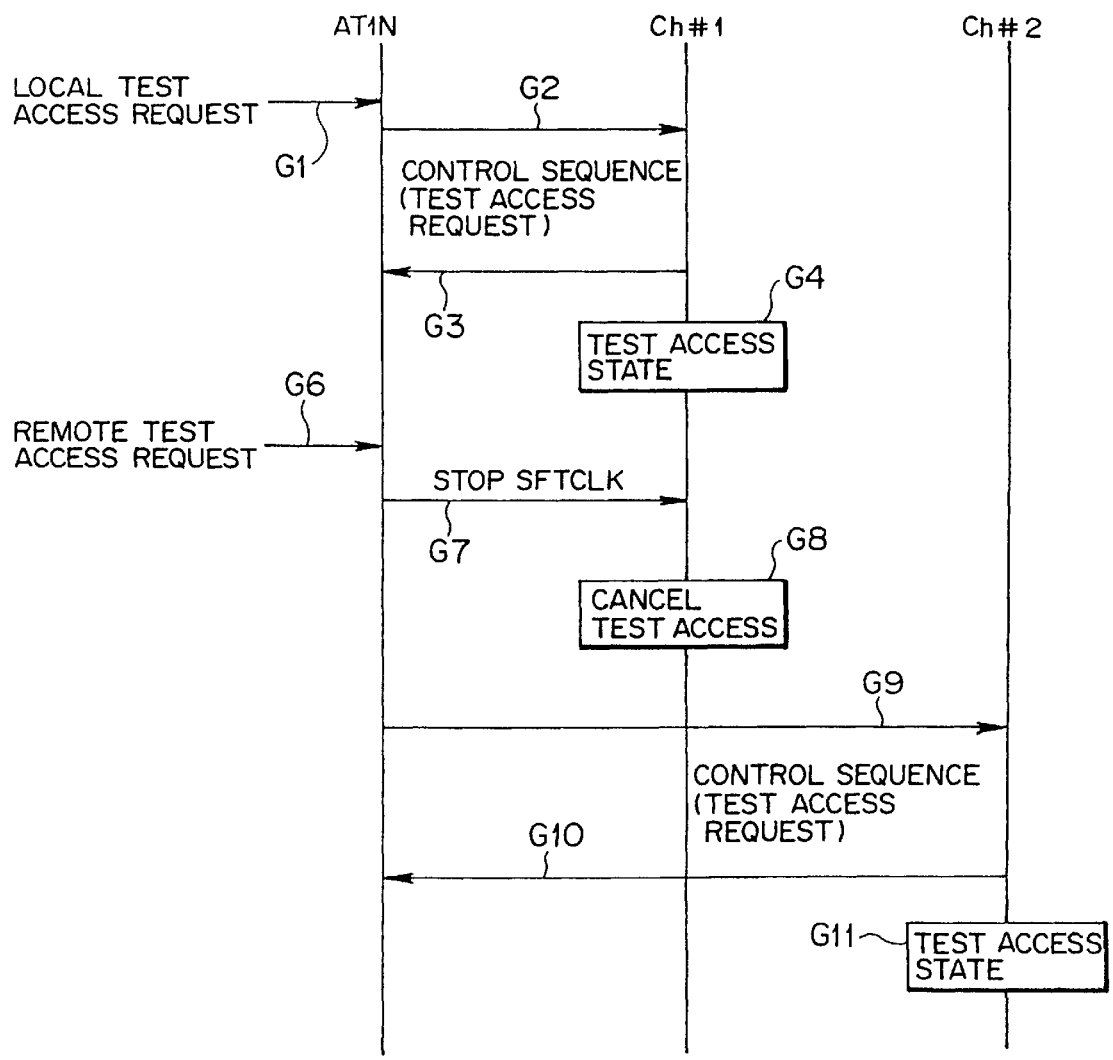
FIG. 46 is a sequence chart for explaining the priority processing (remote test access priority processing) of the embodiment.

The cancellation of the local test access will now be described with reference to a sequence chart (steps G1 to G4 and steps G6 to G11) shown in FIG. 46.

The local terminal 10 first sends a local test access request to the CPU 1 in the communication control section (AT1N)1' and the local tester 11 (step G1). Upon reception of this request, the CPU 1 sends a control sequence execution request (local test access request) to the control apparatus 2 so as to allow the local tester 11 to perform local test access to the channel unit 3 having slot number "#1".

As a result, the control apparatus 2 executes the sequence of communication processing (control sequence) for the channel unit 3 having slot number "#1" in the manner as previously described referring to FIG. 35 (steps G2 and G3). The control apparatus 2 controls the ON and OFF operations of the test relays 31B and 31C in the channel unit 3, whereby the local tester 11 performs local test access to the channel unit 3 having slot number "#1" (step G4).

In this state, when the remote terminal 10' issues a remote test access request to the CPU1 in the communication control section '(AT1N)1' and the remote tester 11' (step G6), the CPU 1 requests the control apparatus 2 to stop the shift clock used in the communication between the control apparatus 2 and the channel unit 3 having slot number "#1". Responding to this request, the control apparatus 2 stops the corresponding shift clock without using a local test access cancellation by the control sequence (step G7), so that the local test access is immediately canceled (step GS).

The control apparatus 2 then executes the sequence of communication processing (control sequence) for the channel unit 3 having slot number "#2" (steps G9 and G10), whereby the ON and OFF operations of the test relays 31B and 31C in the channel unit 3 are controlled. As a result, a state is established in which the remote tester 11' can access to the channel unit 3 having slot number "#2" (step G11).

The cancellation of the local test access also becomes possible by setting "local test access cancellation" into the command data ("ID") for the channel unit 3 having slot number "#1", using the control sequence as previously described in the section (1). However, it takes a very short time to start the actual test after the remote test access has been issued from the remote terminal 11'. The cancellation of the local test access by interrupting the shift clock in the previously described manner becomes very effective.

As described above, according to the previously described communication control apparatus (channel unit control apparatus 2), when the control apparatus receives a plurality of types of communication processing requests from the CPU 1 simultaneously, a sequence of communication processing for the channel unit 3 corresponding to a communication processing request which is judged by the priority processing section 33 in the controller section 23 as having the highest priority is preferentially executed. Therefore, it is possible to execute the communication processing for the higher-priority communication processing request which must be immediately executed without any delay, which allows the CPU 1 to reliably acquire the necessary communication data.

When the control apparatus 2 receives a remote test access request from the remoter terminal 10' as a communication processing request having the highest priority from the CPU 1 during the course of executing communication processing for the channel unit 3 in response to a certain communication processing request, the control apparatus 2 immediately terminates the communication processing currently being executed by interrupting the shift clock used in that communication processing. As a result, it becomes possible to execute the communication processing, which needs to be immediately executed, while further shortening delay.

As described above, according to the communication control apparatus (channel unit control apparatus 2) in the present embodiment, the control apparatus 2 notifies the CPU 1 of the completion of the sequence of communication processing for the channel unit 3 through an interruption signal when that communication processing is completed, rather than outputting an interruption signal every time the data are exchanged between the control apparatus 2 and the channel unit 3. It becomes unnecessary for the CPU 1 to constantly communicate with the control apparatus 2 as well as to directly communicate with the channel unit 3.

The number of serial buses 4 in the communication control apparatus is not set to be equal to the number of channel units 3 (i.e., forty eight), but it can be considerably reduced so as to be equal to the number of channel groups 3-1 to 3-8 (i.e., eight).

Figure 47:
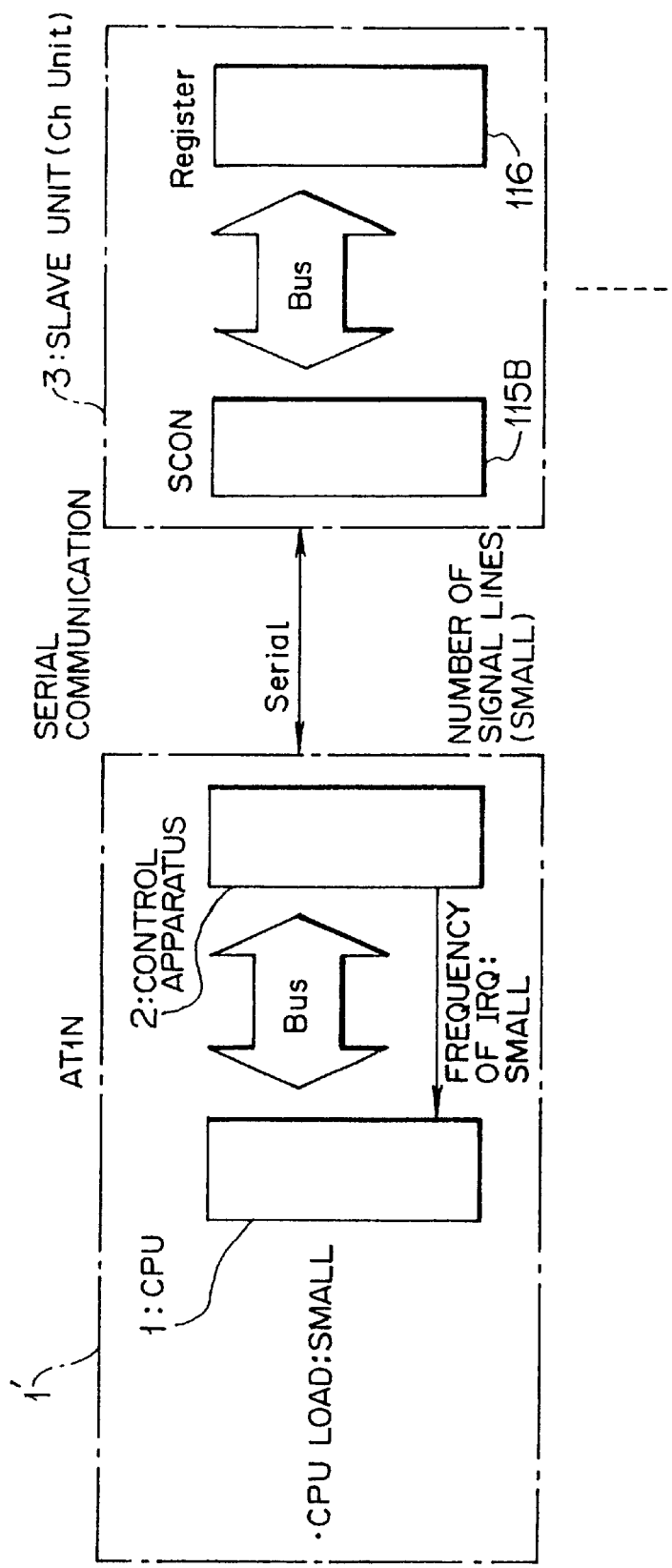
FIG. 47 is a diagram for explaining advantageous results obtained by the communication control apparatus according to the embodiment.
Figure 48:
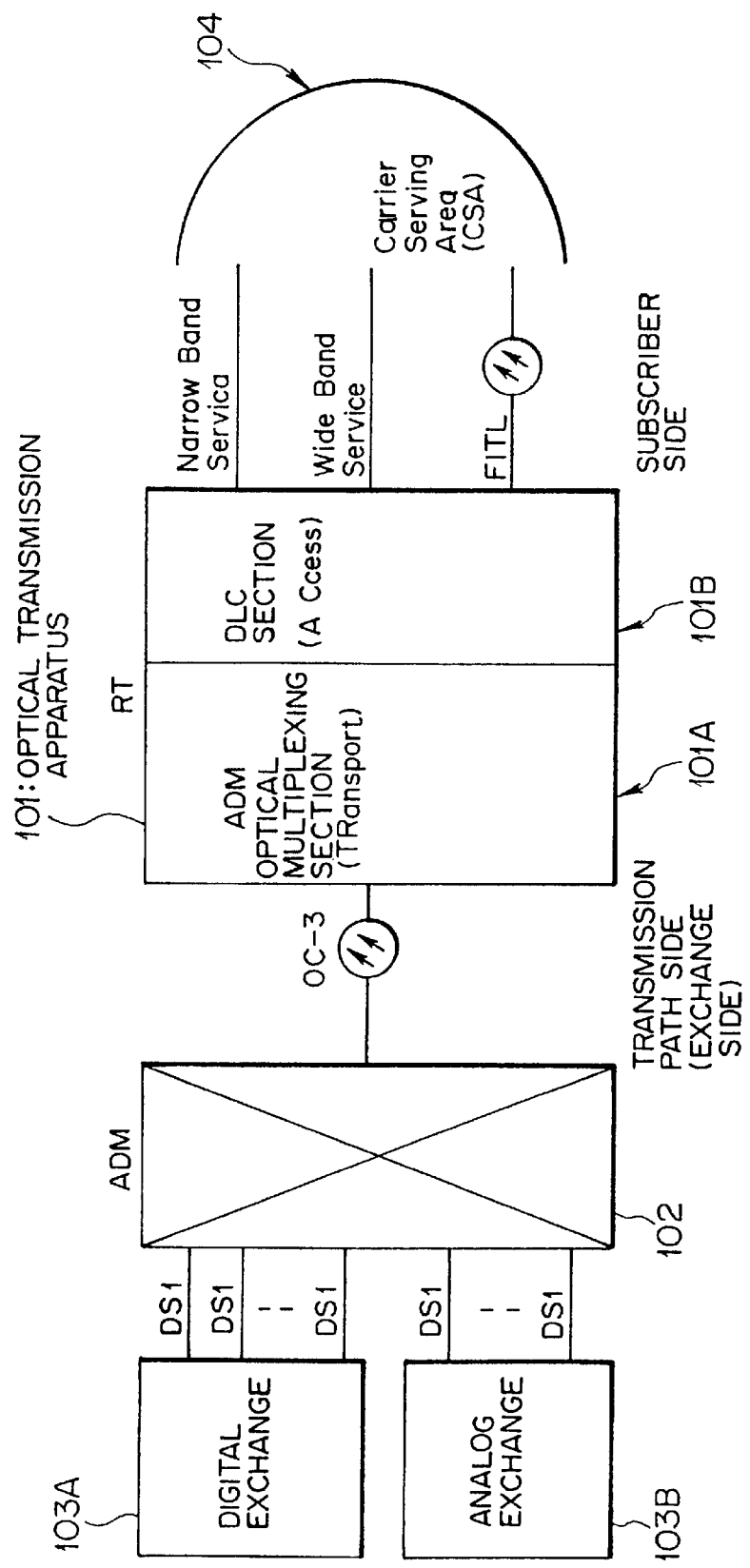
FIG. 48 is a block diagram of an example of a common optical communication system.
Figure 49A:
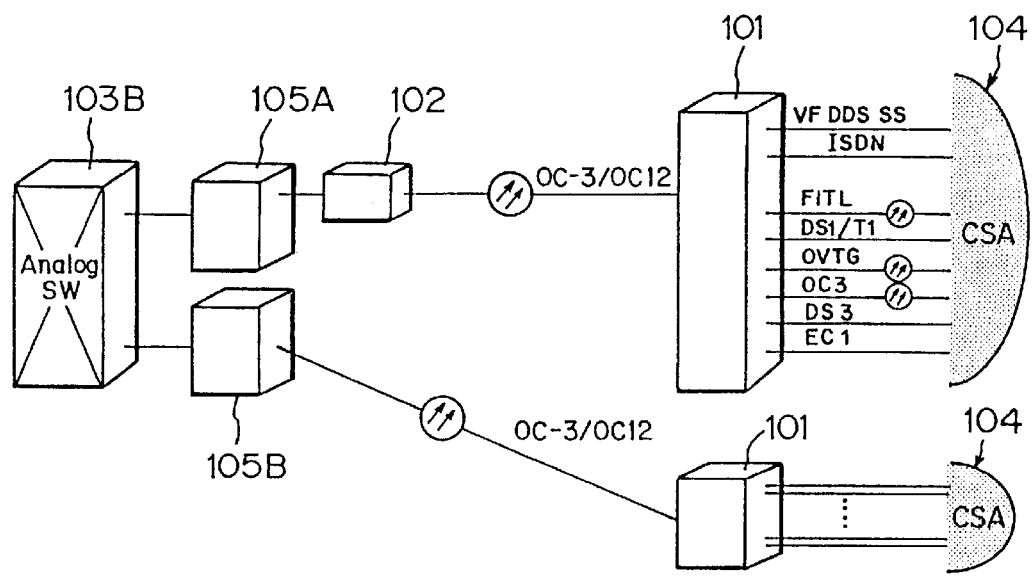
FIGS. 49(a) and 49(b) are block diagrams, each showing an example of the common optical communication system.
Figure 49B:
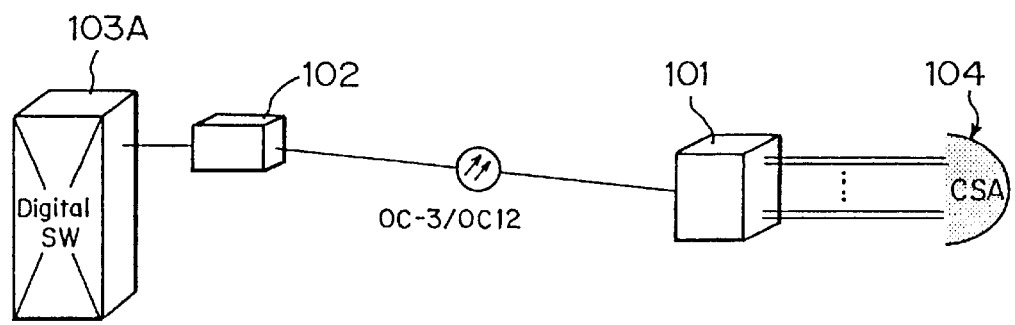
Figure 50:
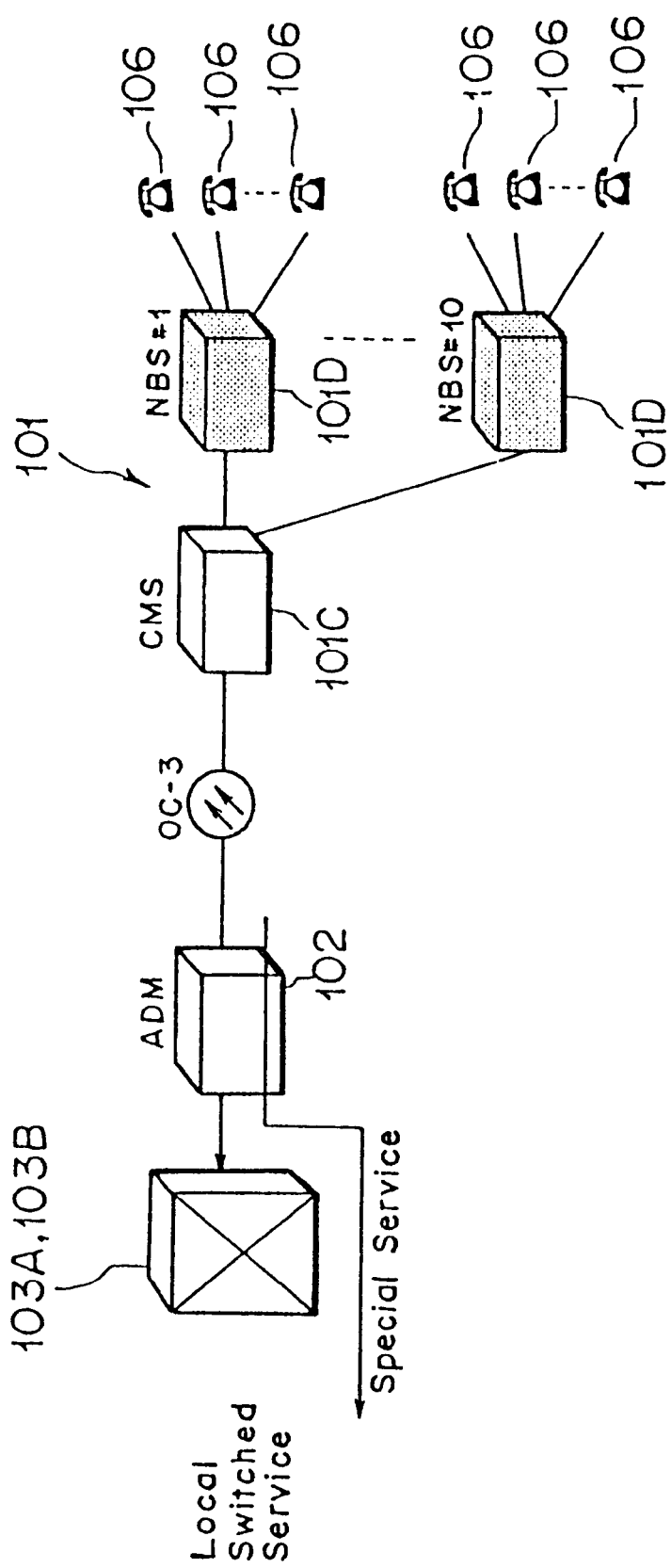
FIG. 50 is a block diagram showing an example of a common optical communication system.
Figure 53:
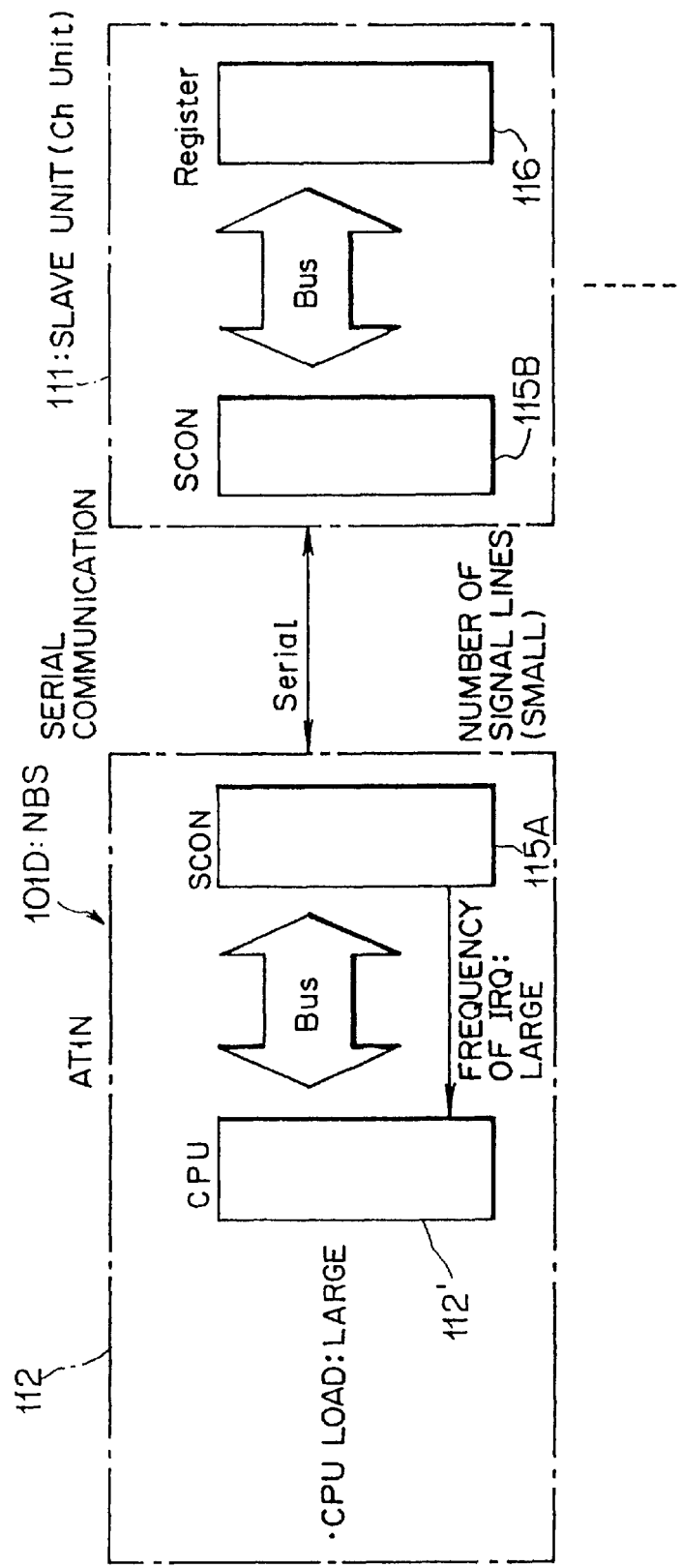
FIG. 53 is a diagram for explaining a problem in a common narrow-band shelf (a communication control apparatus)
Figure 54:
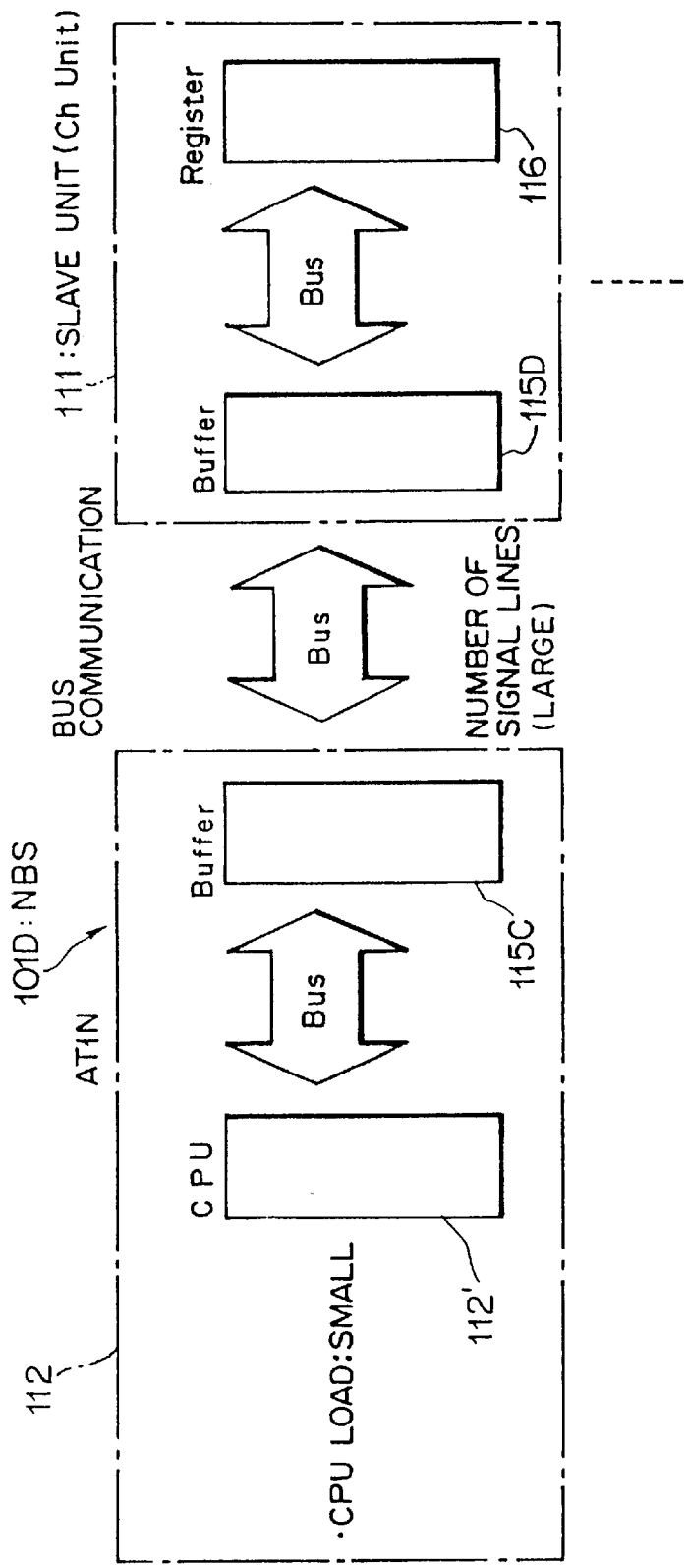
FIG. 54 is a diagrammatic representation for explaining a problem in a common narrow-band shelf (a communication control apparatus).

Consequently, the load on the CPU 1 can be also significantly reduced while the number of serial buses 4 between the CPU 1 and the plurality of channel units 3 is reduced to the minimum, as shown in FIG. 47. In FIG. 47, numerals 115B and 116 designate a sub-communication control section (SCON) similar to the sub-communication control section previously described referring to FIG. 53.

The present invention has been described with reference to the embodiment in which the control apparatus 2 is applied to a system comprising a plurality of channel units 3 serving as slave units, and a CPU 1 serving as a master communication control unit for performing the communication control for these slave units. However, the present invention is not limited to this embodiment and is applicable to another communication system comprising a plurality of slave units and a master communication control unit for performing the communication control for these slave units.

As has been described in detail, according to the communication control apparatus, the communication control method, and the intermediate communication control unit of the present invention, the intermediate communication control unit notifies the main communication control unit of completion of communication processing through an interruption signal when a sequence of communication processing for a slave unit has been completed rather than outputting an interruption signal to the main communication control unit every time data are exchanged between the intermediate communication control unit and the slave unit. As a result, it becomes unnecessary for the master communication control unit to directly communicate with the slave units as well as to constantly communicate with the intermediate communication control unit. Therefore, it becomes possible for the master communication control unit to execute other processing until the sequence of slave unit communication processing is completed, thereby greatly reducing processing load caused by the slave unit communication processing.

More specifically, at this time, the intermediate communication control unit 2 sequentially sends notification data, command data, and transmission end data to a corresponding slave unit. The intermediate communication control unit sequentially receives reception acknowledge data, connection/operation status examination result data, and reception end data as responses from the slave unit. As a result, the connection/operation status of the slave units is examined, whereby the completion of the sequence of communication processing operations is recognized. Therefore, information about the connection/operation status of the slave units is reliably obtained, and the completion of the acquisition of the information can be notified to the master communication control unit.

In this event, the plurality of slave units are divided into slave unit groups, each group comprising a plurality of slave units, and the intermediate communication control unit and the slave unit groups are connected to each other through a plurality of serial buses. A serial bus selecting section is disposed in a communication processing section of the intermediate communication control unit. With this arrangement, when the intermediate communication control unit examines the connection/operation status of a specific slave unit in a certain slave unit group, it is possible to send data to, or receive data from, that slave unit by selecting the serial bus connected to the group of slave units that include the slave unit. Consequently, the number of serial buses is not set so as to be equal to the number of slave units but can be considerably reduced so as to be equal to the number of slave unit groups, which greatly contributes to the reduced size and increased packaging density of the apparatus.

The master communication control unit can read data (i.e., reception acknowledge data and the connection/operation status examination result data) retained in the intermediate communication control unit (memory section) so long as it issues a data read request to the intermediate communication control unit after reception of an interruption signal from the intermediate communication control unit. Therefore, it is possible for the master communication control unit to reliably know whether or not the slave units are connected in a normal manner to the intermediate communication control unit and whether or not the slave units operate normally.

Further, in this event, the master communication control unit reads the connection/operation status examination result data and the reception end data in that order from the intermediate communication control unit. Accordingly, it is possible for the master communication control unit to constantly recognize the end of the connection/operation status examination result data, which makes it possible to very easily change the amount of the connection/operation status examination result data.

The above notification data comprises a notification identification code and slave unit number data. The transmission end data comprises an end-of-block identification code and slave unit number data. The reception end data comprises an end-of-block identification code and slave unit number data. Therefore, it is possible to clearly recognize the ends of the transmission data and the reception data as well as to reliably exchange the data between the intermediate communication control unit and the corresponding slave units, which greatly contributes to improvements in the reliability of slave unit communication processing.

When the communication control section of the previously described intermediate communication control unit is provided with a reception data register in which the reception data amount is set, the intermediate communication control unit can terminate the reception of response data when the amount of the connection/operation status examination result data has reached the reception data amount set in the reception data register. Therefore, it is possible to reliably prevent the intermediate communication control unit from continuously receiving the data and, eventually, running away when it fails to receive the reception end data.

According to the communication control apparatus, the communication control method, and the intermediate communication control unit of the present invention, the intermediate communication control unit sequentially sends the notification data, the command data, the control/setting data, and the transmission end data to the corresponding slave unit. The intermediate communication control unit receives the reception acknowledge data as a response from that slave unit. As a result, it becomes possible for the intermediate communication control unit to execute the control/setting processing and to recognize the completion of the sequence of communication processing. Therefore, it is possible for the intermediate communication control unit to reliably notify the master communication control unit of the fact as to whether or not the control/setting processing, such as the rewriting of preset information, has been properly executed for a certain slave unit.

In this case as well, the plurality of slave units are divided into slave unit groups, each group comprising a plurality of slave units, and the intermediate communication control unit and the slave unit groups are connected to each other through a plurality of serial buses. A serial bus selecting section is provided in a communication processing section of the intermediate communication control unit. With this arrangement, when the intermediate communication control unit examines the above-described control/setting processing for a specific slave unit in a certain slave unit group, it is possible to send data to, or receive data from, that slave unit by selecting the serial bus connected to the group of slave units that include the slave unit. Consequently, the number of serial buses is not set so as to be equal to the number of slave units but can be considerably reduced so as to be equal to the number of slave unit groups, which greatly contributes to the reduced size and increased packaging density of the apparatus.

Further, the master communication control unit can read the reception acknowledge data retained in the intermediate communication control unit (memory section) so long as it issues a data read request to the intermediate communication control unit after reception of an interruption signal from the intermediate communication control unit. Therefore, it is possible for the master communication control unit to reliably know whether or not the control/setting processing has been properly executed.

In this case as well, the notification data comprises a notification identification code and slave unit number data. The transmission end data comprises an end-of-block identification code and slave unit number data. Therefore, it is possible to reliably exchange the data between the intermediate communication control unit and the slave units, which greatly contributes to improvements in the reliability of slave unit communication processing.

When the communication control section of the previously described intermediate communication control unit is provided with a transmission data register in which a transmission data amount is set, the intermediate communication control unit automatically terminates the transmission of transmission data when the amount of the control/setting data has reached the transmission data amount set in the transmission data register. Therefore, it is possible to reliably prevent the intermediate communication control unit from running away when it fails to receive the transmission end data, which represents the end of the transmission data, because of any trouble arising in the master communication control unit.

According to the communication control apparatus, the communication control method, and intermediate communication control unit of the present invention, the intermediate communication control unit sequentially sends the notification data, the command data, and the transmission end data to all of the slave units in a repeated and continuous manner. The intermediate communication control unit receives the reception acknowledge data, the connection status examination result data, and the reception end data, as responses from each slave unit. As a result, it becomes possible for the intermediate communication control unit to execute the simultaneous connection status examination processing for all of the slave units and to recognize the completion of the sequence of communication processing. Therefore, it is possible for the intermediate communication control unit to reliably acquire the information about the connection state of all the slave units and to notify the master communication control unit of the completion of the acquisition of the information.

In this case as well, the plurality of slave units are divided into slave unit groups, each group comprising a plurality of slave units, and the intermediate communication control unit and the slave unit groups are connected to each other through a plurality of serial buses. A serial bus designating section and a multiplexing section are provided in the intermediate communication control unit. With this arrangement, the intermediate communication control unit can simultaneously exchange the identical data with respect to all of the slave units by concurrently using the serial buses connected to the slave unit groups. As a result, it is possible to reliably detect the connection/disconnection of a certain slave unit carried out during a very short period of time as well as to reduce the time required to complete the simultaneous status examination processing. Further, the number of serial buses is not set so as to be equal to the number of slave units but can be considerably reduced so as to be equal to the number of slave unit groups, which greatly contributes to the reduced size and increased packaging density of the apparatus.

When a slave unit number register of the previously described intermediate communication control unit is designed so as to hold the number of slave units disposed in each slave unit group, it is possible to execute the simultaneous connection status examination processing without any trouble even when the number of slave units in each slave unit group is increased or decreased, which greatly contributes to improved flexibility of configuration of the communication control apparatus.

The master communication control unit can read the necessary data (i.e., the reception acknowledge data, the connection status examination result data, and the reception end data) from the memory section so long as it issues a data read request to the intermediate communication control unit after reception of an interruption signal from the intermediate communication control unit. Therefore, it is possible for the master communication control unit to reliably know whether or not all of the slave units are connected in a normal manner to the intermediate communication control unit.

In this case as well, the notification data comprises a notification identification code and slave unit number data. The transmission end data comprises an end-of-block identification code and the slave unit number data. The reception end data comprises an end-of-block identification code and the slave unit number data. Therefore, it is possible to reliably exchange the data between the intermediate communication control unit and the slave units as well as to clearly recognize the ends of the transmission data and the reception data, which greatly contributes to improvements in the reliability of slave unit communication processing.

When the intermediate communication control section receives a plurality of types of communication processing requests from the master communication control section simultaneously, the intermediate communication section executes slave unit communication processing for the communication processing request which is determined by the priority processing section as having the highest priority is preferentially executed. Therefore, it is possible to execute the communication processing for the higher-priority communication processing request which must be immediately executed without any delay, which allows the master communication control unit to reliably acquire the necessary communication data.

When the intermediate communication control unit receives another communication processing request having a higher priority during the course of executing slave unit communication processing for a certain communication processing request, it executes slave unit communication processing for the higher-priority communication processing request after the completion of the sequence of the communication processing currently being executed without immediately interrupting the slave unit communication processing currently being executed. As a result, it is possible to definitely distinguish the communication data obtained as a result of execution of higher-priority communication processing from the communication data obtained as a result of execution of the communication processing currently being executed. Therefore, faulty operations of the intermediate communication control unit and the slave units due to erroneous communication data can be reliably prevented.

In this event, when the slave unit communication processing for a communication processing request having a higher priority has been completed, the intermediate communication control unit outputs an interruption signal to the master communication control unit. Hence, it is possible to prevent a plurality of interruption signals from being output to the master communication control unit simultaneously. Consequently, it is possible to prevent the master communication control unit to read the communication data from the memory section while the intermediate communication control unit is executing higher-priority communication processing, which contributes to significantly improved reliability of communication data with respect to the master communication control unit.

When the intermediate communication unit receives communication processing request having the highest priority (e.g., a remote test access request from a remote terminal capable of remotely controlling the master communication control unit) from the master communication control unit during the course of executing slave unit communication processing for a certain communication processing request, it immediately terminates the communication processing currently being executed by interrupting a shift clock used in that communication processing. As a result, it becomes possible to execute the communication processing, which must be executed immediately, while further shortening delay.

Moreover, interruption type information items retained in a plurality of interruption registers are subjected to logical OR operation performed by a local OR element, and the result of the logical OR operation is supplied to the master communication control unit as an interruption signal. Therefore, it is possible to reliably notify the master communication control unit of the completion of certain slave unit communication processing.

Further, the interruption registers are configured so as to output a corresponding interruption type to the master communication control unit on the basis of an interruption type read request from the master communication control unit. Therefore, the master communication control unit can know which one of the slave unit communication processing operations (i.e., connection/operation status examination processing, control/setting processing, and simultaneous connection status examination processing) has been completed, which greatly contributes to improvements in reliability of the communication processing.

Even when the intermediate communication control unit receives the communication processing request from the master communication control unit, it can execute slave unit communication processing for that communication processing request after the lapse of the time set in a timer register. Therefore, the intermediate communication control unit can absorb the difference between the speed of communication processing of the master communication control unit and the speed of processing of the slave unit. As a result, it becomes possible to flexibly cope with the case where the master communication control unit and the slave units are different from each other in operating speed.

It will thus be seen that the object set forth above, among those made apparent from the preceding description, are efficiently attained, and since certain changes may be made in carrying out the above method and in the constructions set fourth without departing from the spirit and scope of the invention, it is intended that all matter contained in the above description and shown in the accompanying drawings shall be interpreted as illustrative and not in a limiting sence.

It is also to be understood that the following claims are intended to cover all of the generic and specific features of the invention herein described, and all statements of the scope of the invention which, as a matter of language might be said to fall therebetween.

What is claimed is:

1. A communication control apparatus comprising:
   a master communication control unit for performing communication control for a plurality of slave units; and
   an intermediate communication control unit for performing the communication control for said slave units instead of said master communication control unit in response to a communication processing request from said master communication control unit,
   wherein said intermediate communication control unit comprises:
   a memory section for storing transmission data which are necessary to perform slave unit communication processing, and for storing response data, which are a response to the transmission data, for each type of communication;
   a transmission/reception section for sending the transmission data to, or receiving the response data from, said slave unit; and
   a communication processing control section which upon reception of a communication processing request from said master communication control unit, sends transmission data corresponding to the type of the communication processing request to a corresponding slave unit in a predetermined order through said transmission/reception section and writes the response data, which are received as a response to the transmission data in a predetermined order from said slave unit through said transmission/reception section, into said memory section, thereby executing the slave unit communication processing, and which notifies said master communication control unit of completion of the slave unit communication processing through an interruption signal when the communication processing has been completed;

wherein said memory section is configured so as to store notification data for notifying execution of connection/operation status examination processing, command data for executing the connection/operation status examination processing, and transmission end data which represent the end of the transmission data, as the transmission data necessary to execute the connection/operation status examination processing among a plurality of kinds of the slave unit communication processing, said transmission/reception section comprises:
  a transmission data processing section which reads the transmission data from said memory section in order of the notification data, the command data, and the transmission end data in response to a control signal from said communication processing control section, and which sends the transmission data to the corresponding slave unit through said transmission/reception section; and
  a reception data processing section which sequentially writes reception acknowledgement data, connection/operation status examination result data and reception end data, which are received from said slave unit in that order as a response to the transmission data, into said memory section in response to a control signal from said communication processing control section;

said communication processing control section comprises:
  a control signal generating section which generates a control signal for said transmission/reception section upon reception of a connection/operation status examination processing request from said master communication unit, said connection/operation status examination processing request requesting said slave unit to execute the connection/operation status examination processing for said slave unit;
  a data monitoring section which monitors the state of the transmission and reception of the transmission data and response data, and which detects whether or not the reception end data have been written into said memory section after the transmission end data have been transmitted; and an interruption control section which outputs an interruption signal to said master communication control unit after said data monitoring section has detected that the reception end data have been written into said memory section.

2. The communication control apparatus according to claim 1, wherein said plurality of slave units are divided into a plurality of slave unit groups, each group consisting of a plurality of slave units, and said intermediate communication control unit and said slave unit groups are connected together through a plurality of serial buses, and wherein said communication processing control section of said intermediate communication control unit comprises:

a serial bus selecting section for selecting one of said serial buses to be used when sending the transmission data or receiving the response data.

3. The communication control apparatus according to claim 1, wherein said memory section is configured in such a way that the reception acknowledgement data and the connection/operation status examination result data among the reception acknowledgement data, the connection/operation status examination result data, and the reception end data are sequentially read on the basis of a data read request from said master communication control unit.

4. The communication control apparatus according to claim 3, wherein said memory section is configured such that the reception end data are read out after the connection/operation status examination result data are read out.

5. The communication control apparatus according to claim 1, wherein said notification data comprises a notification identification code and slave unit number data.

6. The communication control apparatus according to claim 1, wherein said transmission end data comprises an end-of-block identification code and slave unit number data.

7. The communication control apparatus according to claim 1, wherein said reception end data comprises an end-of-block identification code and slave unit number data.

8. The communication control apparatus according to claim 1, wherein said communication processing control section comprises:

a reception data register in which a reception data amount is set, and
  said interruption control section is arranged so as to output the interruption signal when the amount of the connection/operation status examination result data of the response data has reached the reception data amount set in the reception data register.

9. A communication control apparatus comprising:

a master communication control unit for performing communication control for a plurality of slave units; and an intermediate communication control unit for performing the communication control for said slave units instead of said master communication control unit in response to a communication processing request from said master communication control unit, wherein said intermediate communication control unit comprises:
  a memory section for storing transmission data which are necessary to perform slave unit communication processing, and for storing response data, which are a response to the transmission data, for each type of communication;
  a transmission/reception section for sending the transmission data to, or receiving the response data from, said slave unit; and
  a communication processing control section which upon reception of a communication processing request from said master communication control unit, sends transmission data corresponding to the type of the communication processing request to a corresponding slave unit in a predetermined order through said transmission/reception section and writes the response data, which are received as a response to the transmission data in a predetermined order from said slave unit through said transmission/reception section, into said memory section, thereby executing the slave unit communication processing, and which notifies said master communication control unit of completion of the slave unit communication processing through an interruption signal when the communication processing has been completed;

wherein said memory section is configured so as to store notification data for notifying of the execution of control/setting processing, command data for executing the control/setting processing, and transmission end data which represent the ends of the control/setting processing data and the transmission data, as the transmission data necessary to execute the control/setting processing among a plurality of kinds of the slave unit communication processing, said transmission/reception section comprises:

a transmission data processing section which reads the transmission data from said memory section in order of the notification data, the command data, the control/setting data, and the transmission end data in response to a control signal from said communication processing control section, and which sends the transmission data to the corresponding slave unit through said transmission/reception section; and a reception data processing section which sequentially writes the reception acknowledgement data, which are received from said slave unit as a response data to the transmission data, into said memory section in response to a control signal from said communication processing control section, said communication processing control section comprises:

a control signal generating section which generates the control signal for said transmission/reception section upon reception of a control/setting processing request from said master communication control unit, said control/setting processing request requesting said slave unit to execute the control/setting processing for said slave unit;

a data monitoring section which monitors the state of the transmission and reception of the transmission data and response data, and which detects whether or not the reception end data have been written into said memory section after the transmission end data have been transmitted; and an interruption control section which outputs the interruption signal to said master communication control unit after said data monitoring section has detected that the reception end data have been written into said memory section.

10. The communication control apparatus according to claim 9, wherein said plurality of slave units are divided into a plurality of slave unit groups, each group consisting of a plurality of slave units, and said intermediate communication control unit and said slave unit groups are connected together through a plurality of serial buses, and wherein said communication processing control section of said intermediate communication control unit comprises:

a serial bus selecting section for selecting one of said plurality of serial buses so as to send the transmission data or receive the response data using any one of said plurality of serial buses.

11. The communication control apparatus according to claim 9, wherein said memory section is configured such that the reception acknowledgement data are read in response to a data read request from said master communication control unit.

12. The communication control apparatus according to claim 9, wherein said notification data comprises a notification identification code and slave unit number data.

13. The communication control apparatus according to claim 9, wherein said transmission end data comprises an end-of-block identification code and slave unit number data.

14. The communication control apparatus according to claim 9, wherein said communication processing control section comprises:

a transmission data register in which a transmission data amount is set; and said interruption control section is arranged so as to output the interruption signal when the amount of the transmitted control/setting data of the transmission data has reached the transmission data amount set in the transmission data register.

15. A communication control apparatus comprising:

a master communication control unit for performing communication control for a plurality of slave units; and an intermediate communication control unit for performing the communication control for said slave units instead of said master communication control unit in response to a communication processing request from said master communication control unit, wherein said intermediate communication control unit comprises:

a memory section for storing transmission data which are necessary to perform slave unit communication processing, and for storing response data, which are a response to the transmission data, for each type of communication;

a transmission/reception section for sending the transmission data to, or receiving the response data from, said slave unit; and a communication processing control section which upon reception of a communication processing request from said master communication control unit, sends transmission data corresponding to the type of the communication processing request to a corresponding slave unit in a predetermined order through said transmission/reception section and writes the response data, which are received as a response to the transmission data in a predetermined order from said slave unit through said transmission/reception section, into said memory section, thereby executing the slave unit communication processing, and which notifies said master communication control unit of completion of the slave unit communication processing through an interruption signal when the communication processing has been completed;

wherein said communication processing control section comprises:

a transmission data generating section which upon reception of a simultaneous connection status examination processing request from said master communication control unit which requests execution of simultaneous connection status examination processing for all of said slave units, automatically generates, for all of said slave units, notification data for notifying simultaneous connection status examination processing, command data for executing the simultaneous connection status examination processing, and transmission end data which represent the end of the transmission data, as the transmission data necessary to carry out the simultaneous connection status examination processing among a plurality of kinds of slave unit communication processing, said transmission/reception section comprises:
- a transmission data processing section which continuously, repetitively sends the transmission data generated in the transmission data generating section to all of said slave units through said transmission/reception section in order of the notification data, the command data, and the transmission end data; and
- a reception data processing section which sequentially writes the response data, which are received from said respective slave units through said transmission/reception section as a response to the transmission data, into said memory section in order of the reception acknowledgement data, the connection status examination result data, and the reception end data, and said communication processing control section comprises:
- a data monitoring section which monitors the state of the transmission and reception of the transmission data and response data, and which detects whether or not the reception end data have been written into said memory section after the transmission end data have been transmitted; and
- an interruption control section which outputs the interruption signal to said master communication control unit after said data monitoring section has detected that the reception end data have been written into said memory section.

16. The communication control apparatus according to claim 15, wherein said plurality of slave units are divided into a plurality of slave unit groups, each group consisting of a plurality of slave units, and said intermediate communication control unit and said slave unit groups are connected together through a plurality of serial buses, said communication processing control section of said intermediate communication control unit comprises:
- a serial bus simultaneous designating section for designating all of said serial buses as serial buses to be used when simultaneously sending the transmission data and receiving the response data through the respective serial buses, and said reception data processing section of said intermediate communication control unit comprises:
- a multiplexing section which multiplexes the response data simultaneously received through said serial buses in time-division, and which sequentially writes the multiplexed data into said memory section.

17. The communication control apparatus according to claim 16, wherein said communication processing control section comprises:
- a slave unit number register which holds the number of slave units in each slave unit group in order to cope with an increase or a decrease in the number of slave units in each slave unit group.

18. The communication control apparatus according to claim 15, wherein said memory section is configured in such a way that the reception acknowledgement data, the connection status examination result data, and the reception end data are sequentially read on the basis of a data read request from said master communication control unit.

19. The communication control apparatus according to claim 15, wherein said notification data comprises a notification identification code and slave unit number data.

20. The communication control apparatus according to claim 15, wherein said transmission end data comprises an end-of-block identification code and slave unit number data.

21. The communication control apparatus according to claim 15, wherein said reception end data comprises an end-of-block identification code and slave unit number data.

22. A communication control method
for a communication control apparatus including a master communication control unit for performing communication control for a plurality of slave units, and an intermediate communication control unit for performing the communication control for said slave units instead of said master communication control unit in response to a communication processing request from said master communication control unit, said method comprising the steps of:

storing transmission data which are necessary to perform slave unit communication processing for each type of communication;

sending the communication processing request from said master communication control unit to said intermediate communication control unit;

sending the corresponding transmission data from said intermediate communication control unit to a corresponding slave unit in a predetermined order in accordance with the type of the communication processing request;

sending response data, which is a response to the transmission data, from said slave unit to said intermediate communication control unit in a predetermined order; and notifying said master communication control unit of the completion of the slave unit communication processing after the communication processing has been completed as a result of the response data being received by said intermediate communication control unit;

said intermediate communication control unit holds, as the transmission data necessary to execute the connection/operation status examination processing among a plurality of kinds of the slave unit communication processing, notification data for notifying execution of the connection/operation status examination, command data for executing the connection/operation status examination processing, and transmission end data which represent the end of the transmission data;

said master communication control unit outputs to said intermediate communication control unit the connection/operation status examination processing request which requests said intermediate communication control unit to execute the connection/operation status examination;

said intermediate communication control unit sends the transmission data to said slave unit in order of the notification data, the command data, and the transmission end data;

said slave unit sequentially outputs reception acknowledgement data, connection/operation status examination result data, and reception end data as the response data; and said intermediate communication control unit outputs the interruption signal to said master communication control unit upon reception of the reception end data.

23. The communication control method according to claim 22, wherein said plurality of slave unit s are divided into a plurality of slave unit groups, each group consisting of a plurality of slave units, and said intermediate communication control unit and said slave unit groups are connected to each other through a plurality of serial buses;

said intermediate communication control unit sends the transmission data to a corresponding slave unit group by selectively using any one of the plurality of serial buses; and said slave unit group sends the response data to said intermediate communication control unit by using the corresponding serial bus.

24. The communication control method according to claim 22, wherein upon reception of the interruption signal from said intermediate communication control unit, said master communication control unit sequentially obtains from said intermediate communication control unit the reception acknowledgement data and the connection/operation status examination result data among the reception acknowledgement data, the connection/operation status examination result data, and the reception end data.

25. The communication control method according to claim 24, wherein said master communication control unit obtains the reception end data from said intermediate communication control unit after obtaining the connection/operation status examination result data.

26. The communication control method according to claim 22, wherein said intermediate communication control unit outputs the interruption signal to said master communication control unit when the amount of the received connection/operation status examination result data has reached a preset amount.

27. A communication control method for a communication control apparatus including a master communication control unit for performing communication control for a plurality of slave units, and an intermediate communication control unit for performing the communication control for said slave units instead of said master communication control unit in response to a communication processing request from said master communication control unit, said method comprising the steps of:

storing transmission data which are necessary to perform slave unit communication processing for each type of communication;

sending the communication processing request from said master communication control unit to said intermediate communication control unit;

sending the corresponding transmission data from said intermediate communication control unit to a corresponding slave unit in a predetermined order in accordance with the type of the communication processing request;

sending response data which is a response to the transmission data, from said slave unit to said intermediate communication control unit in a predetermined order; and notifying said master communication control unit of the completion of the slave unit communication processing after the communication processing has been completed as a result of the response data being received by said intermediate communication control unit;

said intermediate communication control unit holds, as the transmission data necessary to execute the control/setting processing among a plurality of kinds of the slave unit communication processing, notification data for notifying execution of the control/setting processing, command data for executing the control/setting processing, and transmission end data which represent the ends of the control/setting data and the transmission data;

said master communication control unit outputs to said intermediate communication control unit the control/setting processing request which requests said intermediate communication control unit to execute the control/setting processing;

said intermediate communication control unit sends the transmission data to a corresponding slave unit in order of the notification data, the command data, the control/setting data, and the transmission end data;

said slave unit outputs reception acknowledgement data as the response data to said intermediate communication control unit; and said intermediate communication control unit outputs the interruption signal to said master communication control unit upon reception of the reception acknowledgement data.

28. The communication control method according to claim 27, wherein said slave units are divided into a plurality of slave unit groups, each group consisting of a plurality of slave units, and said intermediate communication control unit and said slave unit groups are connected to each other through a plurality of serial buses;

said intermediate communication control unit sends the transmission data to a corresponding slave unit group by selectively using any one of the plurality of serial buses; and said slave unit group sends the reception acknowledgement data to said intermediate communication control unit by use of the corresponding serial bus.

29. The communication control method according to claim 28, wherein said master communication control unit obtains the reception acknowledgement data from said intermediate communication control unit upon reception of the interruption signal from said intermediate communication control unit.

30. The communication control method according to claim 27, wherein said intermediate communication control unit outputs the interruption signal to said master communication control unit when the amount of the sent control/setting data has reached a preset amount.

31. A communication control method for a communication control apparatus including a master communication control unit for performing communication control for a plurality of slave units, and an intermediate communication control unit for performing the communication control for said slave units instead of said master communication control unit in response to a communication processing request from said master communication control unit, said method comprising the steps of:

storing transmission data which are necessary to perform slave unit communication processing for each type of communication;

sending the communication processing request from said master communication control unit to said intermediate communication control unit;

sending the corresponding transmission data from said intermediate communication control unit to a corresponding slave unit in a predetermined order in accordance with the type of the communication processing request;

sending response data, which is a response to the transmission data, from said slave unit to said intermediate communication control unit in a predetermined order; and notifying said master communication control unit of the completion of the slave unit communication processing after the communication processing has been completed as a result of the response data being received by said intermediate communication control unit;

said master communication control unit sends to said intermediate communication control unit a simultaneous connection status examination request which requests the execution of simultaneous connection status examination processing, among a plurality of kinds of slave unit communication processing, for all of said slave units;

said intermediate communication control section automatically generates, as the transmission data necessary to carry out the simultaneous connection status examination processing, notification data for notifying a simultaneous connection status examination processing, command data for executing the simultaneous connection status examination, and transmission end data which represent the end of the transmission data, for each of said slave units;

the transmission data are continuously, repetitively sent to all of said slave units in order of the notification data, the command data, and the transmission end data;

each slave unit sends the reception acknowledgement data, the connection status examination result data, and the reception end data, in that order, to said intermediate communication control unit as response data to the transmission data; and said intermediate communication control unit outputs an interruption signal to said master communication control unit upon reception of the reception end data.

32. The communication control method according to claim 31, wherein said slave units are divided into a plurality of slave unit groups, each group consisting of a plurality of slave units, and said intermediate communication control unit and said slave unit groups are connected together through a plurality of serial buses;

said intermediate communication control unit simultaneously sends the transmission data to each of said slave unit groups through the plurality of serial buses;

said slave unit groups simultaneously send the response data to said intermediate communication control unit through the corresponding serial buses; and said intermediate communication control unit multiplexes the response data which are simultaneously received through the plurality of serial buses in time-division, and stores the multiplexed data.

33. The communication control method according to claim 32, wherein said intermediate communication control unit is provided with a slave unit number register, and the number of slave units in each slave unit group is stored in said slave unit number register so as to cope with an increase or a decrease in the number of slave units in each slave unit group.

34. The communication control method according to claim 31, wherein said master communication control unit obtains from said intermediate communication control unit the reception acknowledgement data, the connection status examination result data, and the reception end data in that order, upon reception of the interruption signal from said intermediate communication control unit.

35. An intermediate communication control unit which is interposed between a master communication control unit for performing communication control for a plurality of slave units and the plurality of slave units capable of communicating with the master communication unit, and which controls the communication for said slave units instead of said master communication control unit in response to a communication processing request from said master communication control unit, said intermediate communication control unit comprising:

a memory section for storing transmission data which are necessary to perform slave unit communication processing and response data, which are a response to the transmission data, for each the type of communication, in response to a communication processing request from said master communication control unit;

a transmission/reception section for sending the transmission data to, or receiving the response data from, said slave unit, and a communication processing control section which upon reception of the communication processing request from said master communication control unit, sends the transmission data corresponding to the type of the communication processing request to a corresponding slave unit in a predetermined order through said transmission/reception section and write the response data, which are received as a response to the transmission data in a predetermined order from said slave unit through said transmission/reception section, into said memory section, thereby executing said slave unit communication processing by, and which notifies said master communication control unit of the completion of the slave unit communication processing through an interruption signal when the communication processing has been completed;

said memory section is configured so as to store notification data for notifying execution of connection/operation status examination processing, command data for executing the connection/operation status examination processing, and transmission end data which represent the end of the transmission data, as the transmission data necessary to execute the connection/operation status examination processing among a plurality of kinds of the slave unit communication processing, said transmission/reception section comprises:

a transmission data processing section which reads the transmission data from said memory section in order of the notification data, the command data, and the transmission end data in response to a control signal from said communication processing control section, and which sends the transmission data to the slave unit through said transmission/reception section; and a reception data processing section which sequentially writes reception acknowledgement data, connection/operation status examination result data and reception end data, which are received from said slave unit through said transmission/reception section in that order as a response to the transmission data, into said memory section in response to a control signal from said communication processing control section, said communication processing control section comprises:

a control signal generating section which generates a control signal for said transmission/reception section upon reception of a connection/operation status examination processing request from said master communication control unit, said connection/operation status examination processing request requesting said slave unit to execute the connection/operation status examination processing;

a data monitoring section which monitors the state of the transmission and reception of the transmission data and response data, and which detects whether or not the reception end data have been written into said memory section after the transmission end data have been transmitted; and an interruption control section which outputs an interruption signal to said master communication control unit after said data monitoring section has detected that the reception end data have been written into said memory section.

36. The intermediate communication control unit according to claim 35, wherein said slave units are divided into a plurality of slave unit groups, each group consisting of a plurality of slave units, and said intermediate communication control unit and said slave unit groups are connected together through a plurality of serial buses, and wherein said communication processing control section of said intermediate communication control unit comprises:

a serial bus selecting section for selecting one of said serial buses to be used when sending the transmission data or receiving the response data.

37. The intermediate communication control unit according to claim 35, wherein said memory section is configured in such a way that the reception acknowledgement data and the connection/operation status examination result data among the reception acknowledgement data, the connection/operation status examination result data, and the reception end data are sequentially read on the basis of a data read request from said master communication control unit.

38. The intermediate communication control unit according to claim 37, wherein said memory section is configured such that the reception end data are read after the connection/operation status examination result data are read.

39. The intermediate communication control unit according to claim 35, wherein said notification data comprises a notification identification code and slave unit number data.

40. The intermediate communication control unit according to claim 35, wherein said transmission end data comprises an end-of-block identification code and slave unit number data.

41. The intermediate communication control unit according to claim 35, wherein said reception end data comprises an end-of-block identification code and slave unit number data.

42. The intermediate communication control unit according to claim 35, wherein said communication processing control section comprises:

a reception data register in which a reception data amount is set; and said interruption control section outputs the interruption signal when the amount of the connection/operation status examination result data of the response data has reached the reception data amount set in the reception data register.

43. An intermediate communication control unit which is interposed between a master communication control unit for performing communication control for a plurality of slave units and the plurality of slave units capable of communicating with the master communication unit, and which controls the communication for said slave units instead of said master communication control unit in response to a communication processing request from said master communication control unit, said intermediate communication control unit comprising:

a memory section for storing transmission data which are necessary to perform slave unit communication processing and response data, which are a response to the transmission data, for each the type of communication, in response to a communication processing request from said master communication control unit;

a transmission/reception section for sending the transmission data to, or receiving the response data from, said slave unit; and a communication processing control section which upon reception of the communication processing request from said master communication control unit, sends the transmission data corresponding to the type of the communication processing request to a corresponding slave unit in a predetermined order through said transmission/reception section and write the response data, which are received as a response to the transmission data in a predetermined order from said slave unit through said transmission/reception section, into said memory section, thereby executing said slave unit communication processing by, and which notifies said master communication control unit of the completion of the slave unit communication processing through an interruption signal when the communication processing has been completed;

said memory section is configured so as to store notification data for notifying of the execution of control/setting processing, command data for executing the control/setting processing, and transmission end data which represent the ends of the control/setting processing data and the transmission data, as the transmission data necessary to execute the control/setting processing among a plurality of kinds of the slave unit communication processing, said transmission/reception section comprises:

a transmission data processing section which reads the transmission data from said memory section in order of the notification data, the command data, the control/setting processing data, and the transmission end data in response to a control signal from said communication processing control section, and which sends the transmission data to the slave unit through said transmission/reception section; and a reception data processing section which sequentially writes the reception acknowledgement data, which are received from said slave unit as response data to the transmission data, into said memory section in response to a control signal from said communication processing control section, and said communication processing control section comprises:
- a control signal generating section which generates a control signal for said transmission/reception section upon reception of a control/setting processing request from said master communication control unit, said control/setting processing request requesting said slave unit to execute the control/setting processing;
- a data monitoring section which monitors the state of the transmission and reception of the transmission data and response data, and which detects whether or not the reception acknowledgement data have been written into said memory section after the transmission end data have been transmitted; and
- an interruption control section which outputs the interruption signal to said master communication control unit after said data monitoring section has detected that the reception acknowledgement data have been written into said memory section.

44. The intermediate communication control unit according to claim 43, wherein said slave units are divided into a plurality of slave unit groups, each group consisting of a plurality of slave units, and said intermediate communication control unit and said slave unit groups are connected together through a plurality of serial buses, and
   wherein said communication processing control section comprises:
   - a serial bus selecting section for selecting one of said serial buses to be used when sending the transmission data or receiving the response data.

45. The intermediate communication control unit according to claim 43, wherein said memory section is configured such that the reception acknowledgement data are read in response to a data read request from said master communication control unit.

46. The intermediate communication control unit according to claim 43, wherein said notification data comprises a notification identification code and slave unit number data.

47. The intermediate communication control unit according to claim 43, wherein said transmission end data comprises an end-of-block identification code and slave unit number data.

48. The intermediate communication control unit according to claim 43, wherein said communication processing control section comprises:
   - a transmission data register in which transmission data amount is set; and
   - said interruption control section outputs the interruption signal when the amount of the transmitted control/setting data of the transmission data has reached the transmission data amount set in the transmission data register.

49. An intermediate communication control unit which is interposed between a master communication control unit for performing communication control for a plurality of slave units and the plurality of slave units capable of communicating with the master communication unit, and which controls the communication for said slave units instead of said master communication control unit in response to a communication processing request from said master communication control unit, said intermediate communication control unit comprising:
- a memory section for storing transmission data which are necessary to perform slave unit communication processing and response data, which are a response to the transmission data, for each the type of communication, in response to a communication processing request from said master communication control unit;
- a transmission/reception section for sending the transmission data to, or receiving the response data from, said slave unit; and
- a communication processing control section which upon reception of the communication processing request from said master communication control unit, sends the transmission data corresponding to the type of the communication processing request to a corresponding slave unit in a predetermined order through said transmission/reception section and write the response data, which are received as a response to the transmission data in a predetermined order from said slave unit through said transmission/reception section, into said memory section, thereby executing said slave unit communication processing by, and which notifies said master communication control unit of the completion of the slave unit communication processing through an interruption signal when the communication processing has been completed;
wherein said communication processing control section comprises:
   - a transmission data generating section which automatically generates, for all of said slave units, notification data for notifying simultaneous connection status examination processing, command data for executing the simultaneous connection status examination processing, and transmission end data which represent the end of the transmission data, as the transmission data necessary to carry out the simultaneous connection status examination processing among a plurality kinds of the slave unit communication processing, upon reception of a simultaneous connection status processing request from said master communication control unit which requests the execution of simultaneous connection status examination processing for all of said slave units,
   said transmission/reception section comprises:
   - a transmission data processing section which continuously, repetitively sends the transmission data generated in the transmission data generating section to all of said slave units through said transmission/reception section in order of the notification data, the command data, and the transmission end data; and
   - a reception data processing section which sequentially writes the response data, which are received from said respective slave units through said transmission/reception section as a response to the transmission data, into said memory section in order of the reception acknowledgement data, the connection status examination result data, and the reception end data, and
   said communication processing control section comprises:
   - a data monitoring section which monitors the state of the transmission and reception of the transmission data and response data, and which detects whether or not the reception end data have been written into said memory section after the transmission end data have been transmitted; and
   - an interruption control section which outputs the interruption signal to said master communication control unit after said data monitoring section has detected that the reception end data have been written into said memory section.

50. The intermediate communication control unit according to claim 49, wherein said slave units are divided into a plurality of slave unit groups, each group consisting of a plurality of slave units, and said intermediate communication control unit and said slave unit groups are connected together through a plurality of serial buses, said communication processing control section comprises:
 a serial bus simultaneous designating section for designating all of said serial buses as serial buses to be used when simultaneously sending the transmission data and receiving the response data through the respective serial buses, and
 said reception data processing section comprises:
 a multiplexing section which combines the response data simultaneously received through said serial buses into multiplexed data by time-division multiplexing, and which sequentially writes the multiplexed data into said memory section.

51. The intermediate communication control unit according to claim 50, wherein said communication processing control section comprises:
 a slave unit number register which holds the number of slave units in each slave unit group in order to cope with an increase or a decrease in the number of slave units in each slave unit group.

52. The intermediate communication control unit according to claim 49, wherein said memory section is configured in such a way that the reception acknowledgement data, the connection status examination result data, and the reception end data are sequentially read on the basis of a data read request from said master communication control unit.

53. The intermediate communication control unit according to claim 49, wherein said notification data comprises a notification identification code and slave unit number data.

54. The intermediate communication control unit according to claim 49, wherein said transmission end data comprises an end-of-block identification code and slave unit number data.

55. The intermediate communication control unit according to claim 49, wherein said reception end data comprises an end-of-block identification code and slave unit number data.

56. The communication control apparatus according to claim 3 wherein said reception end data comprises an end-of-block identification code and slave unit number data.

57. The communication control apparatus according to claim 4, wherein said reception end data comprises an end-of-block identification code and slave unit number data.

58. The communication control apparatus according to claim 18, wherein said reception end data comprises an end-of-block identification code and slave unit number data.

59. The intermediate communication control unit according to claim 37, wherein said reception end data comprises an end-of-block identification code and slave unit number data.

60. The intermediate communication control unit according to claim 38, wherein said reception end data comprises an end-of-block identification code and slave unit number data.

61. The intermediate communication control unit according to claim 52, wherein said reception end data comprises an end-of-block identification code and slave unit number data.

* * * * *